(12) United States Patent
Bergan et al.

(10) Patent No.: US 6,468,085 B1
(45) Date of Patent: Oct. 22, 2002

(54) SCALE BUILDER AND METHOD

(75) Inventors: John Richard Bergan; Michael Rattee, both of Tucson, AZ (US)

(73) Assignee: Assessment Technology Inc., Tucson, AZ (US)

( * ) Notice: Subject to any disclaimer, the term of this patent is extended or adjusted under 35 U.S.C. 154(b) by 0 days.

(21) Appl. No.: 09/628,806

(22) Filed: Jul. 28, 2000

(51) Int. Cl.⁷ .............................................. G09B 19/00
(52) U.S. Cl. ..................... 434/236; 434/332; 434/307 R
(58) Field of Search ................................ 434/322, 323, 434/335, 353, 236, 332, 307 R

(56) References Cited

U.S. PATENT DOCUMENTS

| | | | | |
|---|---|---|---|---|
| 5,326,270 A | * | 7/1994 | Ostby et al. ................ 434/362 |
| 5,743,476 A | * | 4/1998 | Ho et al. ..................... 434/332 |
| 5,779,486 A | * | 7/1998 | Ho et al. ..................... 434/353 |
| 6,112,049 A | * | 8/2000 | Sonnenfeld ................. 434/350 |
| 6,120,300 A | * | 9/2000 | Ho et al. ..................... 434/332 |
| 6,139,330 A | * | 10/2000 | Ho et al. ..................... 434/322 |
| 6,353,447 B1 | * | 3/2002 | Truluck et al. ............. 345/733 |

* cited by examiner

*Primary Examiner*—Joe H. Cheng
*Assistant Examiner*—Kathleen M. Christman
(74) *Attorney, Agent, or Firm*—Donald W. Marks

(57) ABSTRACT

In a scale building system and method for an educational management system, education goals are added to lists of different knowledge areas for enabling a teacher or administrator to tailor the assessment of student achievement. As each goal is added, the system and method computes a difficulty factor for use in weighting the achievement assessment. Additionally scales can be translated into different languages.

14 Claims, 62 Drawing Sheets

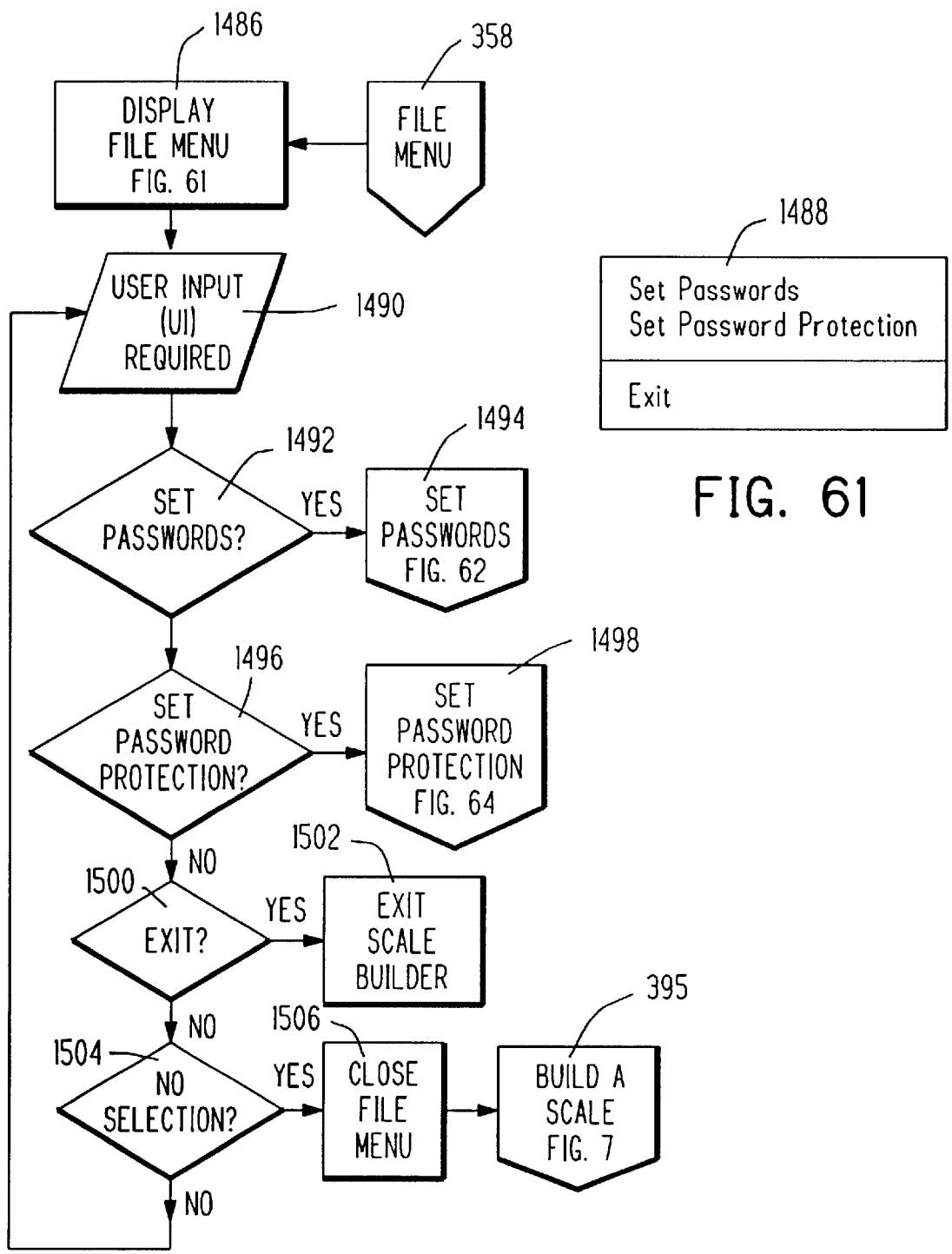

SCALE BUILDER AND METHOD

CROSS-REFERENCE TO RELATED APPLICATIONS

The application is related to U.S. patent application Ser. No. 09/338,440 filed Jun. 23, 1999 by John Richard Bergan, John Robert Bergan and Kerrie L. Cole for Educational Management System and which is hereby incorporated by reference.

BACKGROUND OF THE INVENTION

In a computerized educational management system, such as is described in U.S. patent application Ser. No. 09/338, 440 filed Jun. 23, 1999 by John Richard Bergan, John Robert Bergan and Kerrie L. Cole for Educational Management System, scales or data files containing lists of goals or learning capabilities are employed in assessing and reporting on the progress of each student, class, center and agency and in preparing lessons for students based upon the assessment of the students. The goals are classified first into scales which are broad learning or developmental areas suitable for students of a selected developmental level. Each developmental level is a broad classification of students by age, ability and the like; for example, one such classification of levels includes (1) infant-toddler, ages 0–2; (2) preschool level 1, ages 2–4; (3) preschool level 2, ages 3–5; (4) preschool advanced arts and technology, ages 3–5; (5) kindergarten, ages 5–7; (6) grade 1, ages 6–8; (7) grade 2, ages 7–9; and (8) grade 3, ages 8–10. As an example of developmental areas, the preschool level 1 goals or learning capabilities can be classified into the developmental areas (1) early math, (2) language and literacy, (3) nature and science, (4) perceptual motor development, (5) self-help, and (6) social-emotional development. Each group of goals classified into a developmental area is known as a scale. Then each of these scales or developmental areas is further broken down into knowledge areas; as an example, the capabilities in the developmental area "early math" of preschool level 1 can be further broken down into the knowledge areas (a) counting, (b) addition, (c) subtraction, (d) fractions, (e) seriation, (f) geometric shapes, (g) time in daily living and (h) math communication.

While standardized scales of goals, known as management and performance system (MAPS) goals, are available, it is often desirable for teachers or educational managers to make new and different scales or modified standard scales.

BRIEF SUMMARY OF THE INVENTION

An object of the invention is to enable the making of new and different scales in a database of a management system.

Another object of the invention is to allow a user to make modified scales from standard scales in the database of a management system.

The invention is summarized in an apparatus and method for building computerized educational scales including a plurality of educational goals assigned to different areas of knowledge. Initially an area of knowledge is selected. Then the teacher or administrator enters one or more goals in a list related to the selected area of knowledge. This goal list is then saved for use in an education management system using the goals to assess student achievement.

Additionally each goal is given one or more factors, such as a difficulty factor, used to weight assessment of student achievement. In one embodiment the difficulty factor D is computed by the equation:

$$D=(C/2.5)-1$$

wherein C is the position of the goal within the goal list.

Other objects, advantages and features of the invention are apparent from the following detailed description and the accompanying drawings.

BRIEF DESCRIPTION OF THE SEVERAL VIEW OF THE DRAWINGS

FIG. 60 is a program flow diagram of a file menu procedure called by selecting the menu item "File" during any of the procedures of the program.

FIG. 61 is an illustration of a file pop-up menu displayed on a computer monitor during the file menu procedure of FIG. 60.

DETAILED DESCRIPTION OF THE INVENTION

Figure 1:
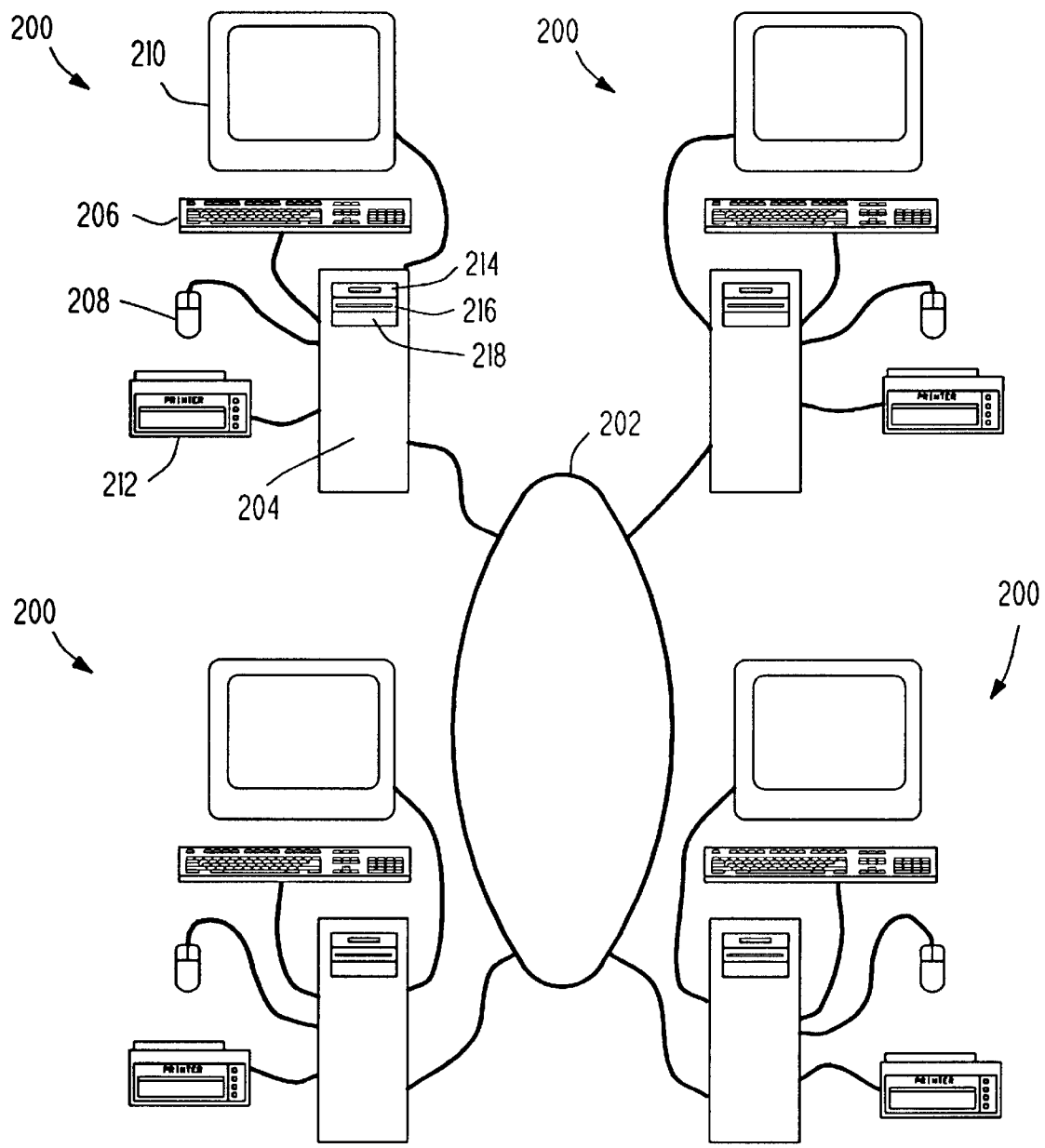
FIG. 1 is a diagram of one possible network of computers employed in an educational management system in which a scale builder in accordance with one embodiment of the invention can be employed.

As shown in FIG. 1, an educational scale builder and method in accordance with one embodiment of the invention is employed in a computer station 200 which can be included with a plurality of computer stations 200 in an educational management system. When the computer station is one of a plurality of computer stations, the computer stations are interconnected by a network 202. Each computer station 200 typically includes a central unit 204 which is connected to a keyboard 206, mouse 208, monitor 210 and printer 212. The central unit 204 typically includes a read/write removable media device such as floppy disk drive 214, a read only removable media device such as a CD-ROM or DVD reader (or reader/writer) 216 and a mass storage device such as a hard drive 218. The educational management system can be operated on a single one of the computer stations 200 without any interconnection with other computer stations, but usefulness is enhanced by operating a system with a plurality of stations. The educational scale builder is fully operable on a stand alone computer station with the scales created or modified thereon being transferable by floppy disk, or other media, to the educational management system.

The network 202 is one of a variety of possible network configurations. Where the educational management system is employed in a single school or closely distanced schools, the network 202 can be a hardwired internal network or connected through dedicated lines. In the typical internal network system, one of the stations 200 is a server with the other stations accessing the server for data storage, programs and communications such as e-mail. Where the educational management system is employed in more distant class rooms, the network can be formed by dial up telephone lines, the internet, or some other digital communication system for data transfer and communications.

Figure 2:
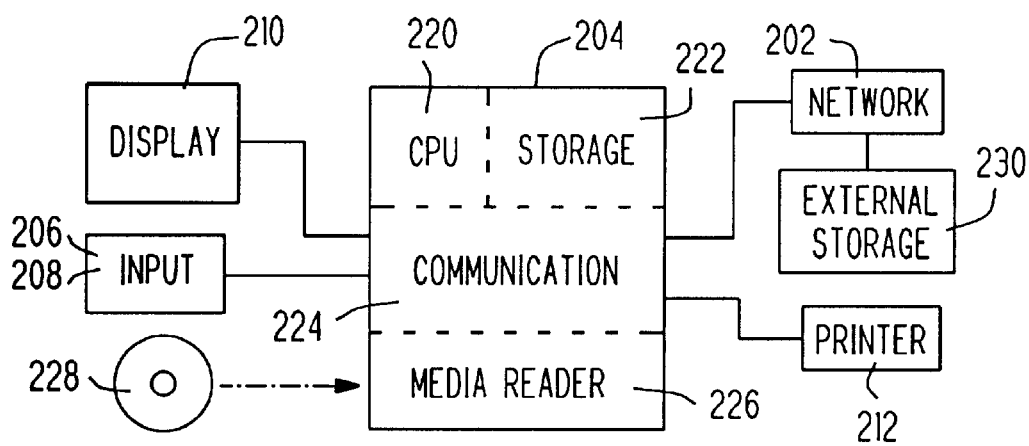
FIG. 2 is a block diagram of a typical computer station employed in the network illustrated in FIG. 1.
Figure 3:
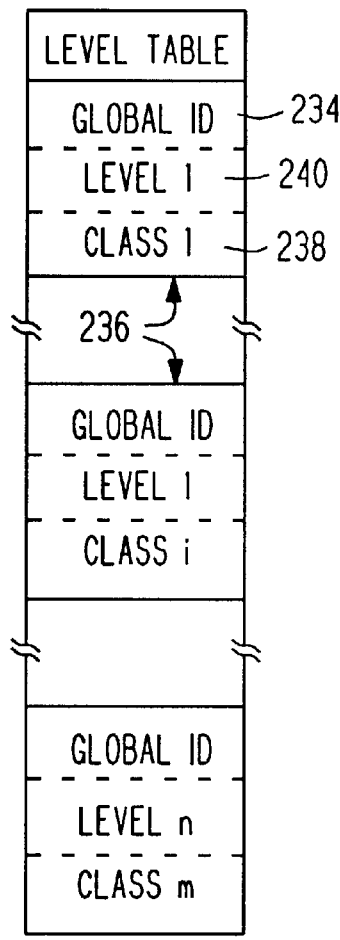
FIG. 3 is a diagrammatic illustration of a level table stored and employed in the network of FIG. 1 for storing readiness levels that a teacher has selected for reporting purposes.

As shown in FIG. 2, the typical unit 204 includes a central processor (CPU) 220, one or more internal storage control units 222, communication control units 224, and media reader/writer 226. The CPU 220 is operated by instructions contained in various computer programs including operating systems and applications and generally controls the operation of all systems and units in the unit 204. The storage control unit or units 222 control the hard drive 218 and removable media devices which can be used for storage. The communication unit or units 224 handle various inputs and outputs such as inputs from the keyboard 206, mouse 208, network 202 and outputs to the monitor 210, the network 202 and the printer 212. The media reader/writer 226 reads and writes various media such as a CD-ROM disk 228. External storage 230 is accessed through the network 202.

Storage such as one or more of the hard drive 218, external storage 230 and/or removable media 228 contain a computer program and a database for operating the CPU in accordance with the education management system. Several files or portions of the database are shown in FIGS. 3–6. Each record in the database includes a unique global ID 234 which for example can be a variable of the type GUID generated by an algorithm that ensures no duplication. The use of a GUID (for example, a 39 byte string or value) to uniquely identify each record ensures that records can be moved from database to database at different locations without concern about duplicate IDs corrupting data. The table shown in FIG. 3 contains a plurality of records (rows) with each record including the name or a GUID ID of a class 238 and one or more readiness levels 240 for which a teacher wishes to have reports.

Figure 4:
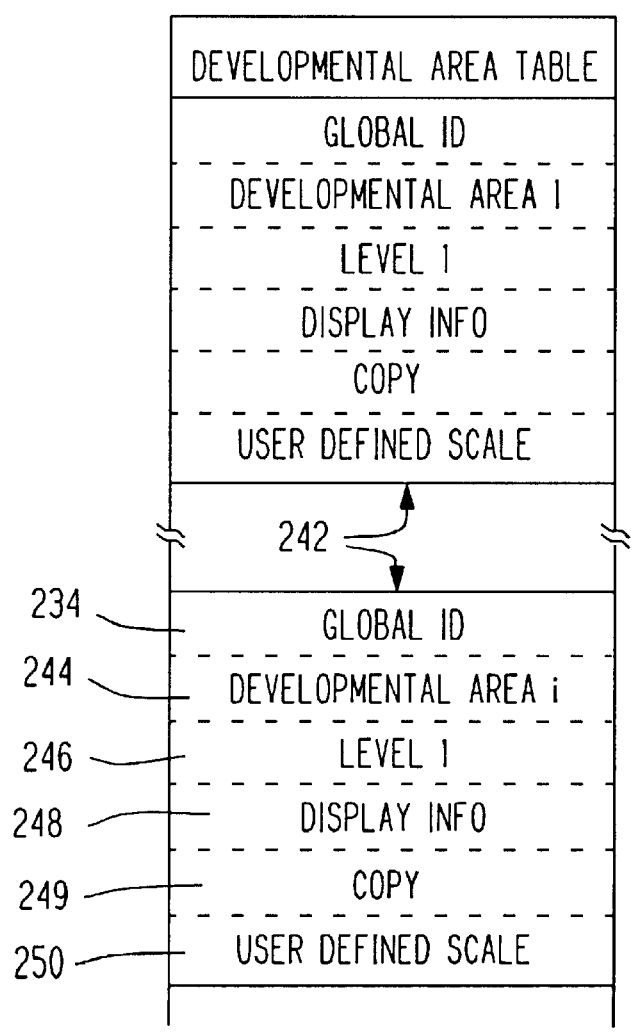
FIG. 4 is a diagrammatic illustration of a developmental area table stored and employed in the network of FIG. 1 for setting forth different developmental areas in each of the levels identified in FIG. 3.

FIG. 4 shows a developmental area table. Each developmental level is a broad classification of students by age, ability and the like; for example, one such classification of levels includes (1) infant-toddler, ages 0–2; (2) preschool level 1, ages 2–4; (3) preschool level 2, ages 3–5; (4) preschool advanced arts and technology, ages 3–5; (5) kindergarten, ages 5–7; (6) grade 1, ages 6–8; (7) grade 2, ages 7–9; and (8) grade 3, ages 8–10. In the instruction of students each of the broad developmental levels is further broken down into different developmental areas or scales which are listed in records 242 (also called Scale field) in the developmental area table of FIG. 4. Each the records 242 includes the name 244 of the developmental area, the developmental level 246 to which the name 244 belongs, display information 248 for controlling the arrangement and selection buttons of information on the monitor or display 210, a copy field 249 identifying scales (developmental areas) copied from an existing scale and permitting user modification, and user defined scale field 250 identifying scales (developmental areas) written by the user. For example the preschool level 1 capabilities can be classified into the developmental areas (1) early math, (2) language and literacy, (3) nature and science, (4) perceptual motor development, (5) self-help, and (6) social-emotional development.

Figures 5, 6:
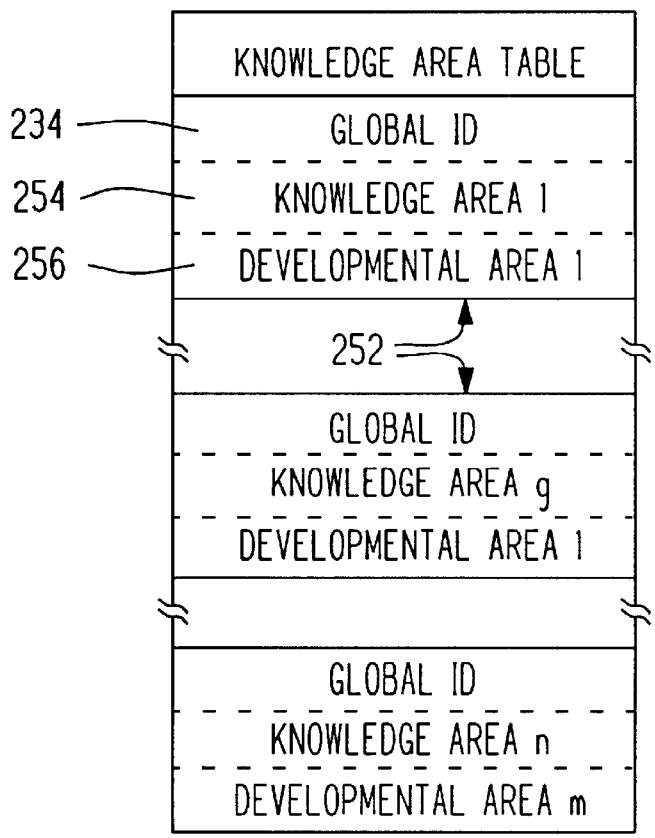
FIG. 5 is a diagrammatic illustration of a knowledge area table stored and employed in the network of FIG. 1 for defining knowledge areas appropriate for each of the developmental areas.
FIG. 6 is a diagrammatic illustration of a goal table stored and employed in the network of FIG. 1 for defining goals or learning capabilities for each developmental area.

In FIG. 5, there is shown a knowledge area table containing records 252 each containing the name of a knowledge area (KA) 254 and the name of the developmental area 256 to which the knowledge area is assigned. As an example, the capabilities in the developmental area "early math" of preschool level 1 can be further broken down into the knowledge areas (a) counting, (b) addition, (c) subtraction, (d) fractions, (e) seriation, (f) geometric shapes, (g) time in daily living and (h) math communication. As an alternative or supplement to the developmental area, each record 256 can contain a ScaleID field (not shown) which contains a GUID identifying the scale or developmental area to which the knowledge area belongs.

A goal table is shown in FIG. 6 and includes records 260 for all the learning capabilities (goals) for each developmental area. Each of the records 260 includes the name of the goal or learning capability 262, the developmental area 264 (optional—may be eliminated) and knowledge area 266 to which the learning capability belongs, an identification of a class 268, a difficulty factor (b) 270, a discrimination factor (a) 272, and an order number 274. As an alternative or supplement to the knowledge area field, each record 260 can include a KnowledgeAreaGlobalID field (not shown) which is a GUID identifying the knowledge area to which the goal or learning capability belongs. The difficulty factor 270 and the discrimination factor 272 are used in computations involving item response theory scores, probabilities of a student achieving a particular goal or learning capability from an estimated ability score, learning suitability of a student for particular goals, and weighting of -achievement within a knowledge area or scale. The capabilities within a developmental area can be ordered by their difficulty and this order number can be used as an alternative method of determining those capabilities which have been learned from a estimated ability score. As * . a further alternative or supplement, the goals or learning capabilities in the goal table can be ordered in accordance with their difficulty and this order can be used to evaluate the likelihood that a child is prepared to learn given skills based on the teacher' overall estimate of skills the child has mastered.

Further information about the educational management system can be found in U.S. patent application Ser. No. 09/338,440 filed Jun. 23, 1999 by John Richard Bergan, John Robert Bergan and Kerrie L. Cole for Educational Management System. Within this educational management system, the goals 260 and their factors (difficulty factor (b) 270, discrimination factor (a) 272 and order number 274) are essential to assessment of student, class, center and agency performance and to planning and organization of lessons and teaching resources.

Figure 7:
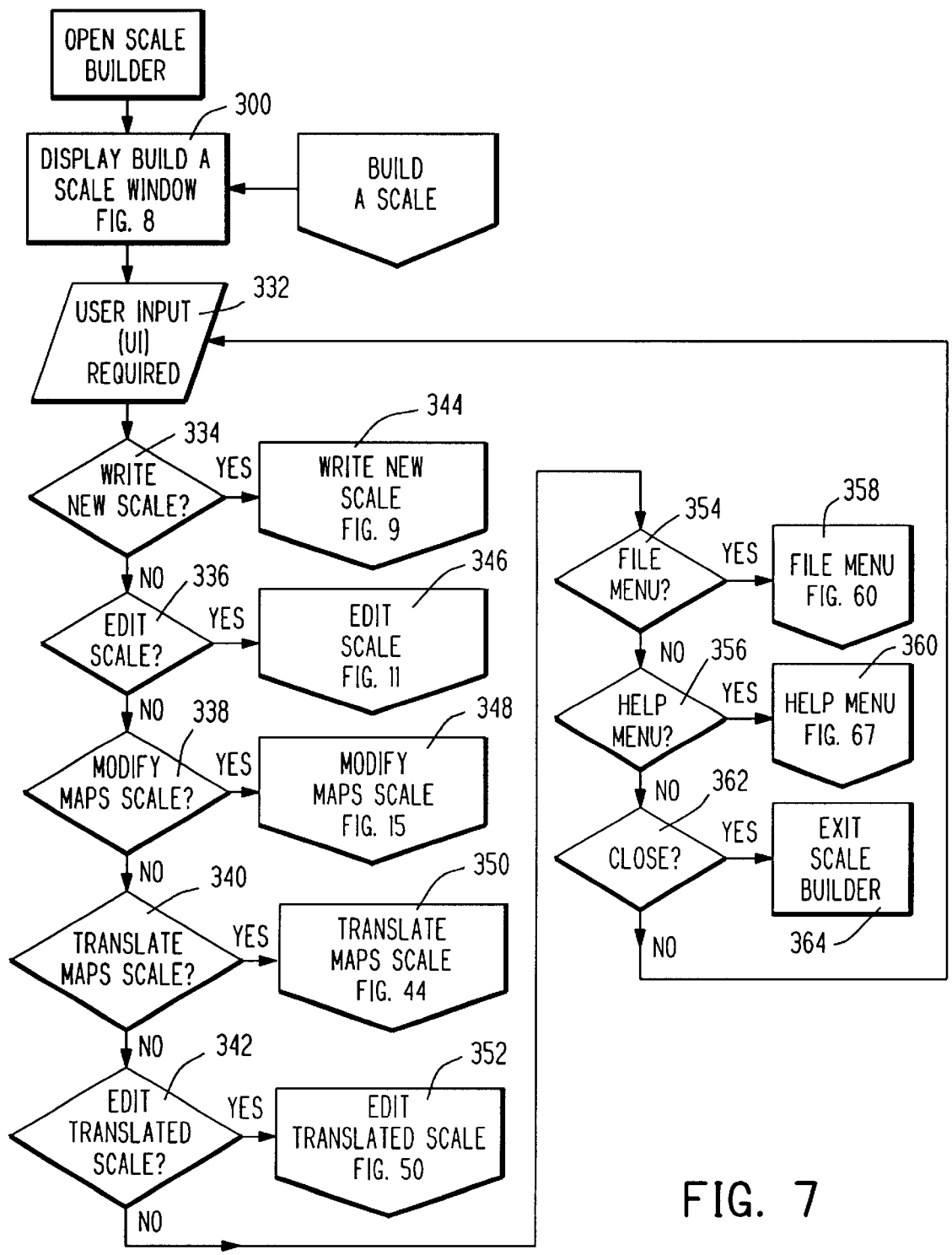
FIG. 7 is a program flow diagram for a main procedure in the educational scale builder which can be employed in the system of FIG. 1.
Figure 68:
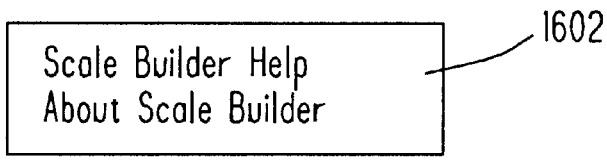
FIG. 68 is an illustration of a menu popup window displayed during the procedure of FIG. 67.

The present invention is embodied in a scale builder program or application illustrated by program flow charts and associated screen window in FIGS. 7–68 for making and/or editing lists of goals associated with respective knowledge areas used in the education management system. The scale builder program was designed for use with computers employing WINDOWS95, WINDOWS98 or WINDOWSNT and the following description and associated drawings are directed to that embodiment, but the program can be readily modified or adapted to run on a variety of different computer systems. It is noted that hereinafter the verb "select" is often used in one of its various forms to describe user input to call or request a desired function or to select a particular item or person. Such selection can often be made by any one of a variety of methods including clicking (moving a mouse arrow onto a displayed name, button, icon, or other item and pressing a mouse key one or more times), keyboard entry (pressing a key corresponding to an underlined letter in a name or title while an "Alt" or "Ctrl" key is depressed, pressing a function key designated for the function or item, or some other combination of keys), pressing the enter key to select a highlighted or otherwise emphasized item or function, or any other conventional manner. Often for brevity only one selection method, such as clicking, is described, but it is understood that selection of a particular item or procedure can often be made by any one of a plurality of methods and that description of selection by one method is meant to include selection by any other conventional selection method.

Figure 8:
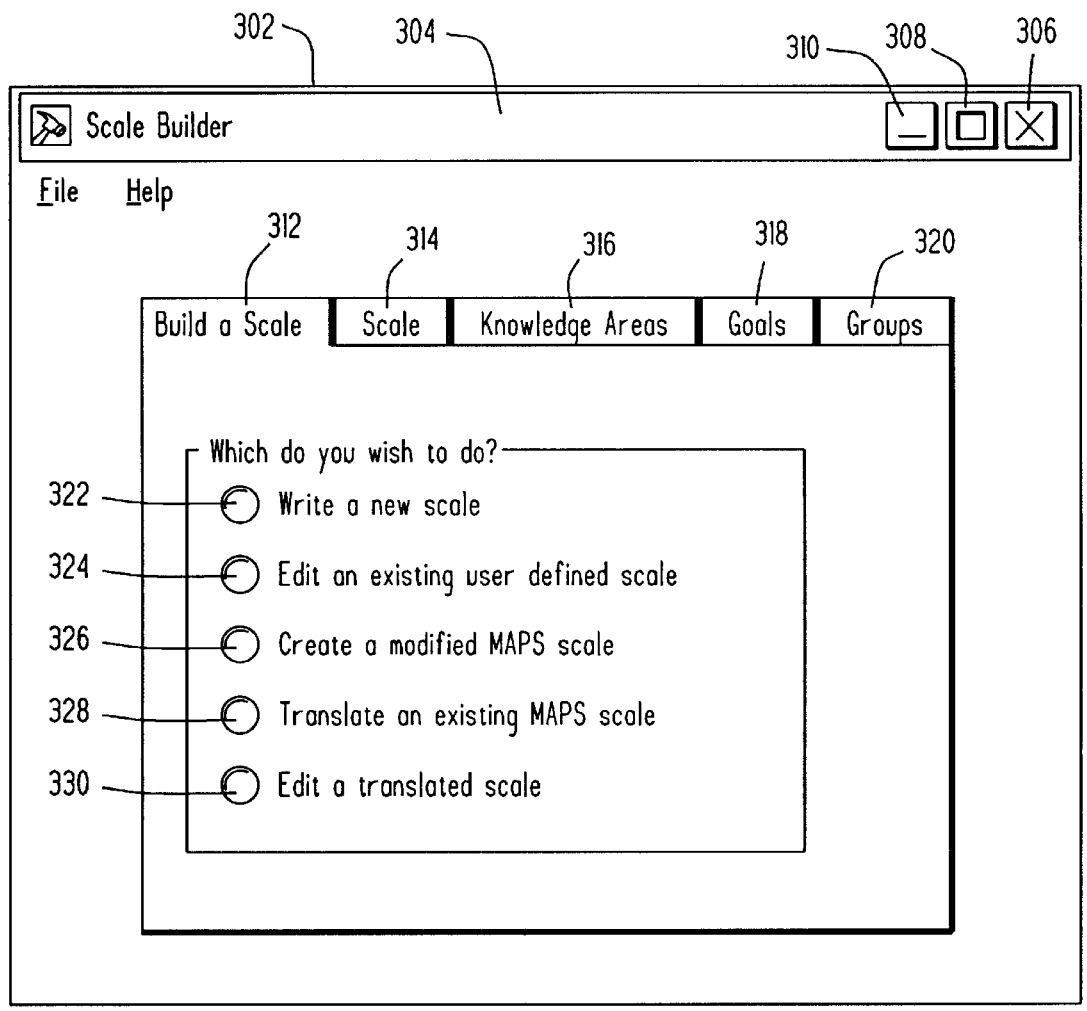
FIG. 8 is an illustration of a screen window displayed on a computer monitor during the procedure of FIG. 7.
Figure 50:
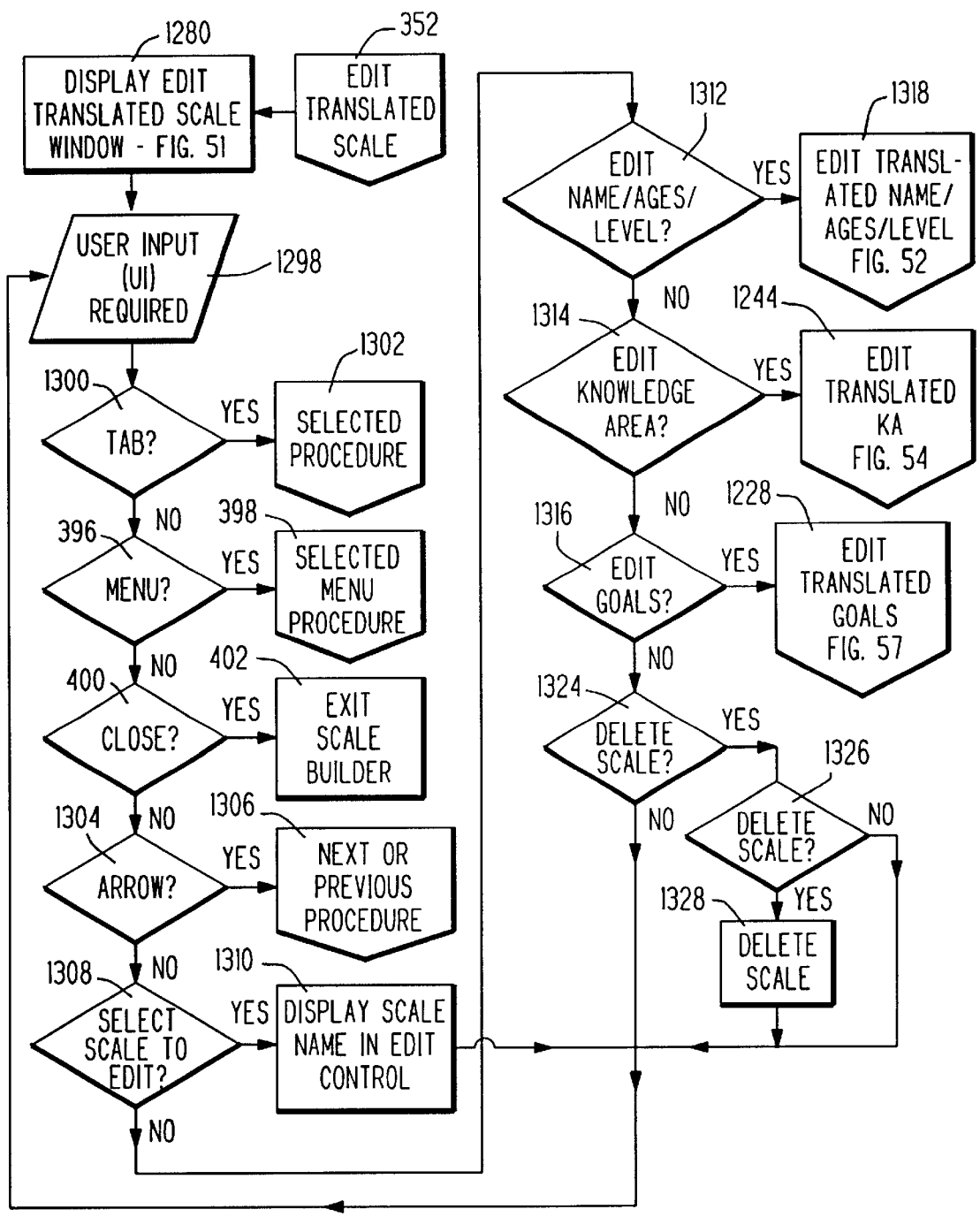
FIG. 50 is a program flow diagram of an edit translated scale procedure called from the main procedure of FIG. 7.

The main or starting procedure of the scale builder program is shown in FIG. 7 and initially in step 300 displays a build a scale window 302 shown in FIG. 8. The window 302 includes a title bar 304 containing a conventional close button 306, maximize button 308 and minimize button 310. Menu titles "File" and "Help" can be selected to display a file menu, FIG. 61, or help menu, FIG. 68. The window 302 contains a folder group defined by tabs 312, 314, 316, 318 and 320. The folder or window defined by tab 312 ("Build a Scale") is shown and contains buttons 322, 324, 326, 328 and 330 which can be selected by the user to write a new scale, edit an existing scale, create a modified MAPS scale, translate a MAPS scale and edit a translated scale, respectively. After the build a scale window is displayed, user input is enabled in step 332. Selection of one of the buttons 322, 324, 326, 328 and 330 is sensed in the respective steps 334, 336, 338, 340 and 342 to branch to the corresponding procedures, write a new scale 344 (FIG. 9), edit a scale 346 (FIG. 11), modify a MAPS scale 348 (FIG. 15), translate a MAPS scale 350 (FIG. 44) and edit a translated scale 352 (FIG. 50). Selection of one of the menu items "File" and "Help" is sensed in steps 354 and 356 to branch to the file menu procedure 358 (FIG. 60) and help menu procedure 360 (FIG. 67), respectively. When the close button 306 is selected, step 362 calls step 364 which terminates the scale builder program.

Figure 9:
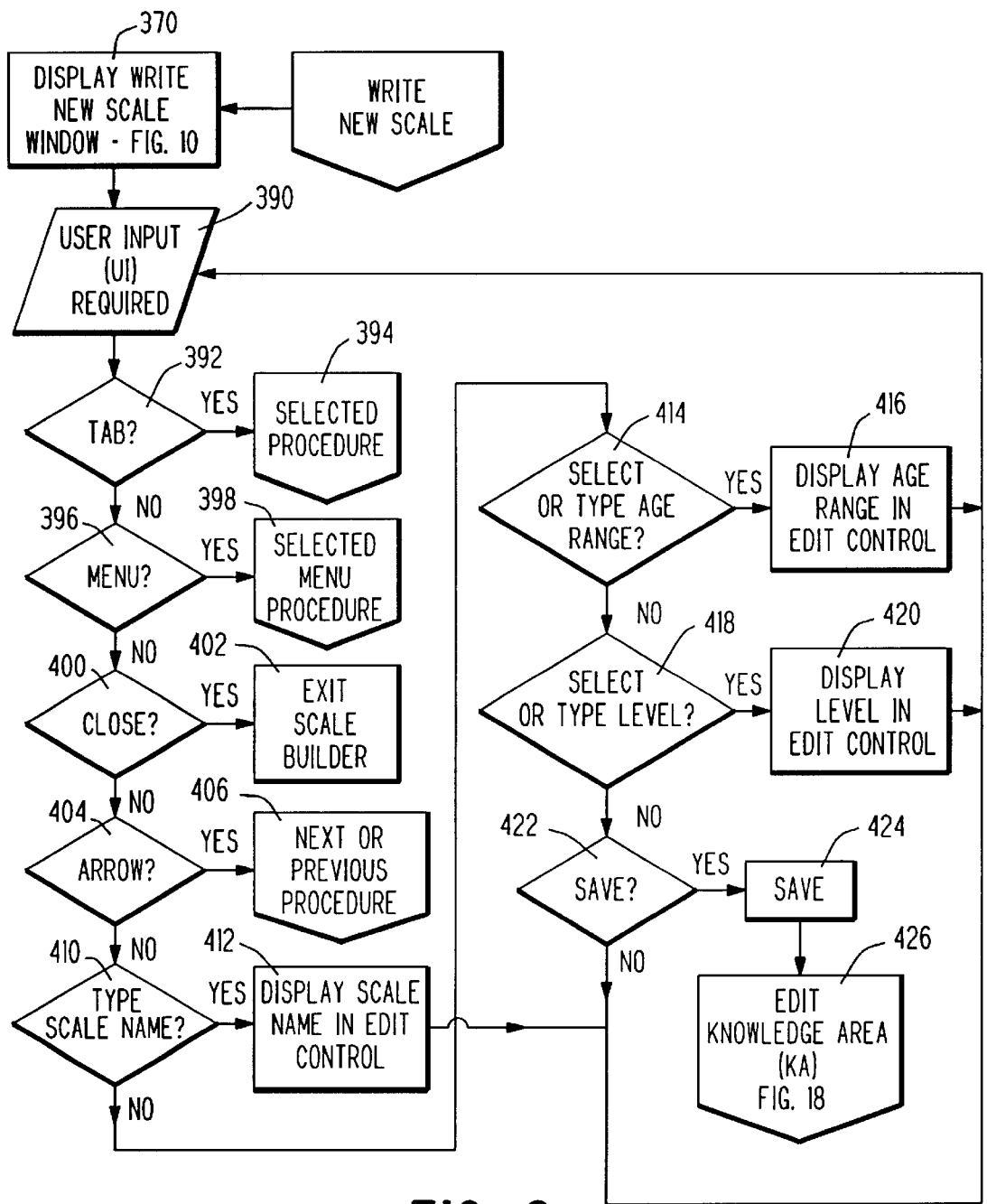
FIG. 9 is a program flow diagram of a write new scale procedure called from the main procedure of FIG. 7.
Figure 10:
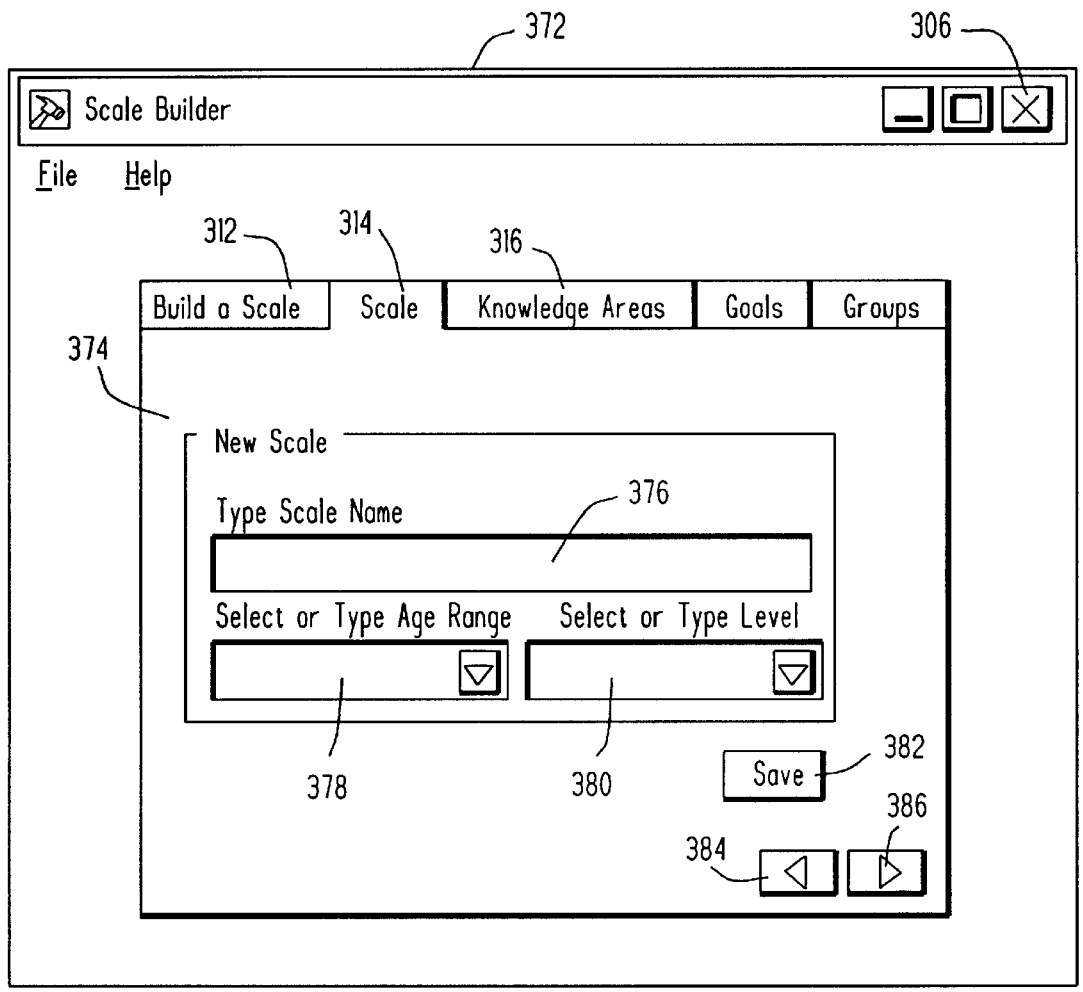
FIG. 10 is an illustration of a write new scale window displayed on a computer monitor during the procedure of FIG. 9.

In the write new scale procedure of FIG. 9, step 370 displays a write new scale window 372 of FIG. 10. This window 372 includes a new scale folder under the tab 314 including a type scale name edit control 376, a select or type age range edit control 378 and a select or type level edit control 380. The folder also includes a save button 382 along with back button 384 and forward button 386. Step 392 senses a click on one of the tabs 312 or 316 to proceed to step 394 to return to the main (build a scale 395) procedure of FIG. 7 or to advance to the edit knowledge area procedure of FIG. 18. Advancement to the edit knowledge area procedure is not permitted until the name edit control 374, age range edit control 378 and level edit control contain a name, age range and level, respectively. Steps 396 and 398 are repeats of the steps 354, 356, 358 and 360 of FIG. 7 and call the corresponding file menu procedure of FIG. 60 or the help menu procedure of FIG. 67 when one of the "File" or "Help" menu items is selected in the window 372. When the system close button 306 is clicked, step 400 advances to step 402 and exits the scale builder program to return to the operating system program such as WINDOWS 98. The step 402 includes appropriate procedures (not shown) to give the user opportunity to save any unsaved entries or modified items and to cancel the exit procedure. Step 404 senses when one of the back button 384 and forward button 386 is clicked to proceed to step 406 where the program returns the main procedure of FIG. 7 or advances to the edit knowledge area procedure of FIG. 18, respectively, under similar conditions as set forth in connection with step 394.

Steps 396, 398, 400 and 402 appear in many of the following procedures and are not renumbered or described in these following procedures. A tab step calling a selected procedure and an arrow step calling a next or previous procedure, similar to steps 392, 394 404 and 406, are also included in many of the following procedures, but are renumbered and are described to the extent that the procedures differ.

Typing in the edit control 376 is sensed in step 410 and causes the typed characters to be displayed in the edit control 376 by step 412. The edit control 378 can be used either to select an existing age range or to type in a new age range; step 414 senses this selection or typing and step 416 displays the selected or typed age range in the edit control. Similarly, step 418 senses the selection or typing of the level in the level edit control 380 and the selected or typed level is displayed by step 420 in the level edit control. After a scale name, age range and level are displayed in the edit controls, clicking on the save button 382 is sensed in step 422 which results in saving the name, age range and level and advancing the edit knowledge area procedure of FIG. 18. It is noted that, when the tab 316 or the forward button 386 are clicked, the name, age range and level are also saved prior to advancing to the edit knowledge procedure.

Figure 11:
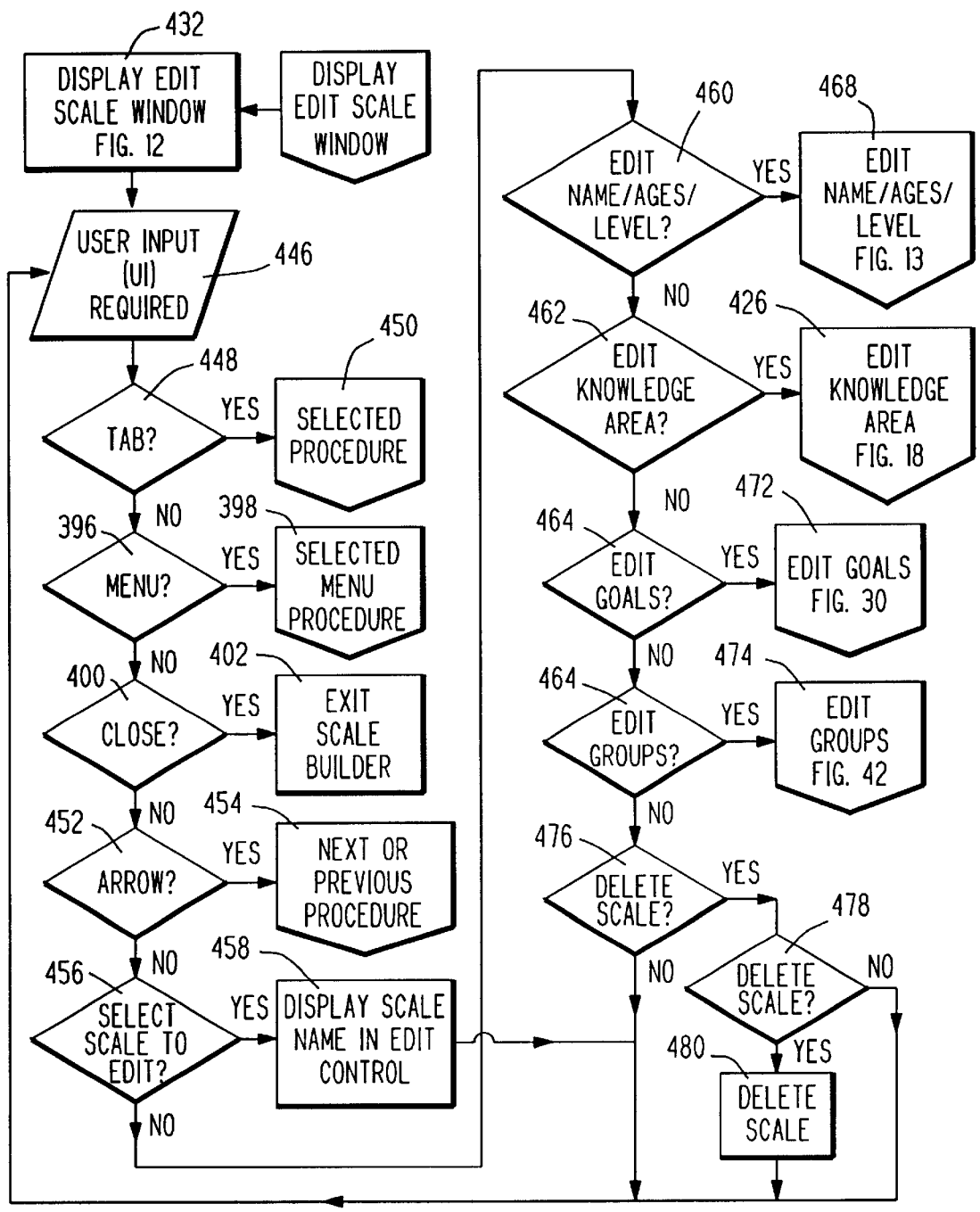
FIG. 11 is a program flow diagram of an edit scale procedure called from the main procedure of FIG. 7.
Figure 12:
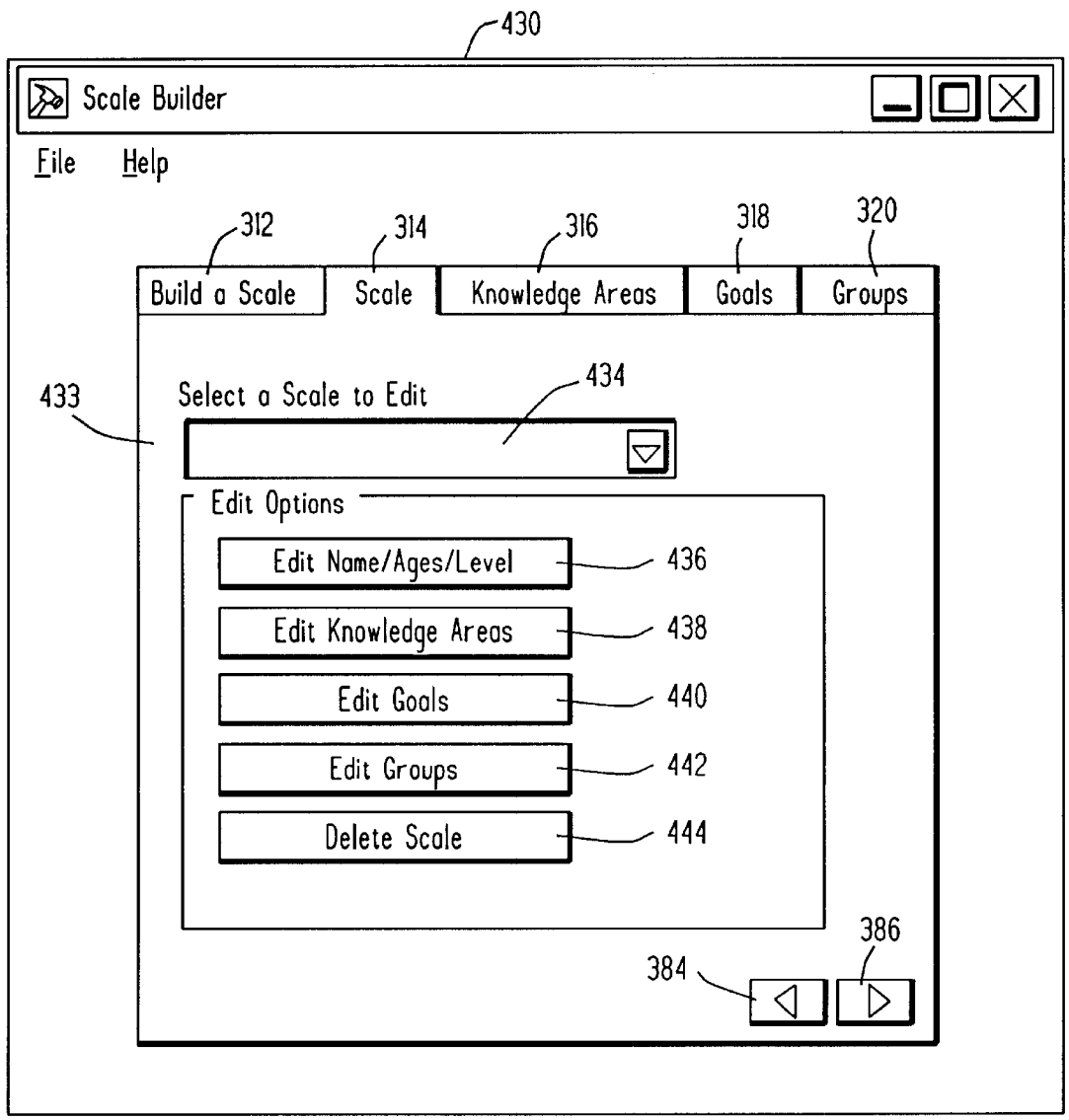
FIG. 12 is an illustration of an edit scale window displayed on a computer monitor during the procedure of FIG. 11.

In the edit scale procedure of FIG. 11 called by step 346, the edit scale window 430 of FIG. 12 is displayed on the monitor by step 432. This window 430 includes a display folder 433 under the tab 314 which includes a select scale edit control 434, edit name/ages/level button 436, edit knowledge areas button 438, edit goals button 440, edit groups button 442 and delete scale button 444. In step 446 user input is enabled. When the tab 312 is clicked, step 448 branches to step 450 where the program returns to the build a scale procedure 395 of FIG. 7, and when one of the tabs 316, 318 or 320 is clicked provided that a selected scale is displayed in the edit control 434, step 448 branches to step 450 where the program advances to edit name/ages/level procedure of FIG. 13, edit knowledge area procedure of FIG. 18, edit goals procedure of FIG. 30, respectively. Steps 456 and 459 respond to clicking on one of the arrows 384 and 386 to return to the main procedure or to advance to the edit knowledge area procedure of FIG. 18. Clicking on the arrow in the edit control box 434 results in display of a list of scales (not shown) in which one scale can be selected causing step 456 to branch to step 458 and display the selected scale in the edit control 434. When one of the buttons 436, 438, 440 or 442 is selected, corresponding step 460, 462, 464 or 466 branches to step 468, 426, 472 or 474 to call an edit name/ages/level procedure of FIG. 13, the edit knowledge area procedure of FIG. 18, the edit goals procedure of FIG. 30 or the edit groups procedure of FIG. 42. Step 476 detects clicking on the delete scale button 478 to proceed to step 478 where confirmation of the user'desire to delete the selected scale is required. If the confirmation is made in step 478, step 480 deletes the selected scale from the database.

Figure 13:
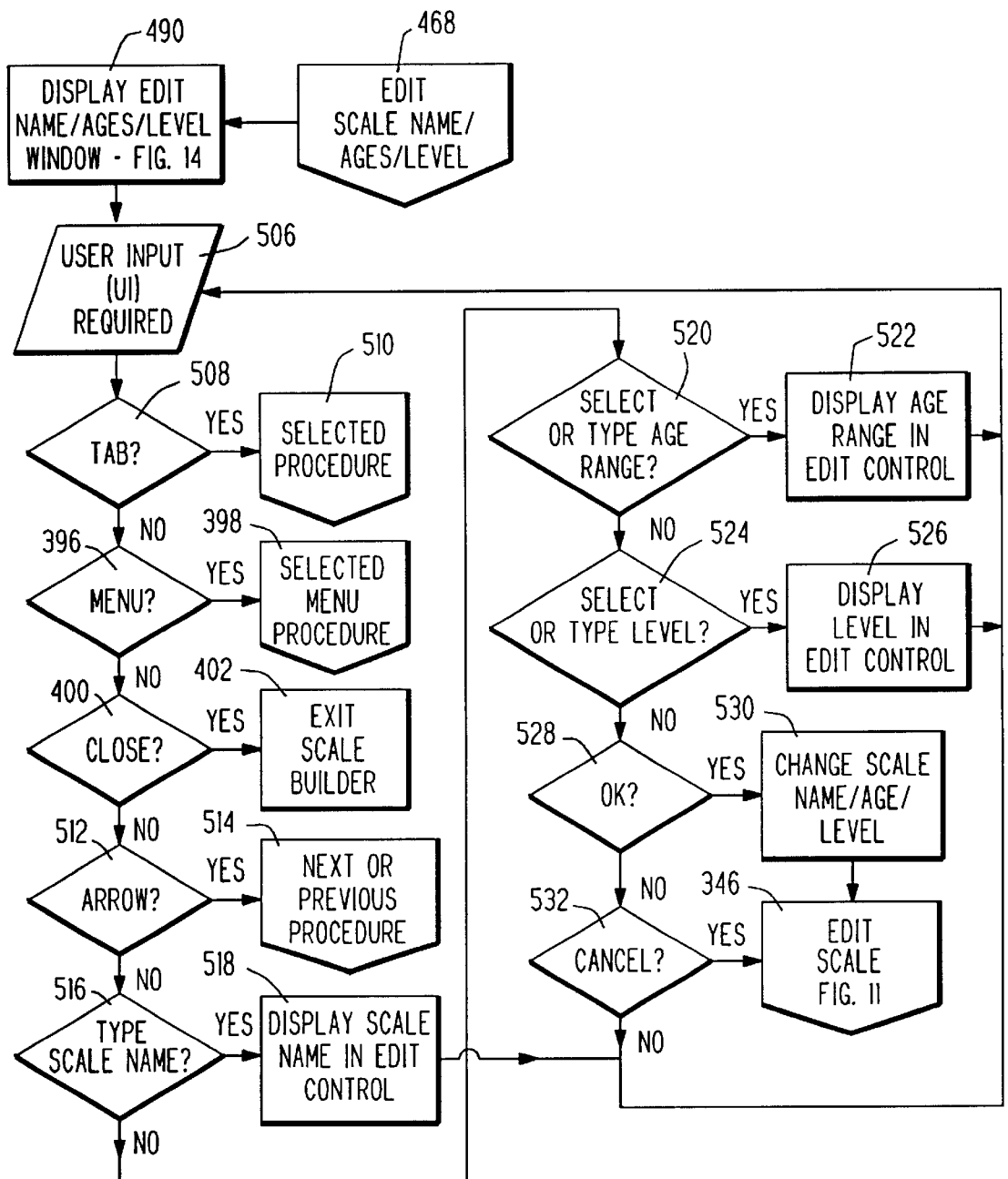
FIG. 13 is a program flow diagram of an edit name/ages/level procedure called from the edit scale procedure of FIG. 11.
Figure 14:
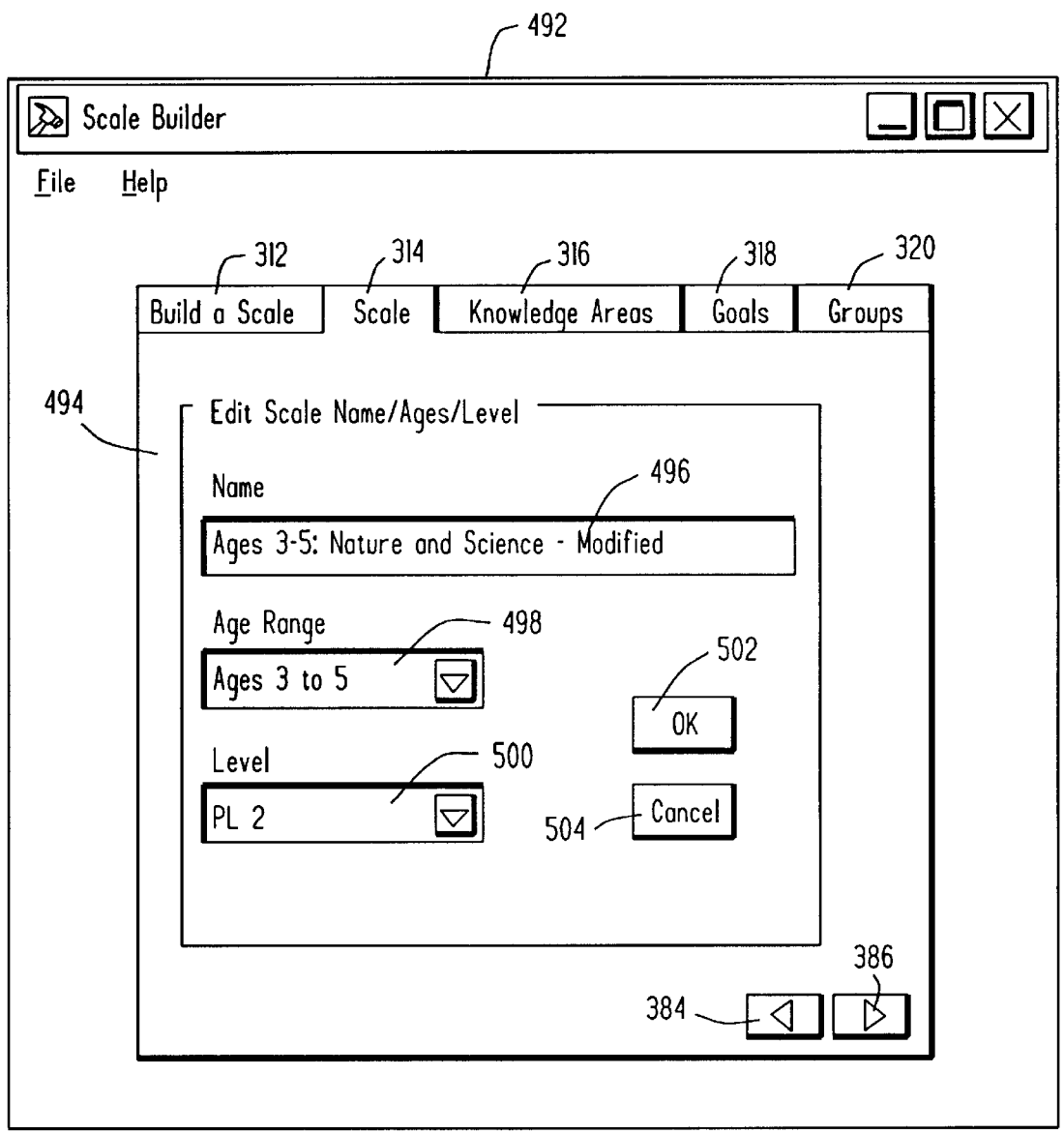
FIG. 14 is an illustration of an edit name/ages/level window displayed on a computer monitor during the procedure of FIG. 13.

When the edit scale name/ages/level procedure of FIG. 13 is called from the edit scale procedure of FIG. 11, step 490 displays the window 492 of FIG. 14. The window 492 includes an edit name/ages/level folder 494 with an name edit control 496, an age range edit control 498, a level edit control 500, an OK button 502 and a cancel button 504. When the tab 312 is clicked, step 508 branches to step 510 where the program returns to the build a scale procedure 395 of FIG. 7, and when one of the tabs 316, 318 or 320 is clicked, step 508 branches to step 510 where the program advances to edit name/ages/level procedure of FIG. 13, edit knowledge area procedure of FIG. 18, edit goals procedure of FIG. 30, respectively. Steps 512 and 514 respond to clicking on one of the arrows 384 and 386 to return to the main procedure or to advance to the edit knowledge area procedure of FIG. 18. The scale name selected in step 456 and 458 of FIG. 11 is displayed in the edit control box 496. Steps 516 and 518 permit changing the name in the edit control. The age range of the selected scale is displayed in the edit control 498 and the user in steps 520 and 522 can select another age range from a list (not shown) called by the arrow button in the edit control 498 or can type in a new age range. Similarly, the developmental level of the selected scale is shown in the edit control 500 and the user in steps 524 and 526 can select another developmental level form a list (not shown) displayed when the arrow button in the edit control 500 is clicked or can type in a new developmental level. Clicking on the OK button 502 is sensed in step 528 causing any changed scale name, age range and developmental level to be saved. The program returns to the edit scale procedure 346 of FIG. 11 after step 530 or after the user clicks the cancel button 504 which will not save any changes.

Figure 15:
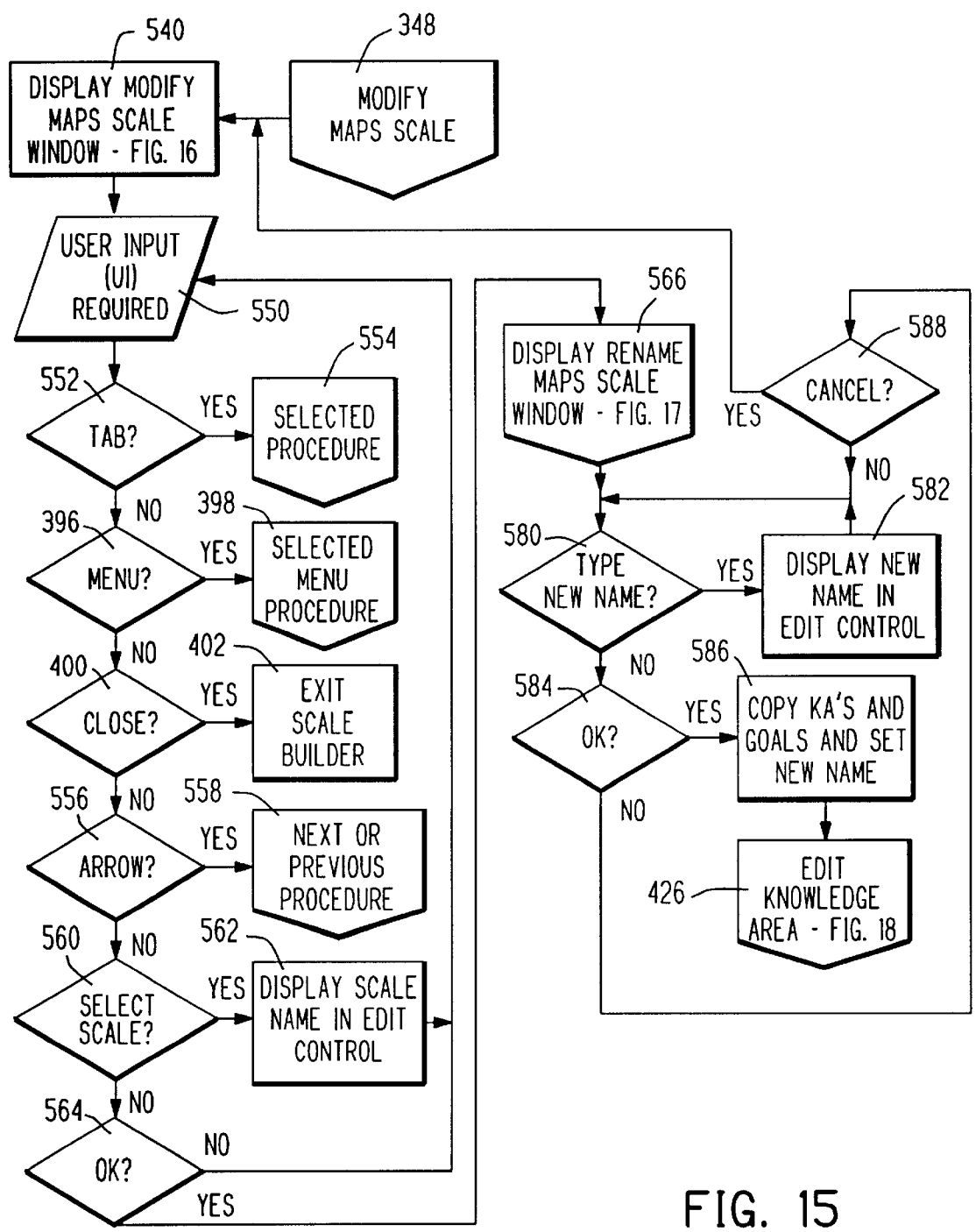
FIG. 15 is a program flow diagram of a modify MAPS scale procedure called from the main procedure of FIG. 7.
Figure 16:
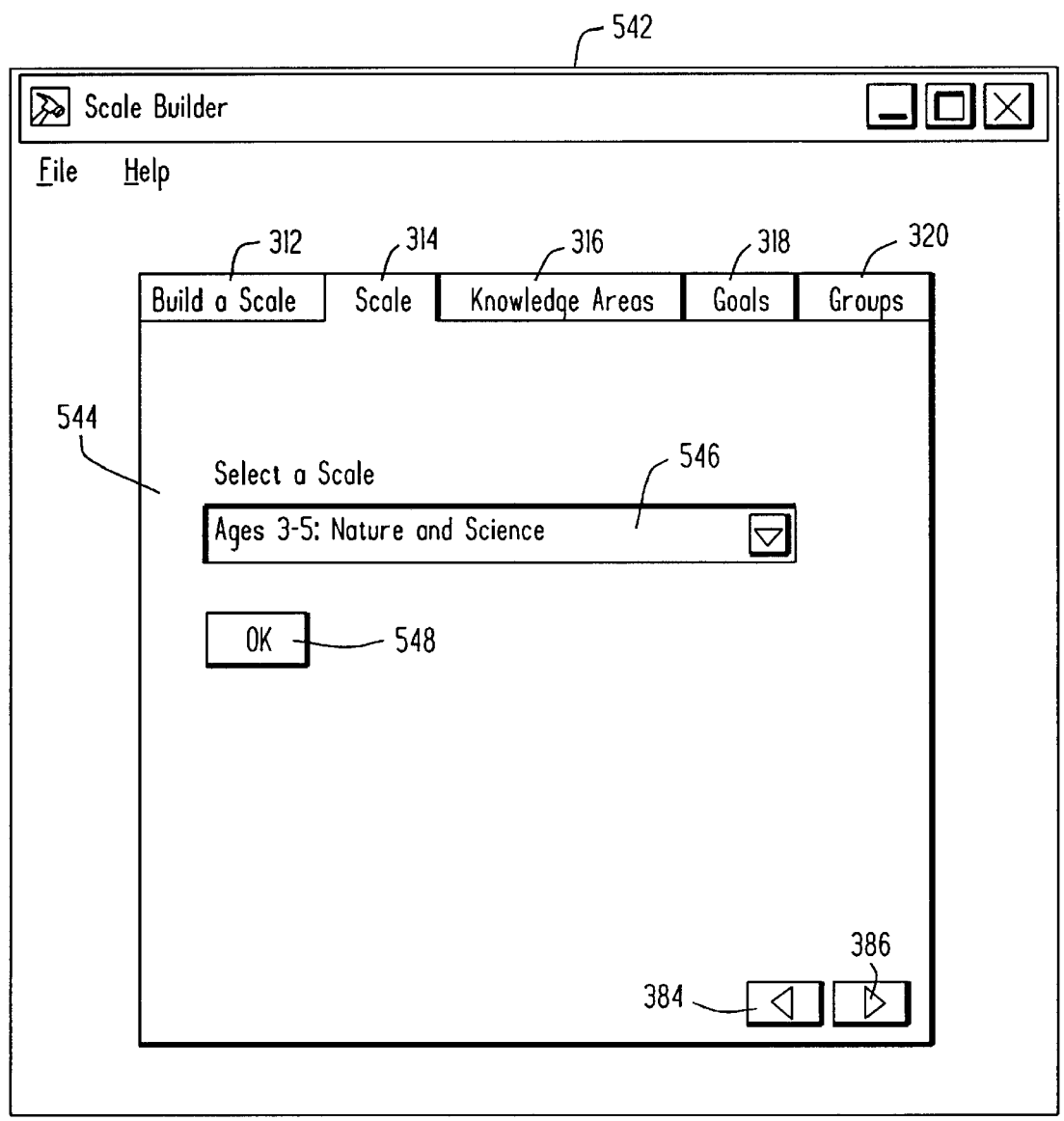
FIG. 16 is an illustration of a modify MAPS scale window displayed on a computer monitor during the procedure of FIG. 15.
Figure 17:
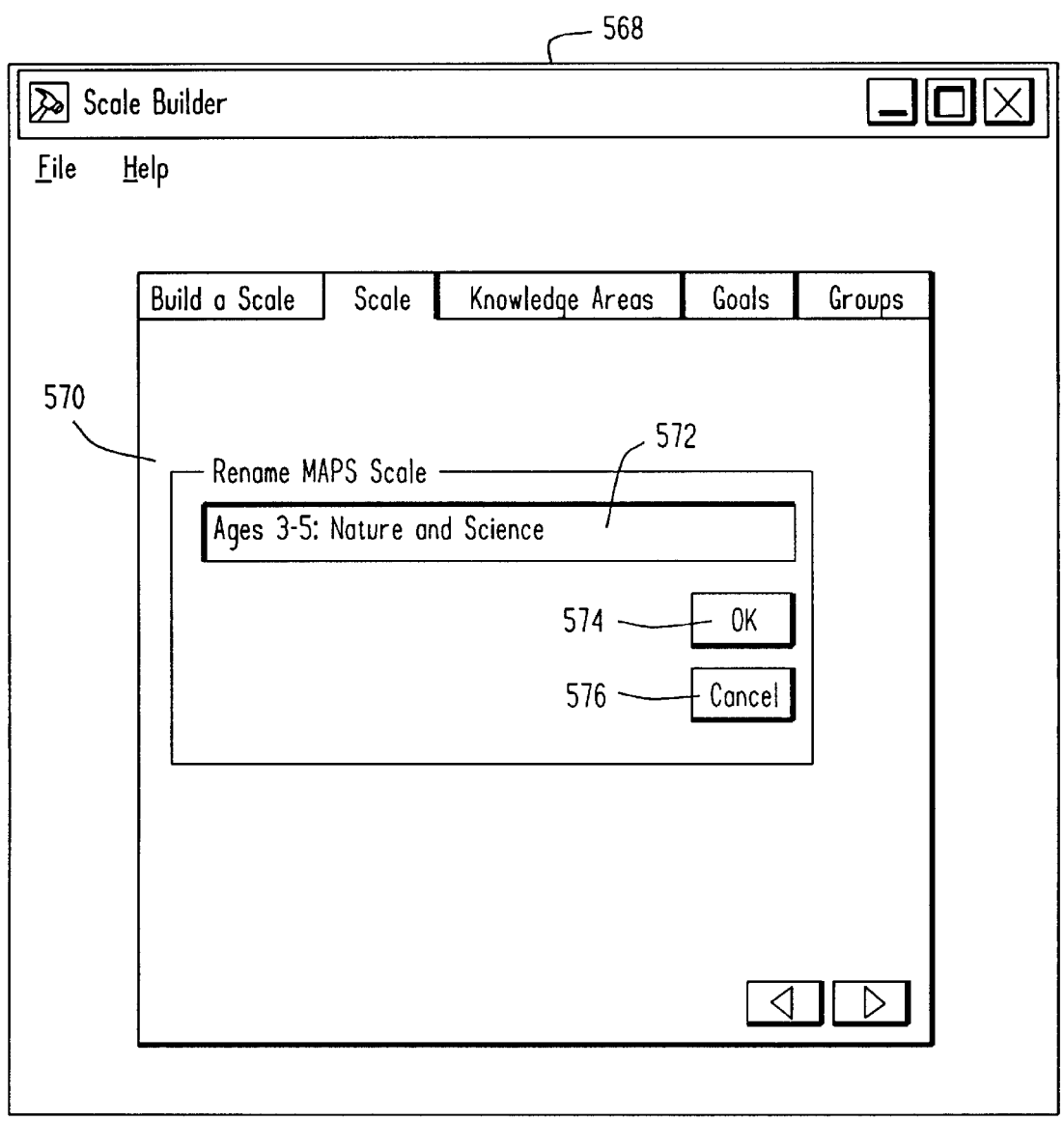
FIG. 17 is an illustration of a rename MAPS scale window displayed on a computer monitor during a portion of the modify MAPS scale procedure of FIG. 15.

The modify maps scale procedure 348 of FIG. 15 called from the main procedure of FIG. 7 in step 540 displays the modify map window 542 of FIG. 16. Under the scale tab 314 the window 542 includes a select MAPS scale folder 544 containing a scale select edit control 546 and an OK button 548. Step 550 enables user input. When the tab 312 is clicked, the program is returned to the build a scale procedure 395 of FIG. 7 by steps 552 and 554. Similarly clicking on the back arrow button 384 causes steps 556 and 558 to return to the procedure 395. Clicking on the forward arrow button 386 results in step 558 advancing to step 566 provided that a scale has been selected in the edit control 546. Steps 560 and 562 enable the user to display a list of MAPS scales (not shown) by clicking the arrow button in the edit control 546 and then selecting one of the listed scales to place in the edit control. Clicking on the OK button 548 is sensed in step 564 to advance to step 566 where the window 568 of FIG. 17 is displayed on the monitor. The window 568 includes a rename MAPS scale folder 570 with a rename MAPS edit control 572, an OK button 574 and a cancel button 576. Typing a new name in the edit control 572 is sensed by step 580 and results in the display of the new name by step 582. Then when the OK button 574 is clicked, step 584 proceeds to step 586 where the new scale name is set and the original MAPS knowledge areas and goals are copied to the newly named scale. From step 586, the program advances to the edit knowledge area procedure 426 of FIG. 18. If the cancel button 576 of FIG. 17 is selected, step 588 returns the procedure to step 540 and the MAPS scale window 542 of FIG. 16.

Figure 18:
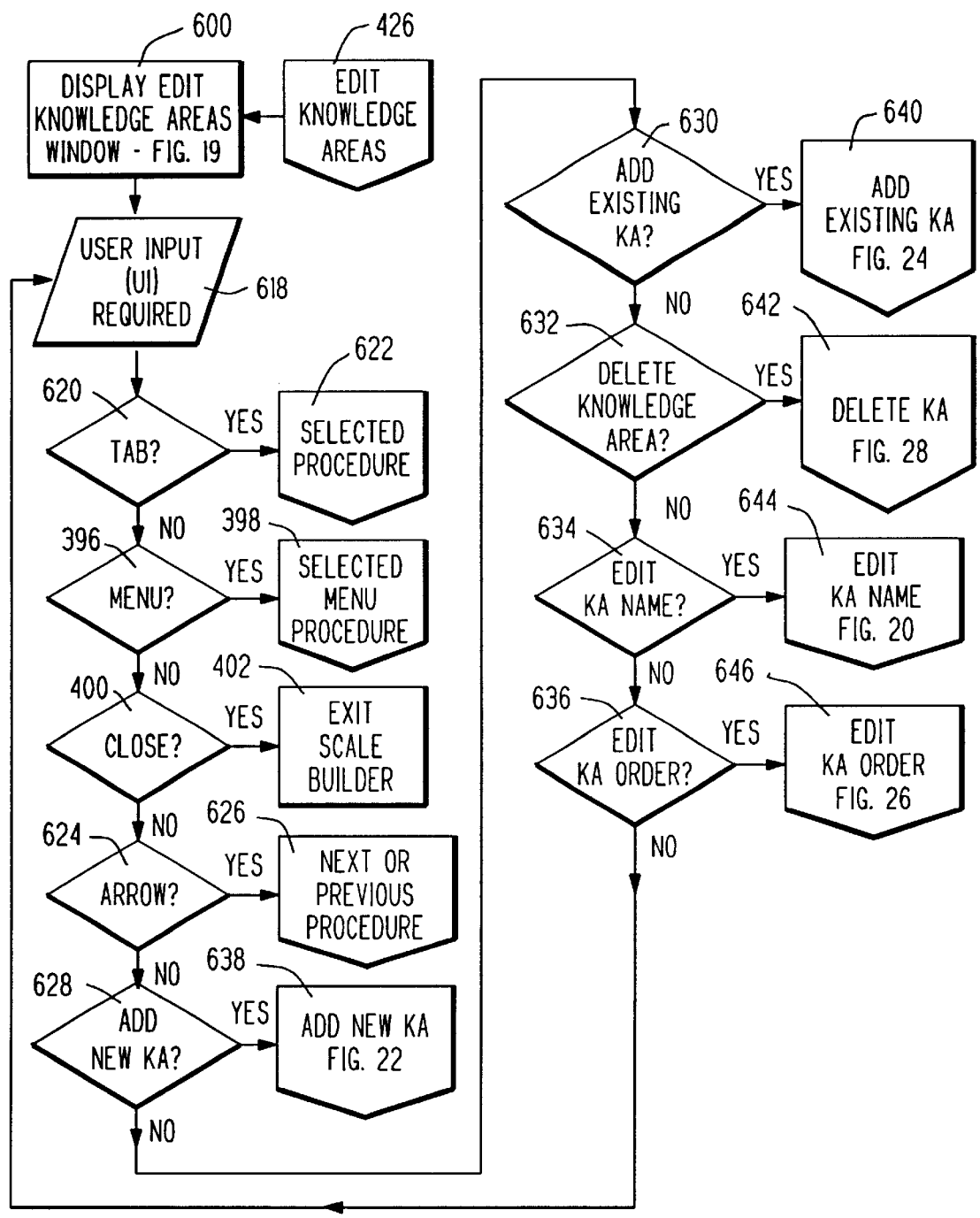
FIG. 18 is a program flow diagram of an edit knowledge area procedure called from the main procedure of FIG. 7, the edit scale procedure of FIG. 11 and the modify MAPS scale procedure of FIG. 15.
Figure 19:
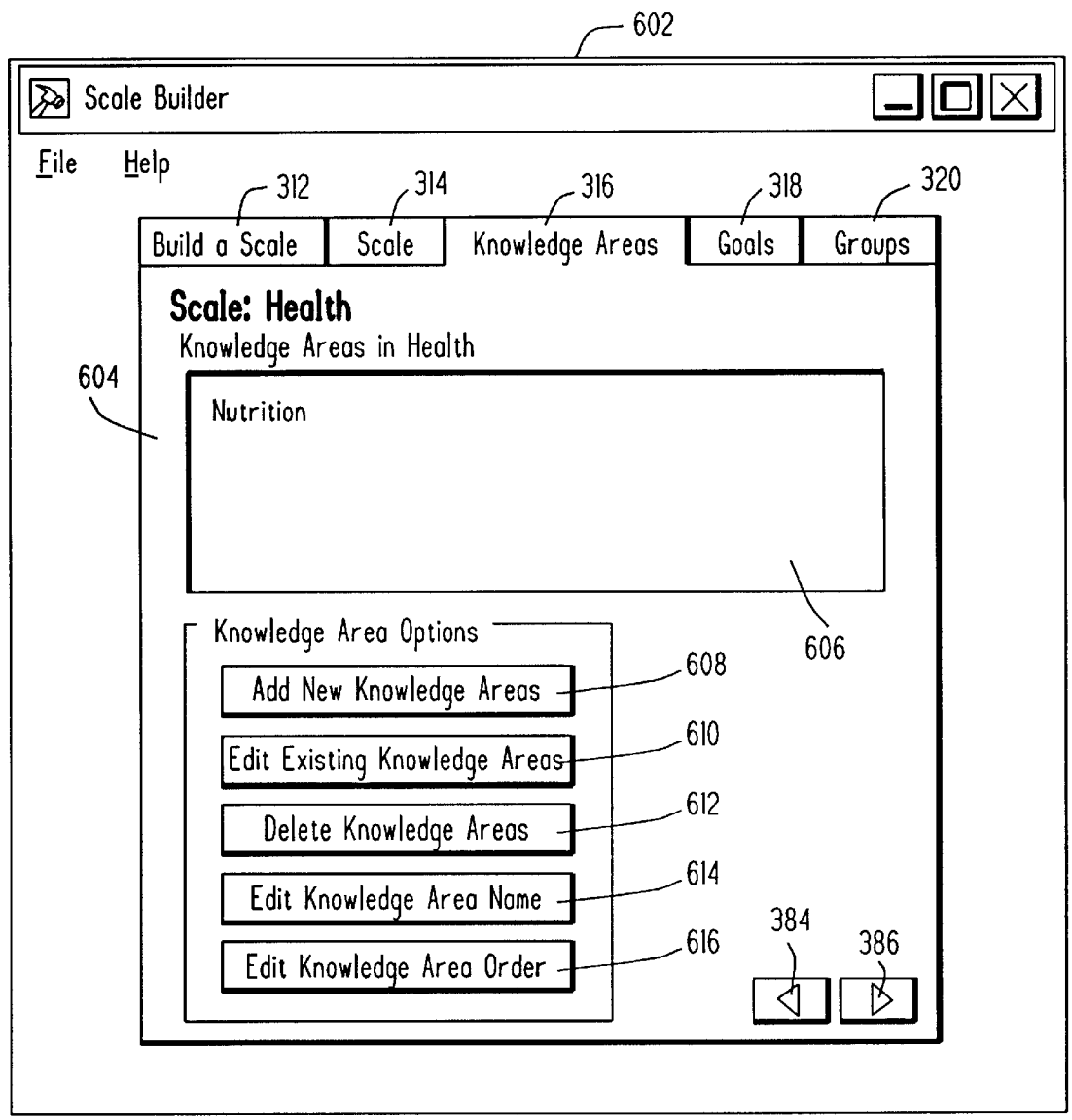
FIG. 19 is an illustration of an edit knowledge area window displayed on a computer monitor during the procedure of FIG. 18.

In the edit knowledge areas procedure 426 of FIG. 18 called by the write new scale procedure 344 of FIG. 9, the edit scale procedure 346 of FIG. 11 or the modify MAPS scale procedure 348 of FIG. 15, step 600 displays an edit knowledge areas window 602 in FIG. 19. The window 602 includes an edit knowledge area window under the knowledge area tab 316 which includes a scale selection box 606 containing a list of the knowledge areas in the previously selected scale, an add new knowledge area button 608, an add existing knowledge area button 610, a delete knowledge area button 612, an edit knowledge area name button 614 and an edit knowledge area order button 616. User input is enabled in step 618. If the scale tab 314 is clicked or the back arrow button 384 is clicked, steps 620 and 622 or steps 624 and 626 return the program to the procedure, the write new scale procedure 344 of FIG. 9, the edit scale procedure 346 of FIG. 11 or the modify MAPS scale procedure 348 of FIG. 15, which called the edit knowledge area procedure. Clicking on one of the buttons, the add new knowledge area button 608, the add existing knowledge area button 610, the delete knowledge area button 612, the edit knowledge area name button 614 and the edit knowledge area order button 616, is sensed by the corresponding step 628, 630, 632, 634 and 636 to proceed to the respective add new knowledge area procedure 638 of FIG. 22, add existing knowledge area procedure 640 of FIG. 24, delete knowledge area procedure 642 of FIG. 28, edit knowledge area name procedure 644 of FIG. 20 and edit knowledge area order procedure of FIG. 26. Before advancing to the edit knowledge area name procedure 644, the user must have selected (clicked and highlighted) a knowledge area listed in the box 606.

Figure 20:
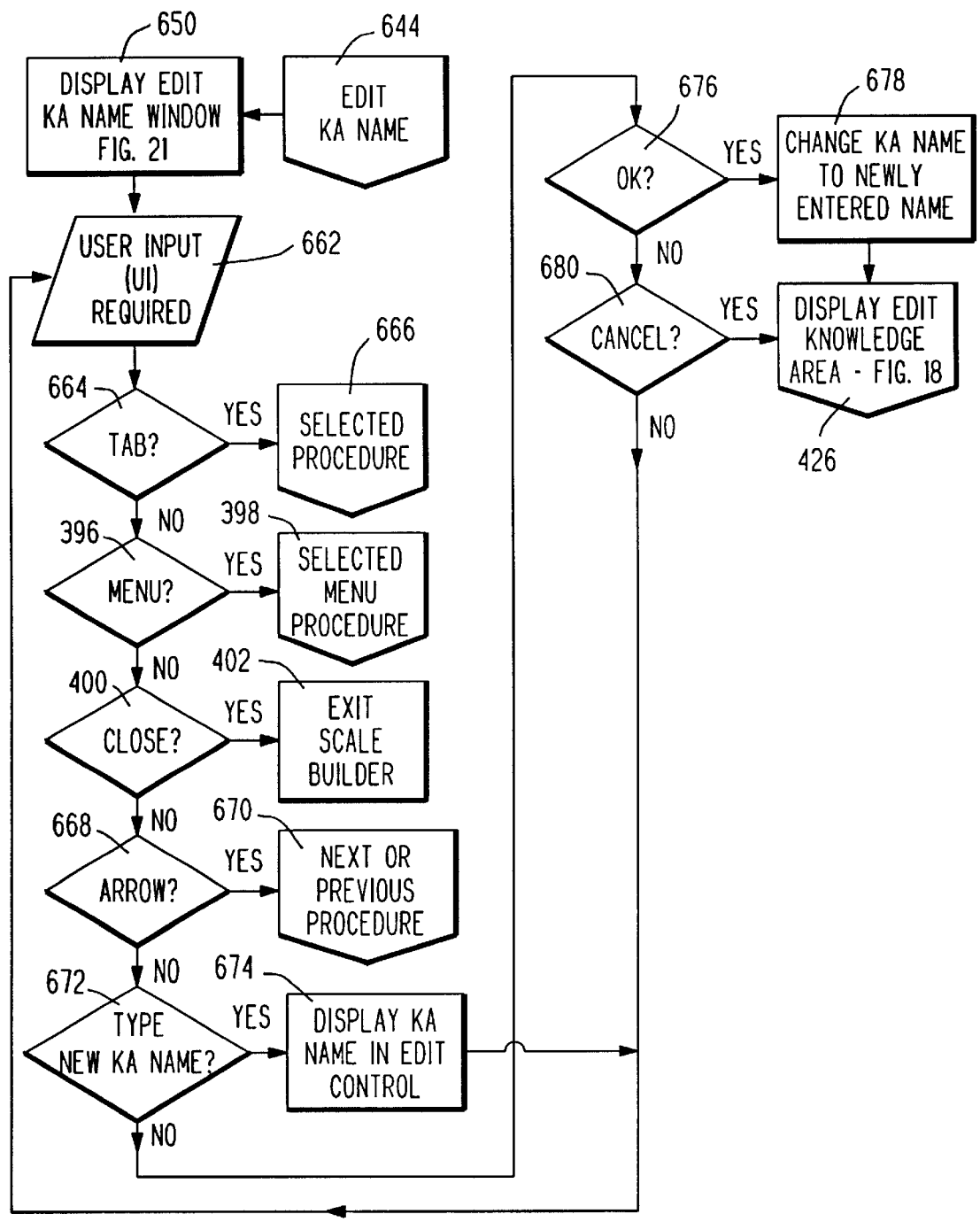
FIG. 20 is a program flow diagram of an edit knowledge area name procedure called from the edit knowledge area procedure of FIG. 18.
Figure 21:
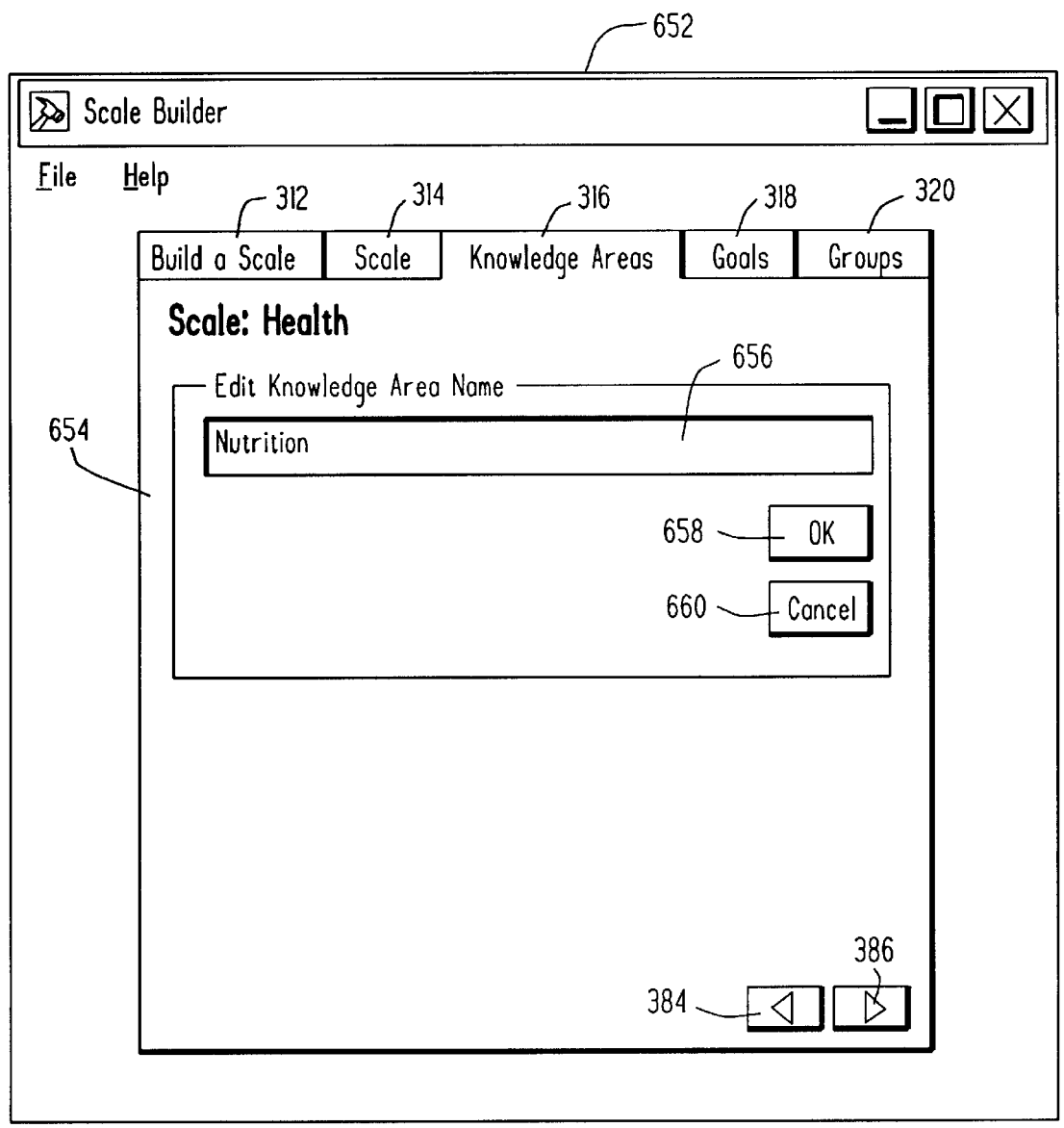
FIG. 21 is an illustration of an edit knowledge area name window displayed on a computer monitor during the procedure of FIG. 20.

The edit knowledge area name procedure 644, FIG. 20, starts with step 650 where an edit knowledge area name window 652, FIG. 21, is displayed on the monitor. The window 652 includes an edit knowledge area name folder 654 under the knowledge area tab 316. This folder 654 includes a knowledge area name edit control 656 along with an OK button 658 and a cancel button 660. After window is displayed, step 662 enables user input. If the scale tab 314 is clicked, steps 664 and 666 return the program to the procedure, the write new scale procedure 344 of FIG. 9, the edit scale procedure 346 of FIG. 11 or the modify MAPS scale procedure 348 of FIG. 15, which called the edit knowledge area procedure. If the back arrow button 384 is clicked, steps 668 and 670 return the program to the edit knowledge area procedure 426 of FIG. 18. Step 672 senses the editing of a name in the edit control 656 and 674 displays the edited name. When the user clicks the OK button 658, step 676 branches to step 678 where the changed name replaces the previously saved name. If step 680 senses a click on the cancel button 660, the program returns to the edit knowledge area procedure 426 of FIG. 18.

Figure 22:
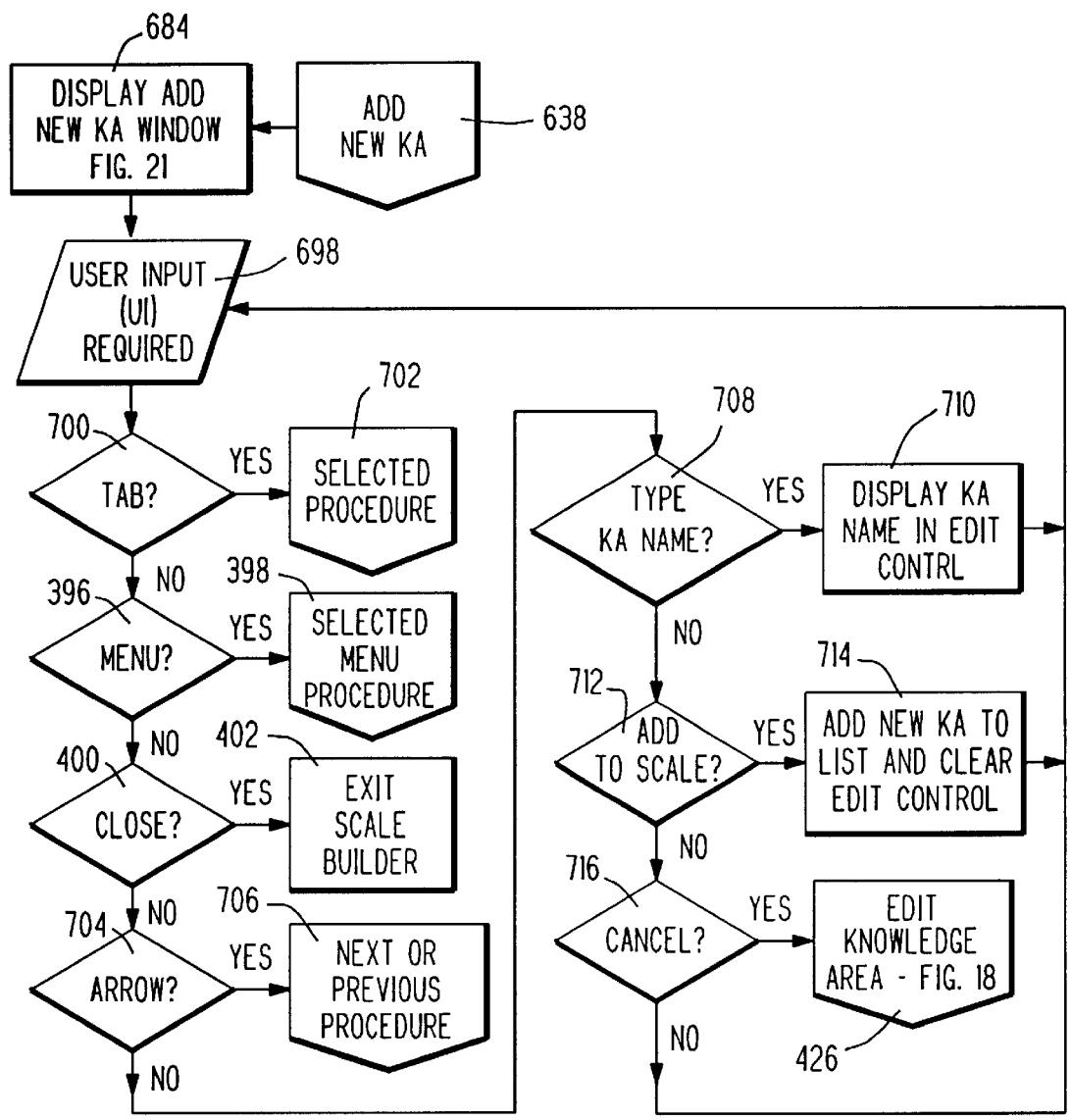
FIG. 22 is a program flow diagram of an add new knowledge area procedure called from the edit knowledge area procedure of FIG. 18.
Figure 23:
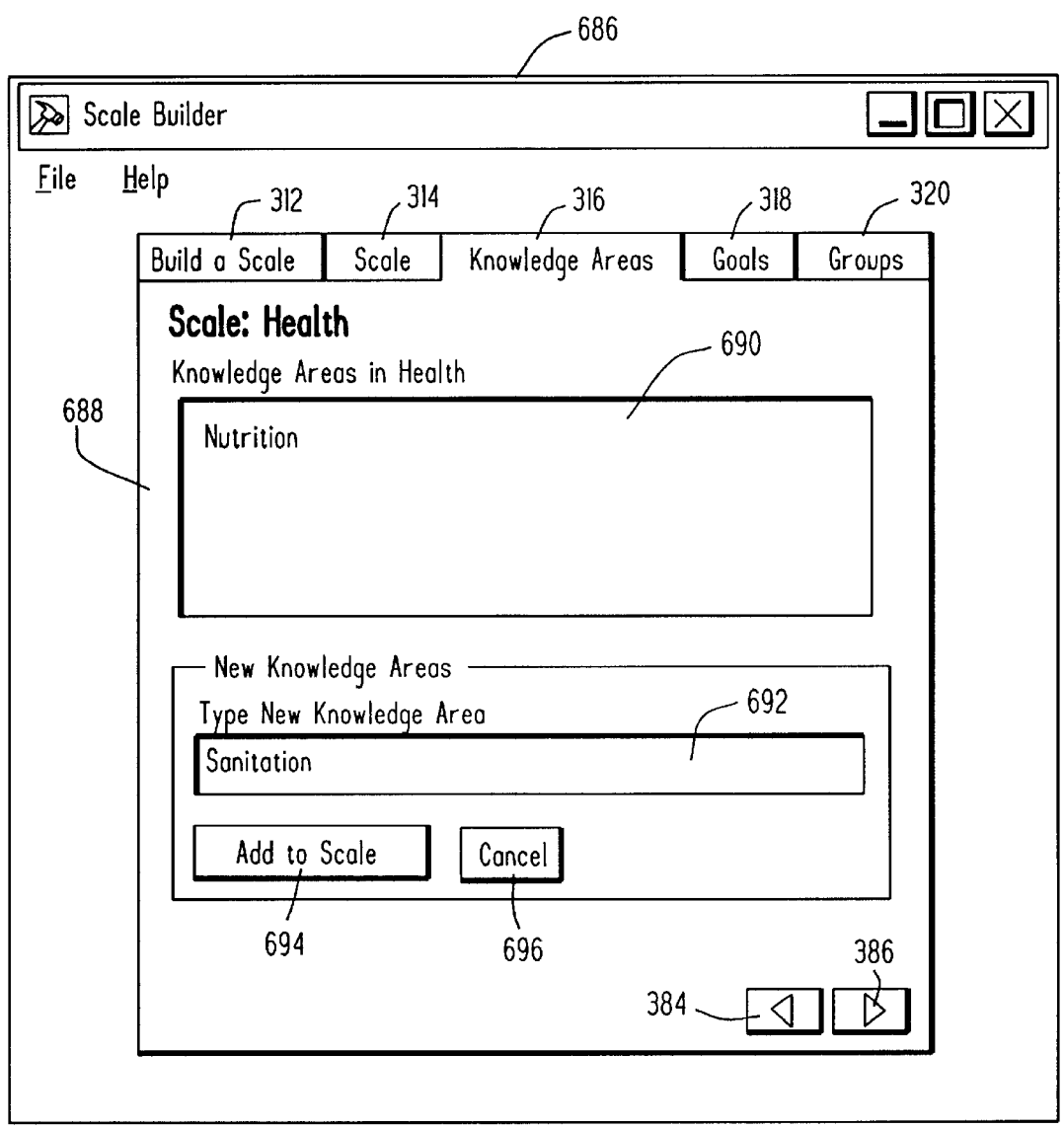
FIG. 23 is an illustration of an add new knowledge area window displayed on a computer monitor during the procedure of FIG. 22.

When the add new knowledge area procedure 638 of FIG. 22 is called from FIG. 18, step 684 displays an add new knowledge area window 686, FIG. 23, on the monitor. The window 686 includes an add knowledge area folder 688 under the knowledge area tab 316. This folder includes a list box 690 listing all the knowledge areas in the current scale along with a new knowledge area edit control 692, an add to scale button 694 and a cancel button 696. User input is enabled in step 698. If the scale tab 314 is clicked, steps 700 and 702 return the program to the procedure, the write new scale procedure 344 of FIG. 9, the edit scale procedure 346 of FIG. 11 or the modify MAPS scale procedure 348 of FIG. 15, which called the edit knowledge area procedure. If the back arrow button 384 is clicked, steps 704 and 706 return the program to the edit knowledge area procedure 426 of FIG. 18. Steps 708 and 710 allow the user to type in a new knowledge area name in the edit control 692. Clicking on the add to scale button 694 is sensed in step 712 to proceed to step 714 where the newly typed knowledge area name is added to the list box 690 and the edit control 692 is cleared to allow entry of a new knowledge area name. Step 716 responds to clicking on the cancel button to return the program to the edit knowledge area procedure 426 of FIG. 18.

Figure 24:
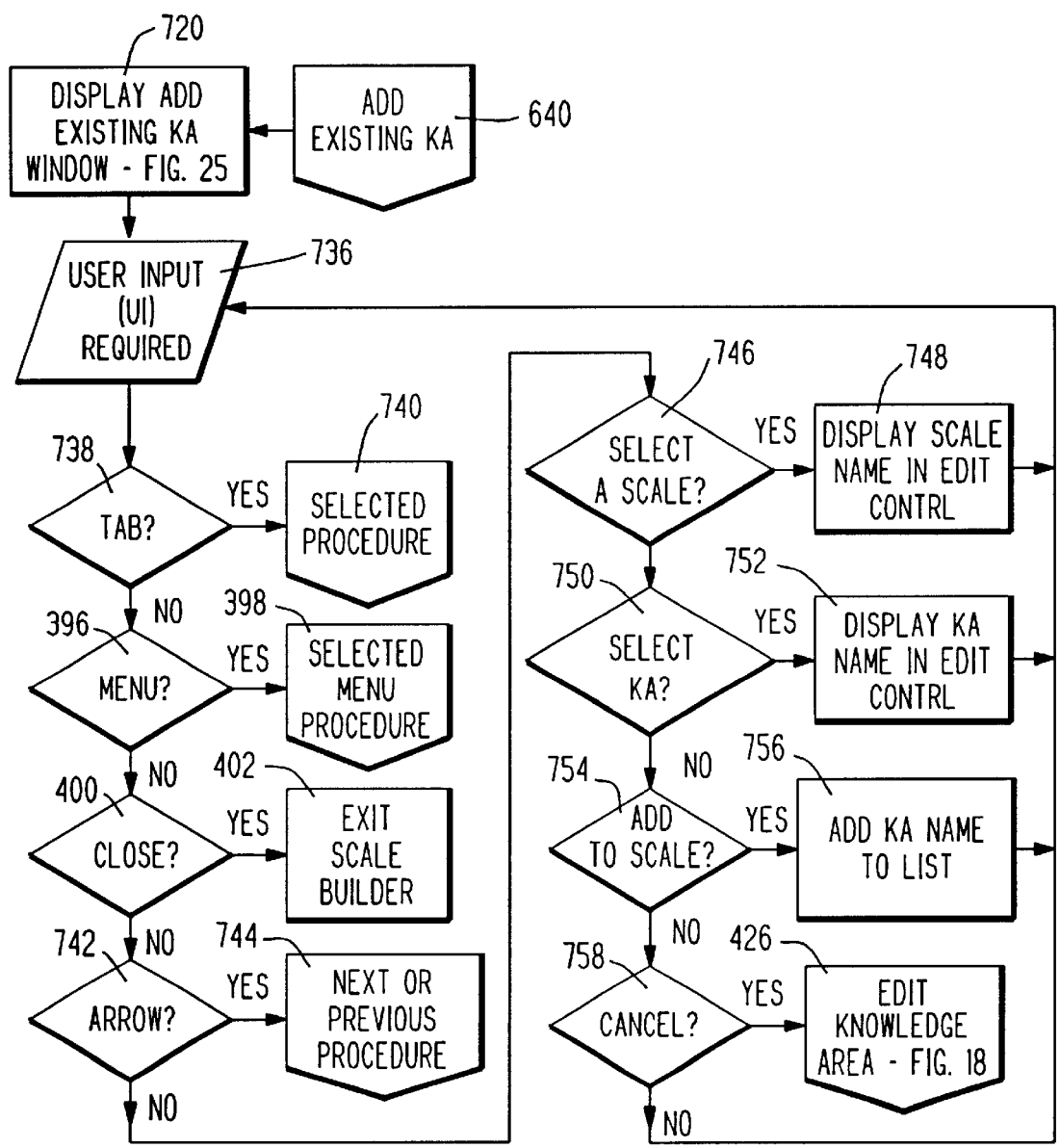
FIG. 24 is a program flow diagram of an add existing knowledge area procedure called from the edit knowledge area procedure of FIG. 18.
Figure 25:
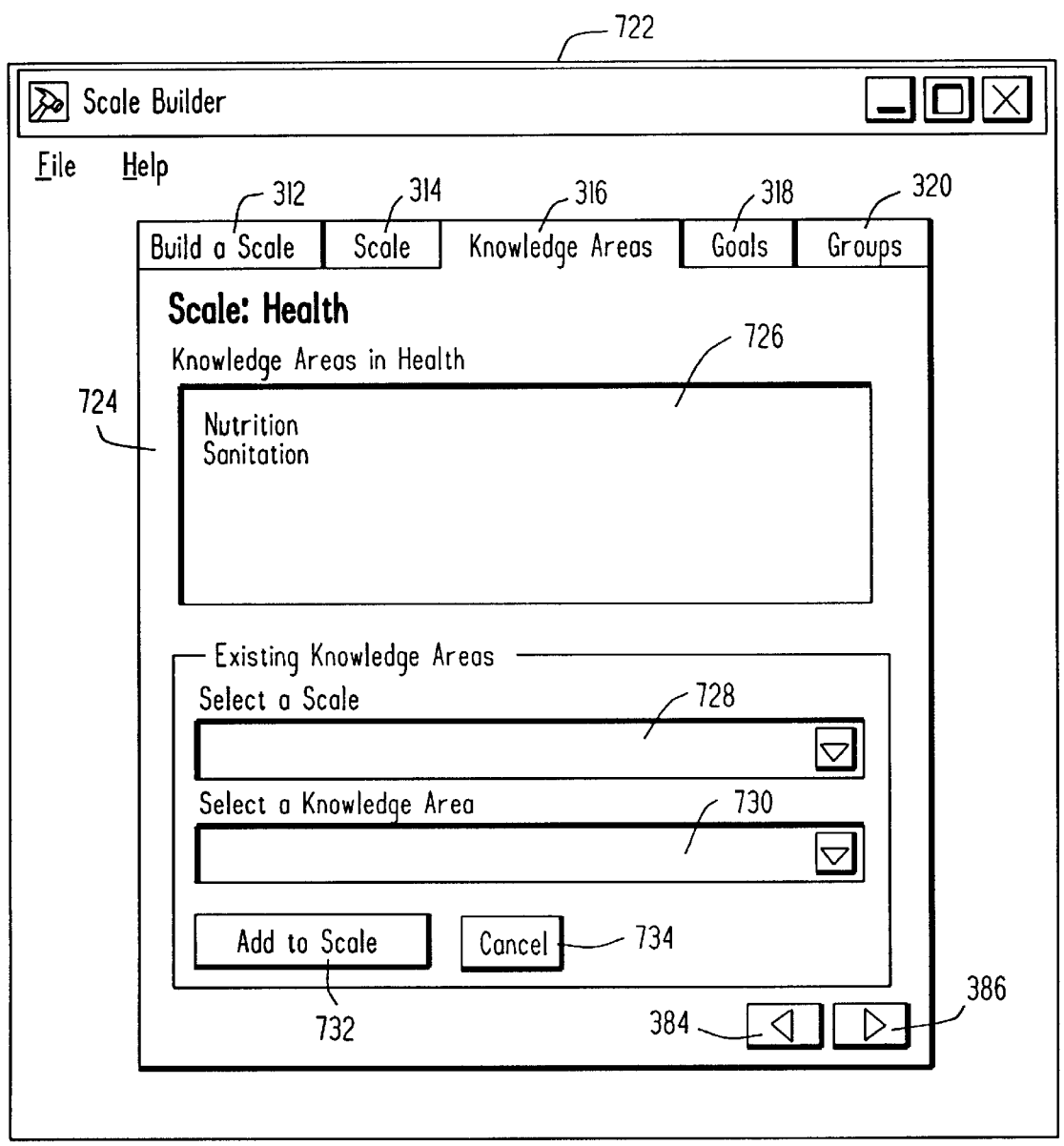
FIG. 25 is an illustration of an add existing knowledge area window displayed on a computer monitor during the procedure of FIG. 24.

Calling the add existing knowledge area procedure 640 of FIG. 24 from the edit knowledge area procedure results in step 720 displaying an add existing knowledge area window 722, FIG. 25, on the monitor. The window 722 includes an add existing knowledge area folder 724 under the knowledge area tab 316. The folder 724 has a knowledge area list box 726 listing all the knowledge areas currently in the selected scale. Additionally, the folder 724 includes a select a scale edit control 728, a select a knowledge area edit control 730, an add to scale button 732 and a cancel button 734. User input is enabled in step 736. If the scale tab 314 is clicked, steps 738 and 740 return the program to the procedure, the write new scale procedure 344 of FIG. 9, the edit scale procedure 346 of FIG. 11 or the modify MAPS scale procedure 348 of FIG. 15, which called the edit knowledge area procedure. If the back arrow button 384 is clicked, steps 742 and 744 return the program to the edit knowledge area procedure 426 of FIG. 18. During steps 746 and 748, clicking on the arrow button in the select a scale edit control 728 displays a list of scales (not shown) from which the user selects a scale which is displayed in the edit control 728. Once a scale is selected, the user can display a list of the knowledge areas in the selected scale by clicking on the arrow button in the select a knowledge area edit control. In steps 750 and 752, the user selects the desired knowledge area which is then displayed in the edit control 734. Clicking on the add to scale button 732 is sensed by step 754 which branches to step 756 to add the selected knowledge area to the list in the list box 726. If the user clicks on the cancel button 734, step 758 returns the program to the edit knowledge area procedure 426.

Figure 26:
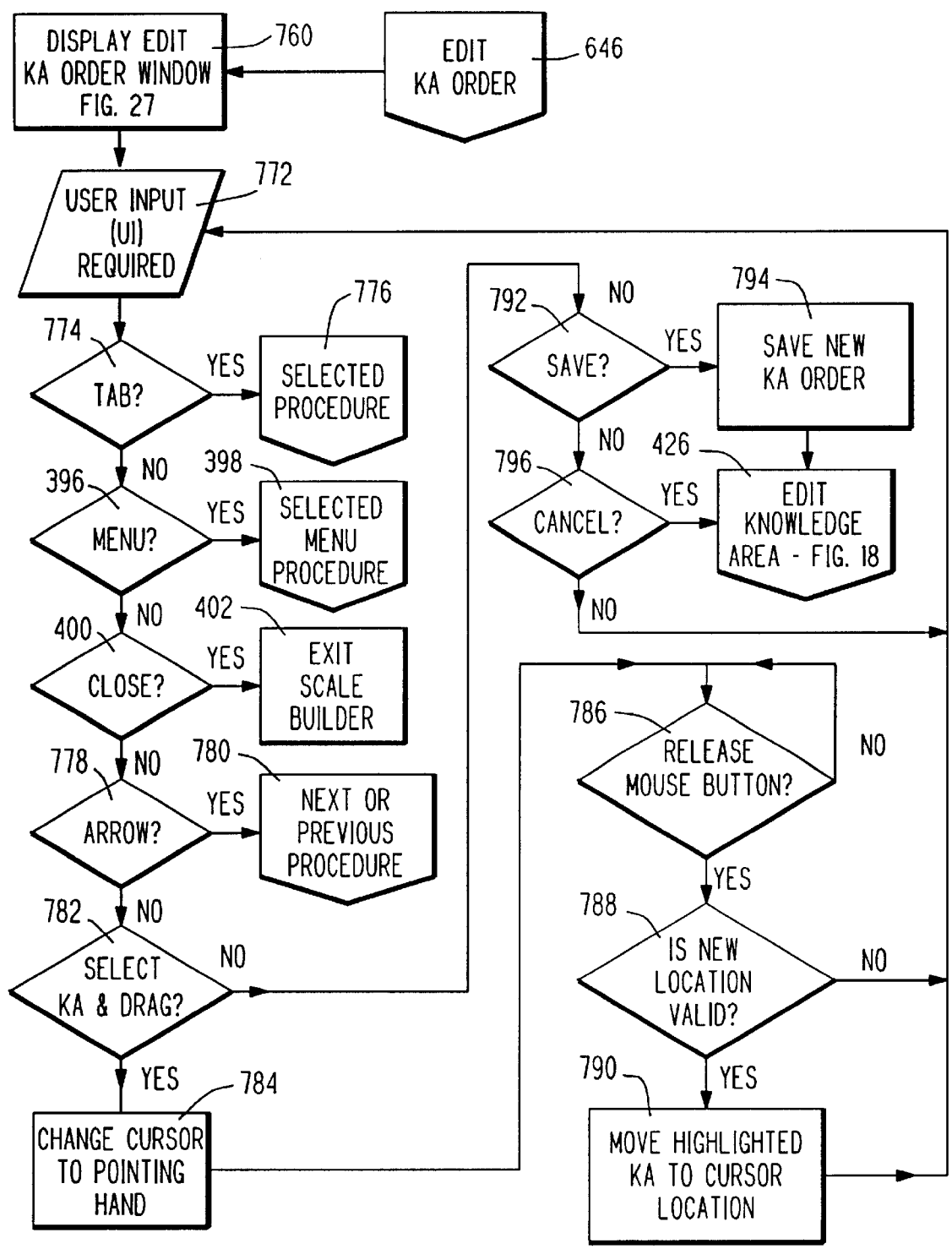
FIG. 26 is a program flow diagram of an edit knowledge area order procedure called from the edit knowledge area procedure of FIG. 18.
Figure 27:
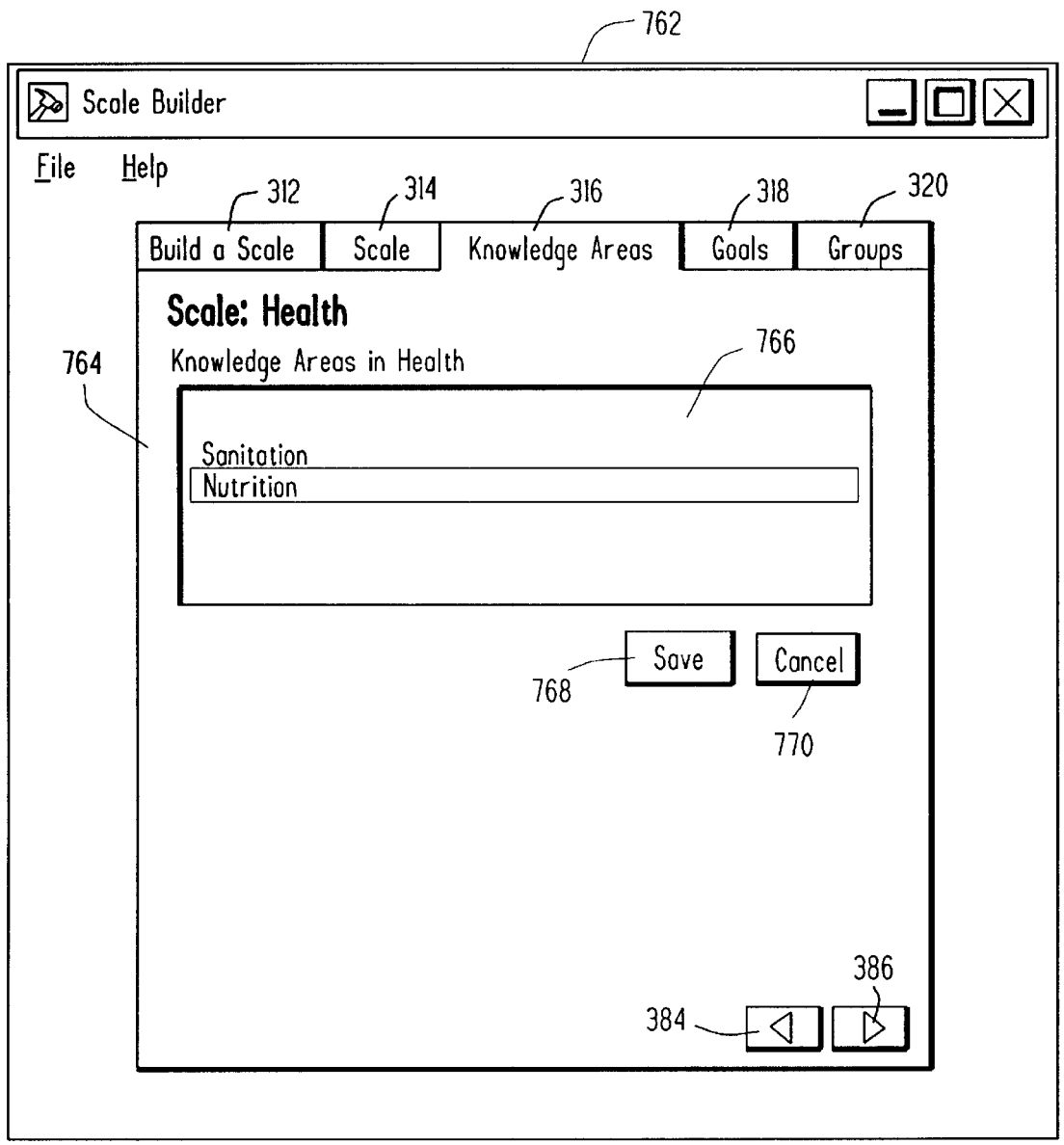
FIG. 27 is an illustration of an edit knowledge area order window displayed on a computer monitor during the procedure of FIG. 26.

In the edit knowledge area order procedure 646 of FIG. 26 called from the edit knowledge area procedure, step 760 displays an edit knowledge area order window 762, FIG. 27, on the monitor. Under the knowledge area tab 316, the window 762 contains an edit knowledge area order folder 764 which includes a knowledge area list box 766, a save button 768 and a cancel button 770. User input is enabled in step 772. If the scale tab 314 is clicked, steps 774 and 776 return the program to the procedure, the write new scale procedure 344 of FIG. 9, the edit scale procedure 346 of FIG. 11 or the modify MAPS scale procedure 348 of FIG. 15, which called the edit knowledge area procedure. If the back arrow button 384 is clicked, steps 778 and 780 return the program to the edit knowledge area procedure 426 of FIG. 18. Step 782 detects a user select and drag function to change the cursor in step 784 to a pointing hand in box 766. Depressing a left mouse button (not shown) when the cursor points to one of the knowledge area names listed in the box 766 highlights the selected knowledge area. While maintaining the left mouse button depressed, the user can move the highlighted name to a new location. For example, "Nutrition" in the position shown in box 726 of FIG. 25 can be moved down to the position of "Sanitation". Release of the mouse button is detected in step 786 and step 788 determines if the new location of the highlighted name is a valid location. If true, then step 790 moves the highlighted knowledge area to the new location and correspondingly changes other names in the list. For example, highlighted "Nutrition" in FIG. 27 is moved down to the previous location "Sanitation" and "Sanitation" is moved up. Clicking on the save button 768 is sensed in step 792 to result in saving the new knowledge area order in step 794 and return to the edit knowledge area procedure 426. Clicking on the cancel button 770 is sensed in step 796 to return the program to the edit knowledge area procedure without saving any new order of the knowledge area names.

Figure 28:
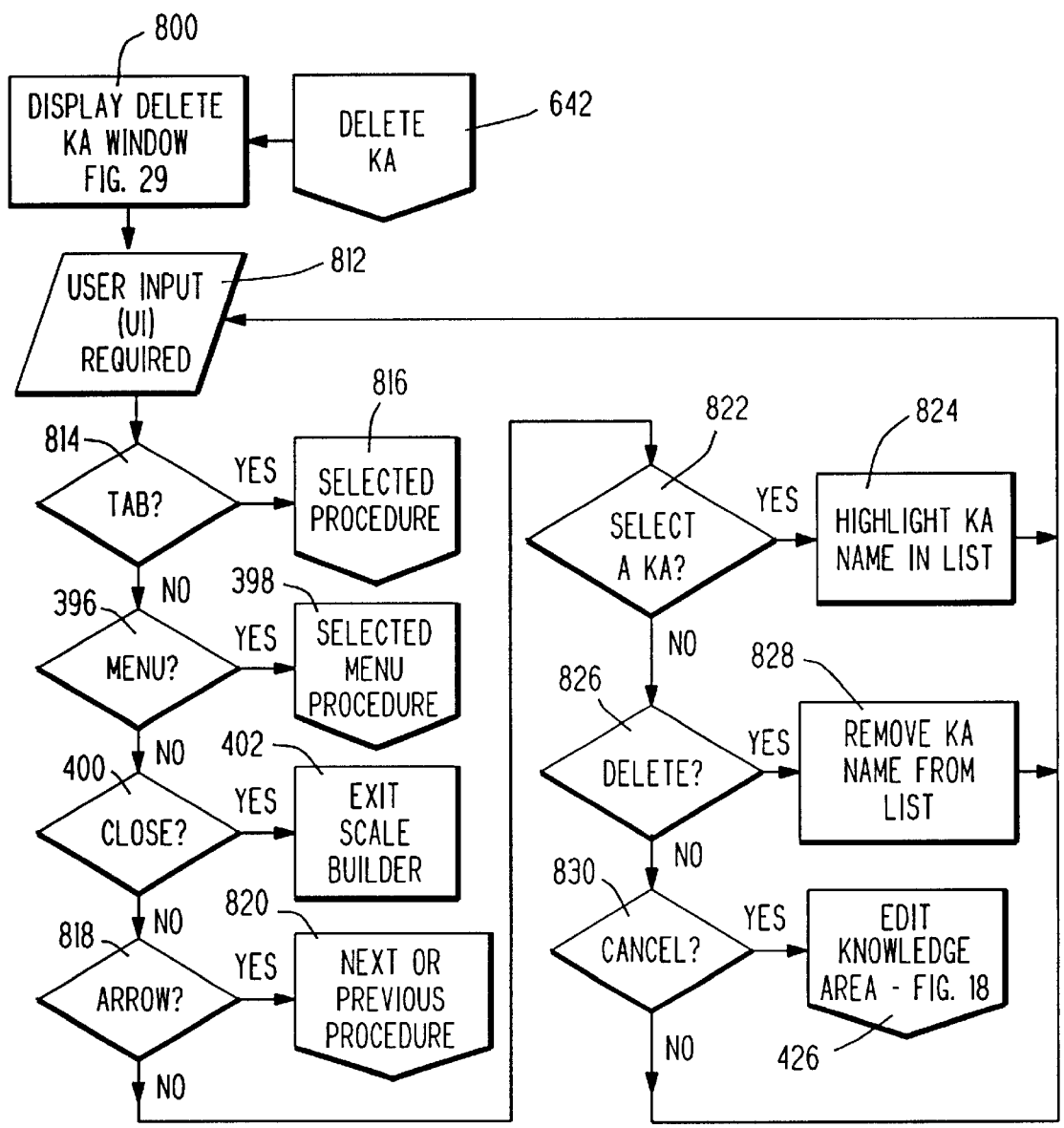
FIG. 28 is a program flow diagram of a delete knowledge area procedure called from the edit knowledge area procedure of FIG. 18.
Figure 29:
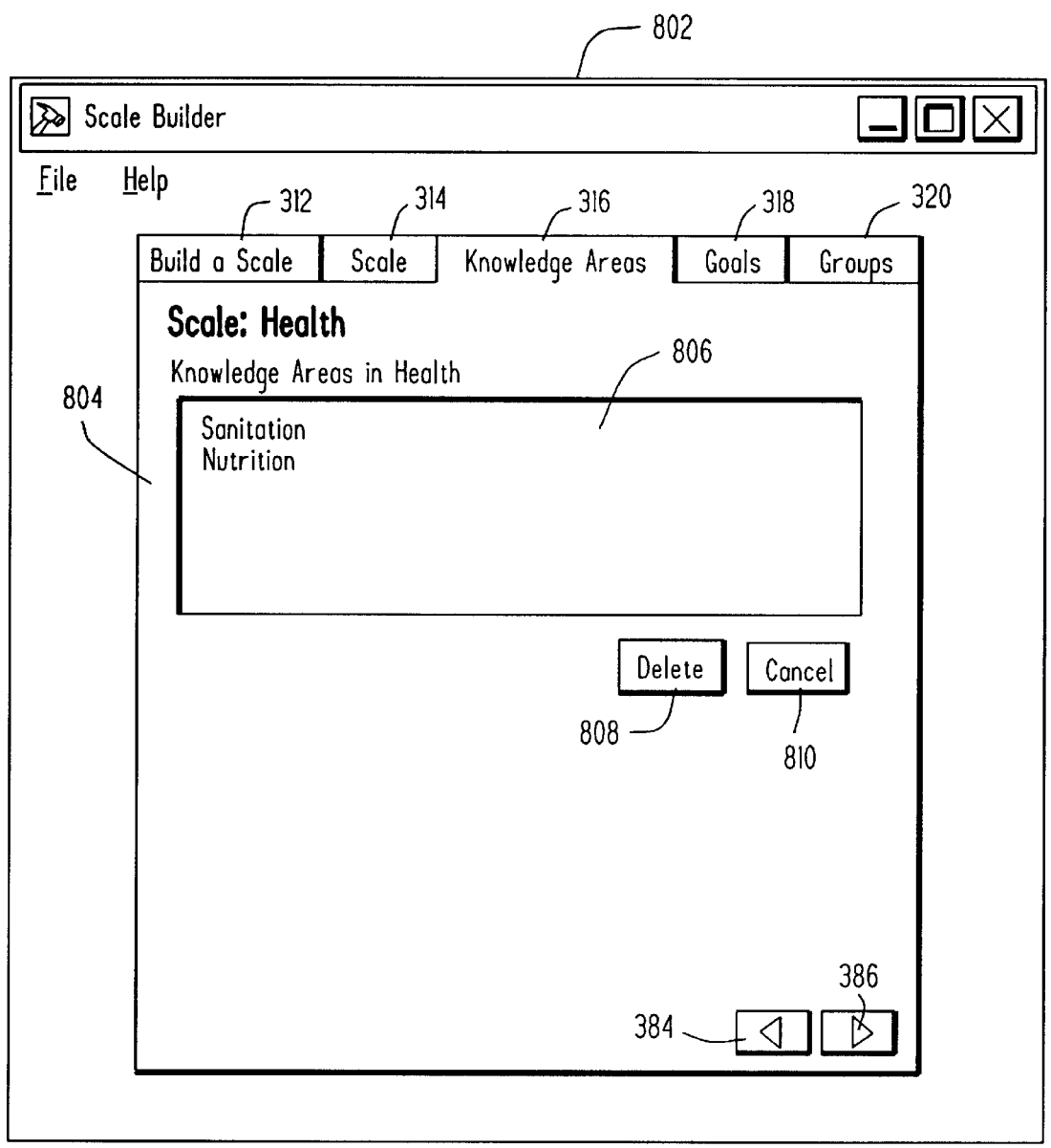
FIG. 29 is an illustration of a delete knowledge area window displayed on a computer monitor during the procedure of FIG. 28.

When the delete knowledge area procedure of FIG. 28 is called, step 800 displays a delete knowledge area window 802 in FIG. 29. The window 802 includes a delete folder 804 under the knowledge are tab 316. This folder 804 contains a knowledge area list box 806, a delete button 808 and a cancel button 810. Step 812 enables user input. If the scale tab 314 is clicked, steps 814 and 816 return the program to the procedure, the write new scale procedure 344 of FIG. 9, the edit scale procedure 346 of FIG. 11 or the modify MAPS scale procedure 348 of FIG. 15, which called the edit knowledge area procedure. If the back arrow button 384 is clicked, steps 818 and 820 return the program to the edit knowledge area procedure 426 of FIG. 18. Step 822 senses clicking on one of the knowledge area names listed in the box 806 and step 824 highlights the selected knowledge area name. When the delete button 808 is clicked, step 826 branches to step 828 where the highlighted knowledge area is deleted from the list in the box 806. Clicking on the cancel button 810 is detected in step 830 to return the program to the edit knowledge area procedure 426.

Figure 30:
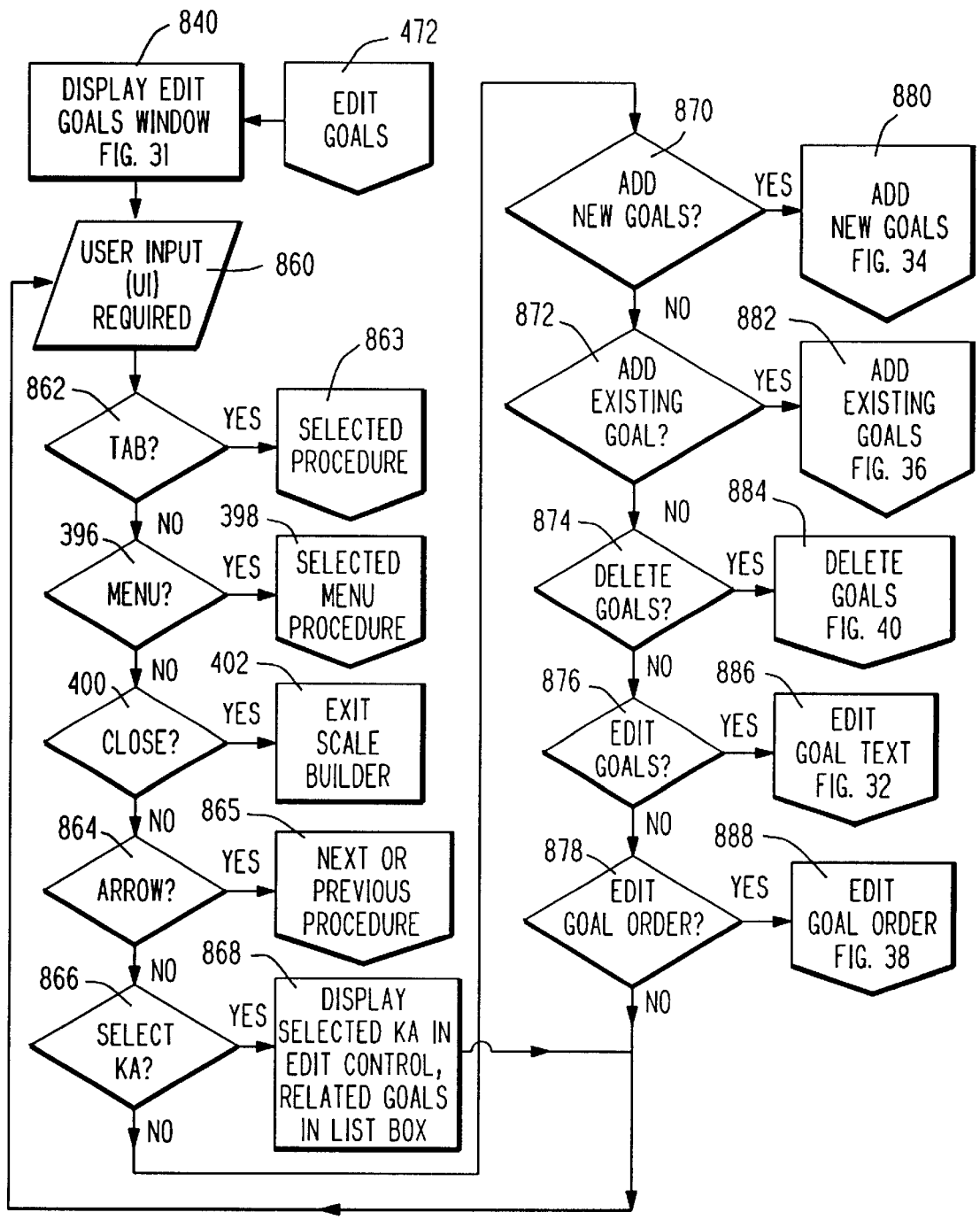
FIG. 30 is a program flow diagram of an edit goals procedure called from the main procedure of FIG. 7.
Figure 31:
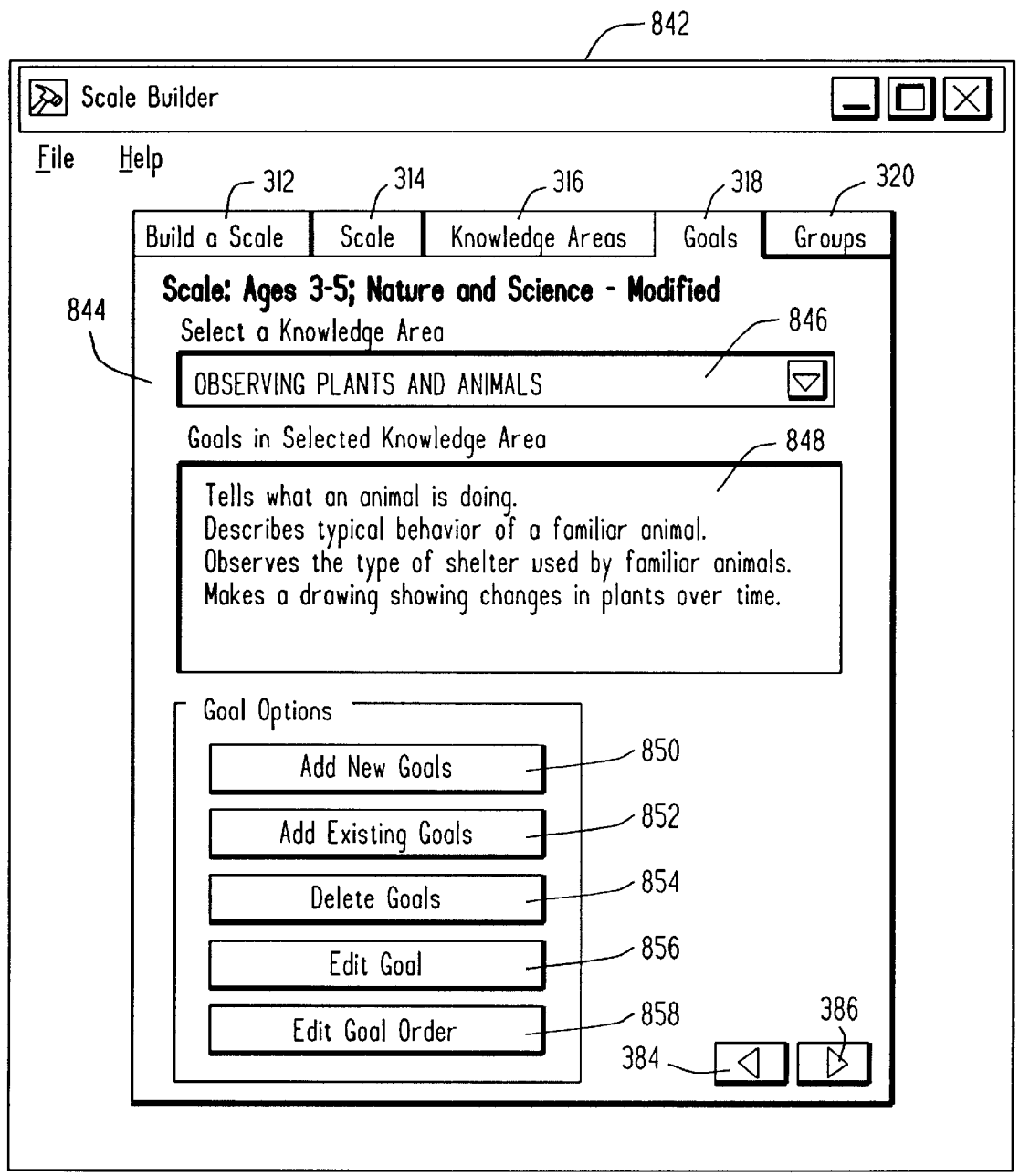
FIG. 31 is an illustration of an edit goals window displayed on a computer monitor during the procedure of FIG. 30.
Figure 38:
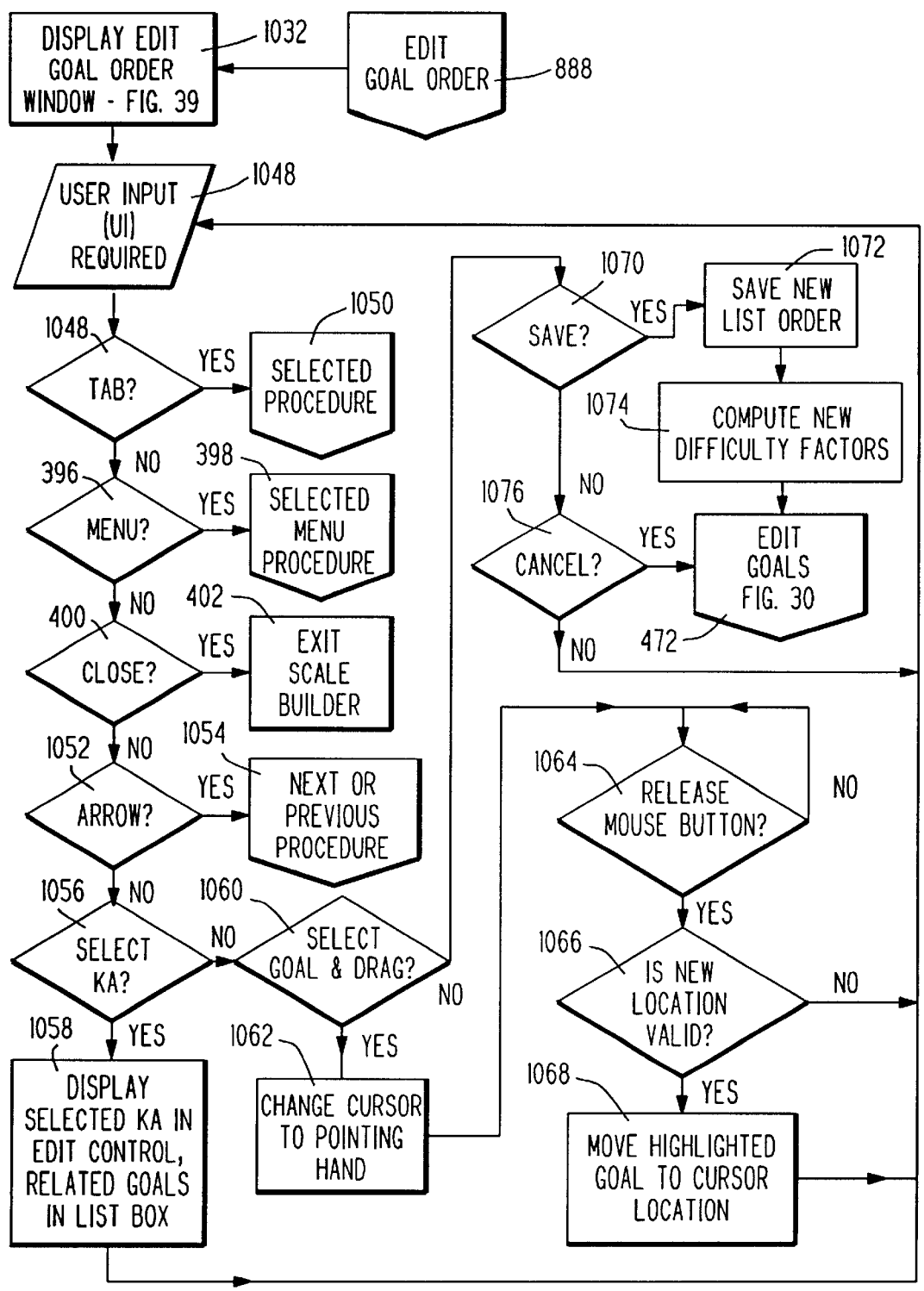
FIG. 38 is a program flow diagram of an edit goal order procedure called from the edit goals procedure of FIG. 30.

The edit goals procedure 472 of FIG. 30 is called from the edit scale procedure of FIG. 11. In step 840 an edit goals window 842, FIG. 31, is displayed on the computer monitor. This window 842 includes, under the goals tab 318, an edit goals folder 844 containing a select knowledge area edit control 846, a goals list box 848, an add new goals button 850, an add existing goals button 852, a delete goals button 854, an edit goal button 856 and an edit goal order button 858. Step 860 enables user input. When the scale tab 3 14 is selected, steps 862 and 863 return the program to the edit scale procedure of FIG. 11. Similarly clicking on the back arrow button 384 returns the program to the edit scale procedure of FIG. 11. Step 866 senses the selection of a knowledge area from a knowledge area list (not shown) displayed when the arrow in the select knowledge area edit control 846 is clicked. When the knowledge area is selected, step 868 displays the selected knowledge area in the select knowledge area edit control 846 and displays the goals of the selected knowledge area in the goals list box 848. A goal can then be selected in the goal list box 848. When one of the add new goals button 850, add existing goal button 852, delete goal button 854, edit goal button 856 and edit goal order button 858 is clicked, the program proceeds to the corresponding procedure, add new goals 880 of FIG. 34, add existing goals 882 of FIG. 36, delete goals 884 of FIG. 40, edit goal text 886 of FIG. 32 and edit goal order 888 of FIG. 38.

Figure 32:
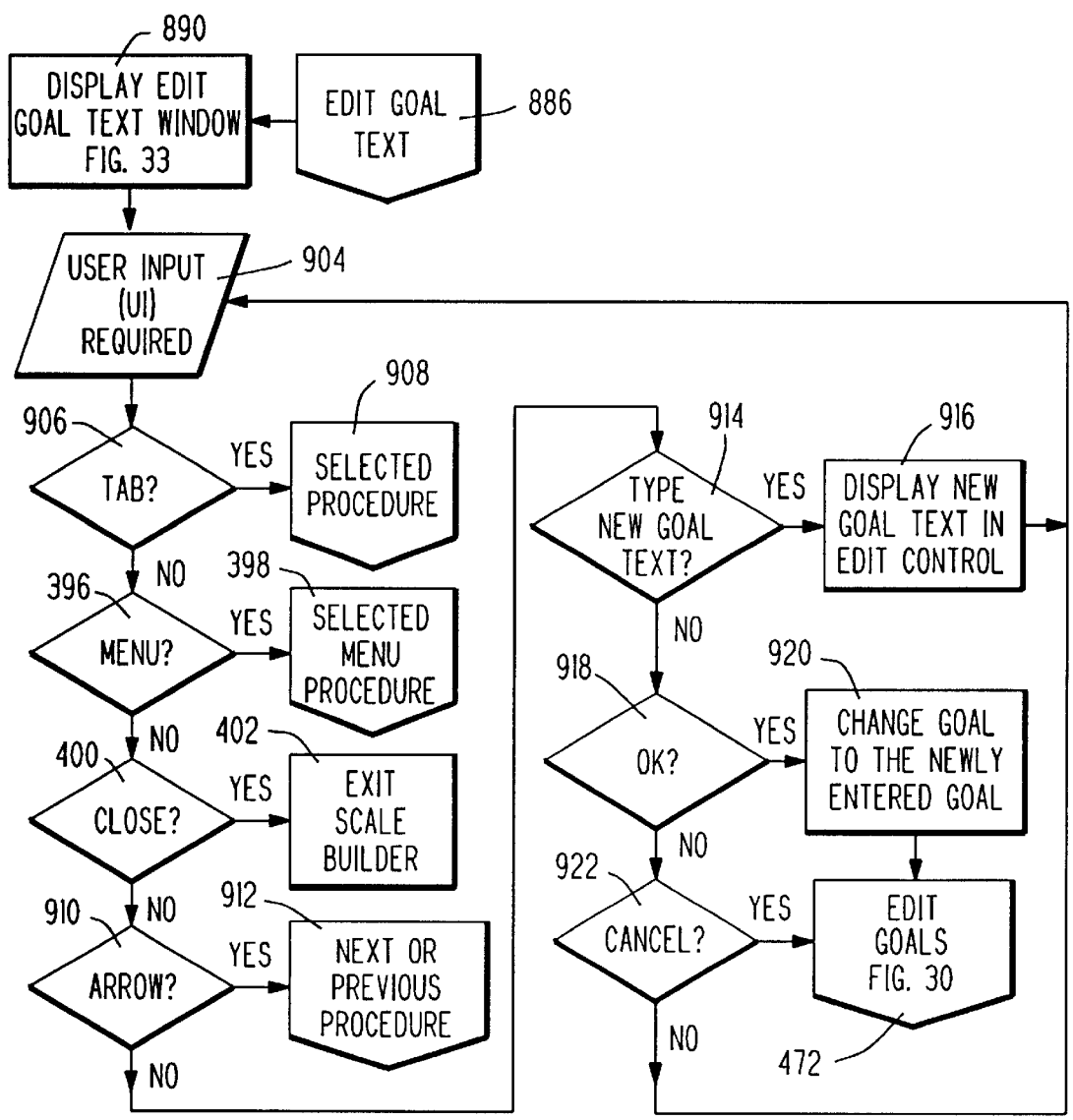
FIG. 32 is a program flow diagram of an edit goals text procedure called from the edit goals procedure of FIG. 30.
Figure 33:
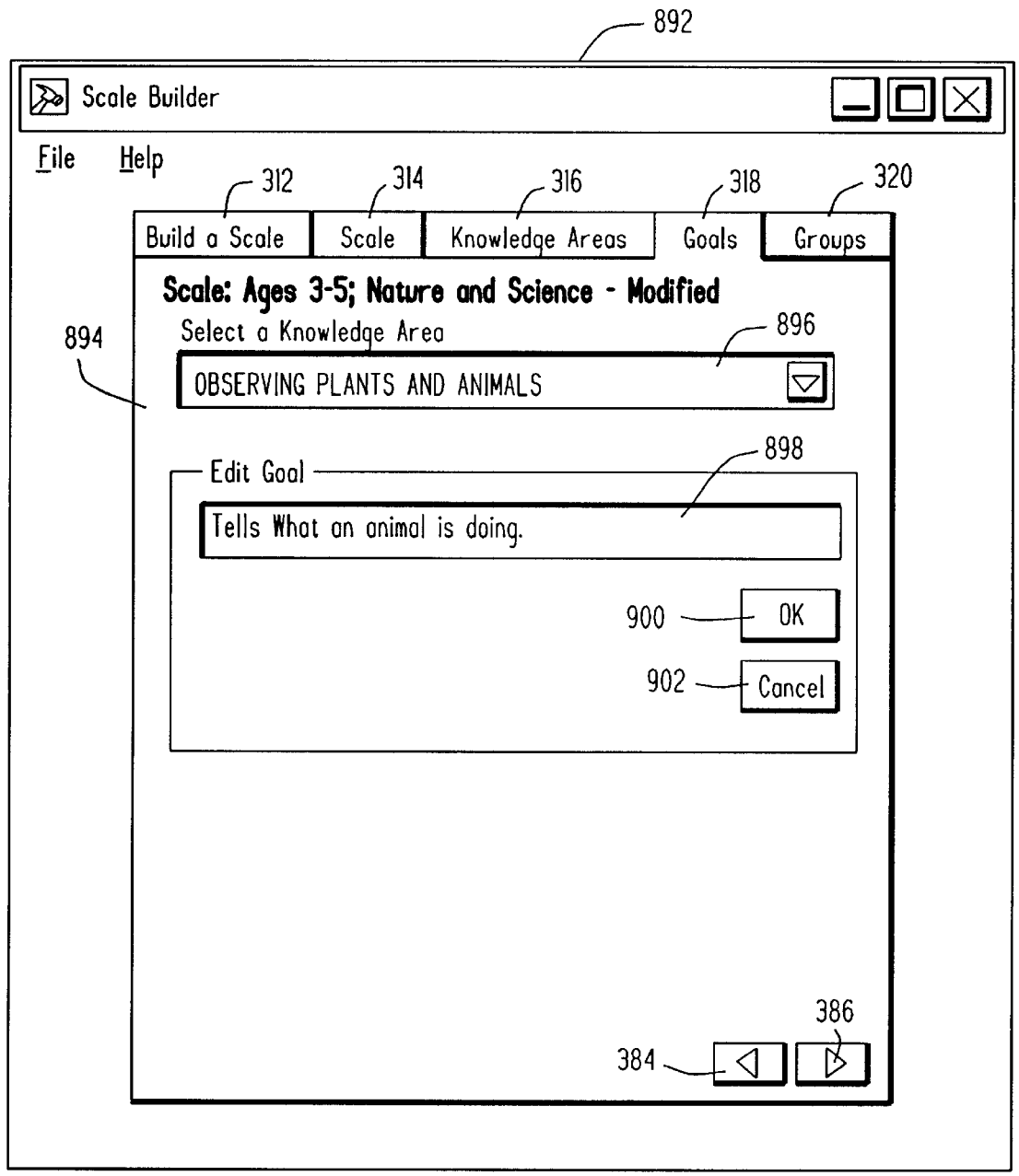
FIG. 33 is an illustration of an edit goals text window displayed on a computer monitor during the procedure of FIG. 32.

In the edit goal text procedure 886 of FIG. 32, step 890 displays an edit goal text window 892, FIG. 33, which includes an edit goal text folder 894 under the goals tab 318. This folder 894 contains a select knowledge area edit control 896, an goal text edit control 898, OK button 900 and cancel button 902. Clicking on the scale tab 3 14 is sensed by step 908 resulting in step 908 returning to the edit scale procedure 346. Selecting the back arrow button 384 results in steps 910 and 912 returning the program to the edit goals procedure 472. Step 914 detects entry of characters in the edit control 898 and step 916 displays the entered text in the edit control 898. When a user selects the OK button 900, steps 918 and 920 change the previously selected goal to the newly enter text. Step 922 senses selection of the cancel button 902 to return the program to the edit goals procedure 472.

Figure 34:
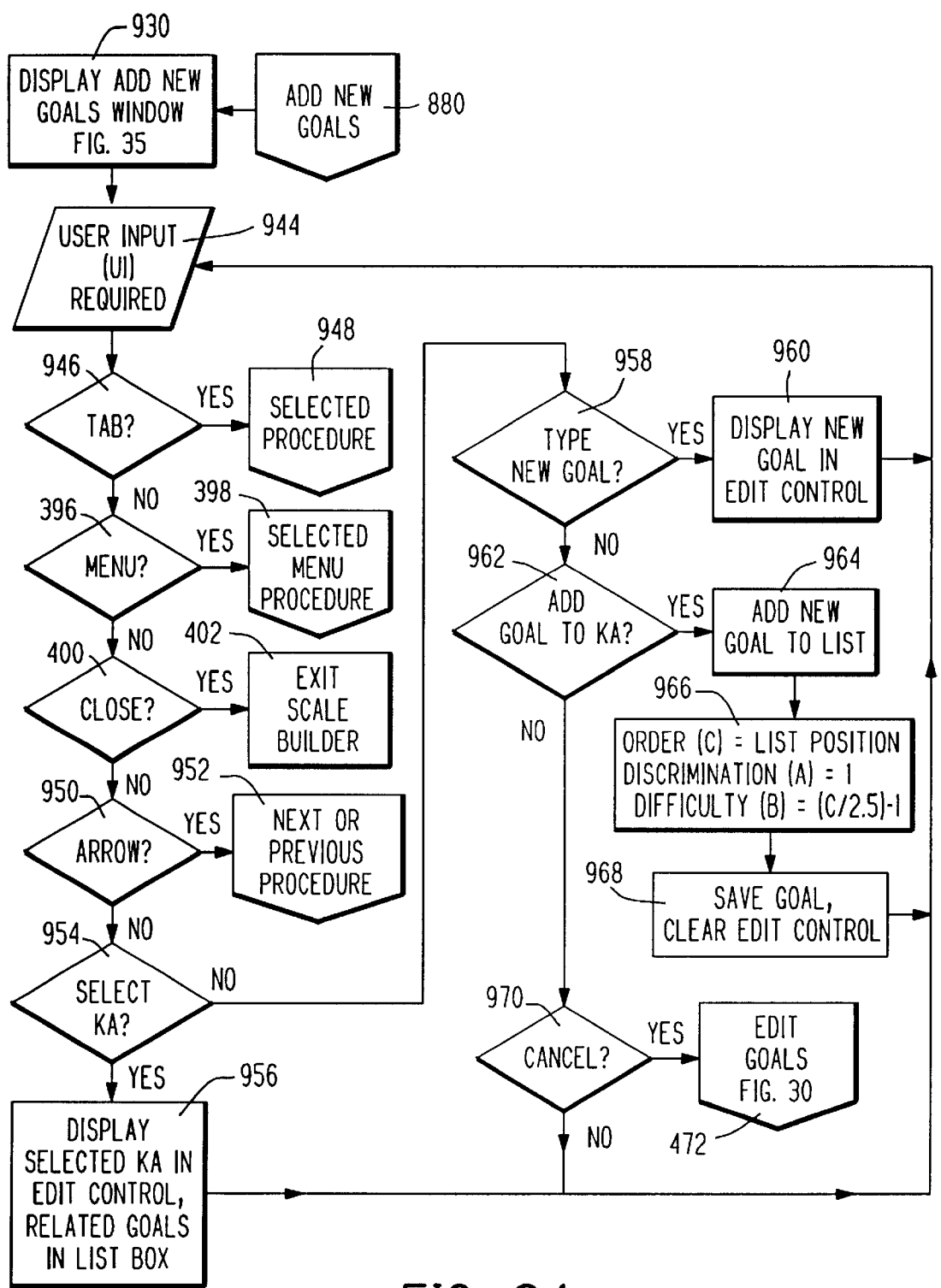
FIG. 34 is a program flow diagram of an add new goal procedure called from the edit goals procedure of FIG. 30.
Figure 35:
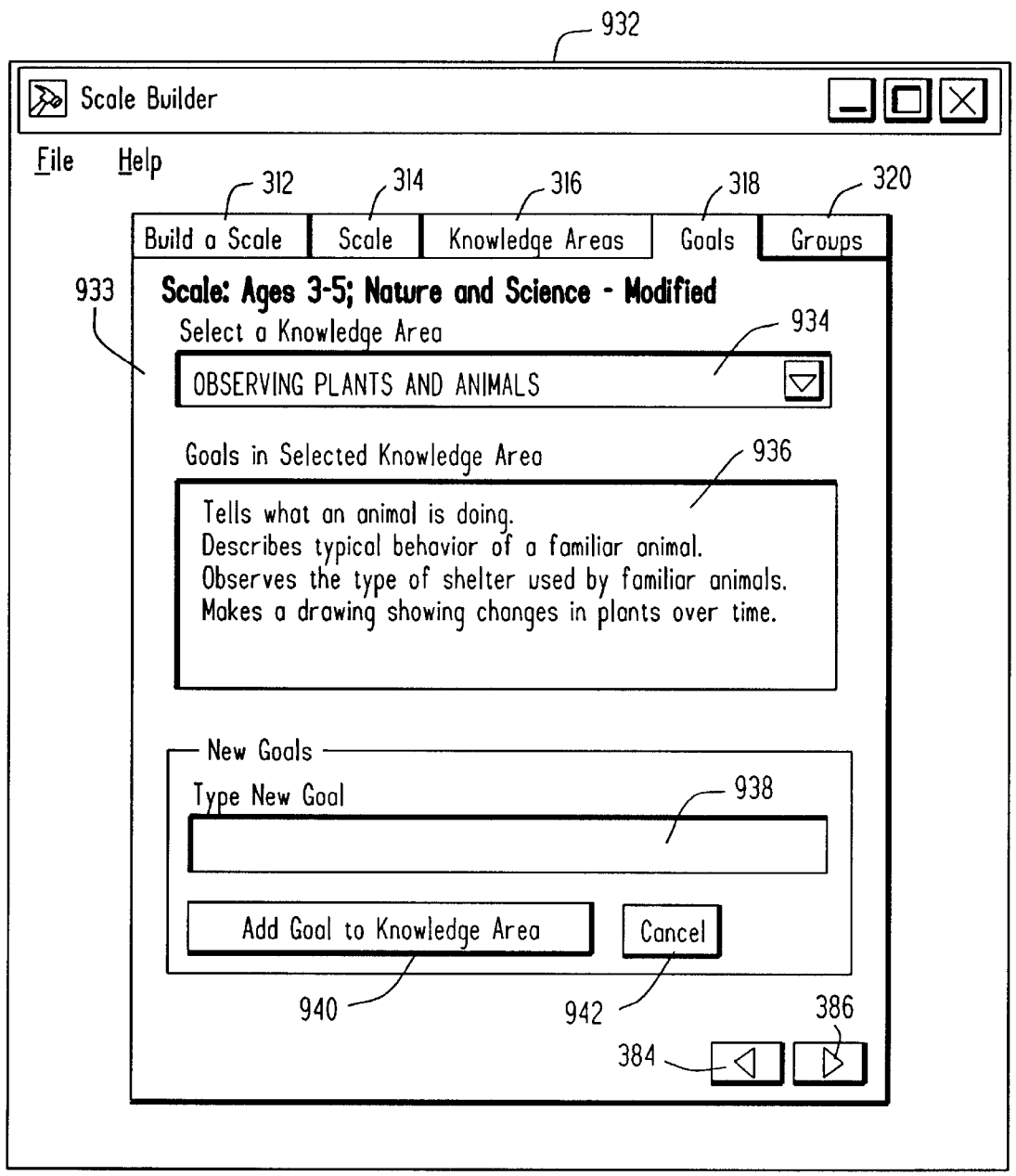
FIG. 35 is an illustration of an add new goal window displayed on a computer monitor during the procedure of FIG. 34.

Calling the add new goals procedure 880 of FIG. 34 from the edit goals procedure results in step 930 displaying a add new goals window 932 in FIG. 35. Under the goals tab 318, the window 932 contains an add new goals folder 933 which includes a select knowledge area edit control 934, goals list box 936, type new goal edit control 938, add goal to knowledge area button 940 and cancel button 942. In step 944 user input is enabled. Steps 946 and 948 respond to selection of the scale tab 3 14 to return to the edit scale procedure 346, and steps 950 and 952 respond to selection of the back arrow button 384 to return to the edit goals procedure 472. An arrow button in the knowledge area edit control can be clicked to display a list (not shown) of knowledge areas within the selected scale. The user can select a knowledge area in the list resulting in steps 954 and 956 changing any previously selected knowledge area and listing the goals corresponding to the selected knowledge area in the goals list box 936. Typing in characters in the new goal edit control 938 is sensed by step 958 resulting in step 960 adding the typed text to the edit control 938. When the add goal to knowledge area button 940 is clicked, steps 962 and 964 add the new goal to the list in the goal list box 936. Following the adding of the goal to the list, step 966 computes the discrimination factor (a) 272, difficulty factor (b) 270 and order number 274 for the newly added 260, see FIG. 6. The order number 274 is the position of goal within the list, the discrimination factor (a) 272 is set to 1, and the difficulty factor (b) 270 is computed as the quotient of the list position divided by 2.5 minus 1, i.e., $$b=(c/2.5)-1$$

wherein b is the difficulty factor and c is the order number. Step 968 then saves the new goal and clears the edit control 938. If the user clicks on the cancel button 942, step 970 returns the program to the edit goals procedure 472.

Figure 36:
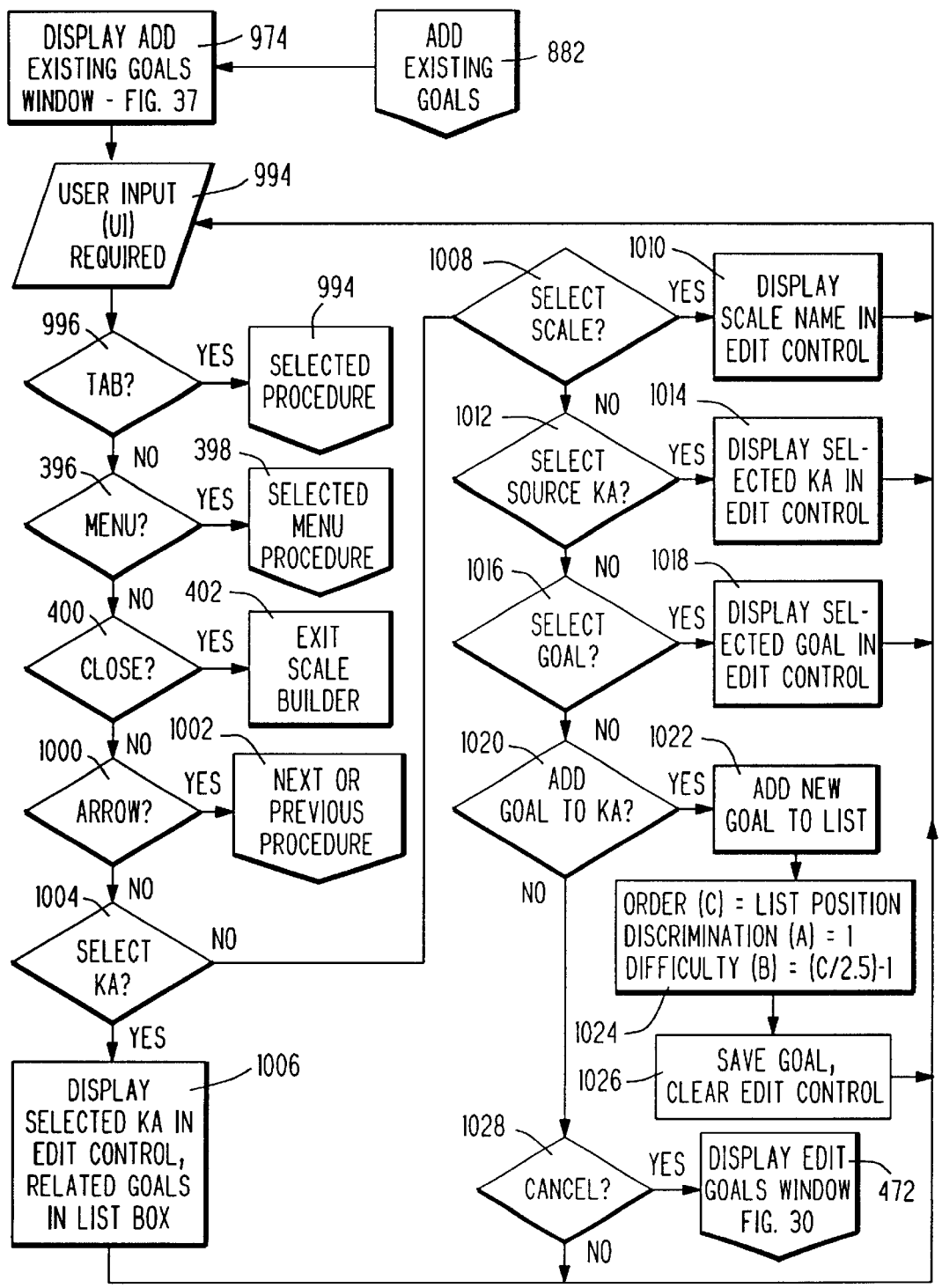
FIG. 36 is a program flow diagram of an add existing goal procedure called from the edit goals procedure of FIG. 30.
Figure 37:
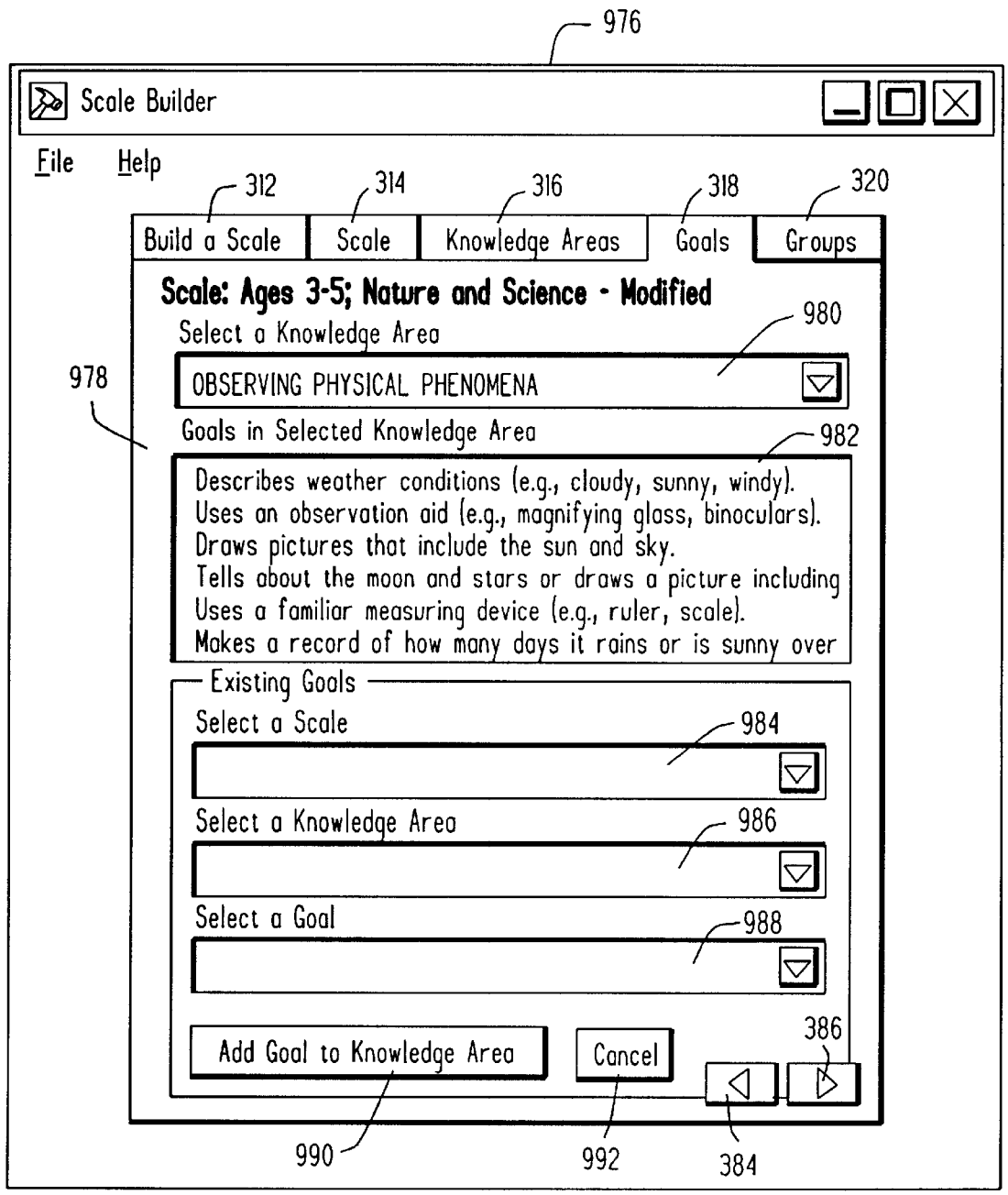
FIG. 37 is an illustration of an add existing goal window displayed on a computer monitor during the procedure of FIG. 36.

The add existing goals procedure 882 of FIG. 36 in step 974 initially displays an add existing goals window 976, FIG. 37, which includes under the goal tab 318 an add existing goals folder 978 containing a first select knowledge area edit control 980, a goal list box 982, a select scale edit control 984, a second select knowledge area edit control 986, a select goal edit control 988, an add goal to knowledge area button 990 and a cancel button 992. After user input is enabled in step 994, step determines if a scale tab 314 has been selected. If true, step 998 returns to the edit scale procedure 346. Step 1000 detects clicking on the back arrow button 384 to return to the edit goals procedure 472 in step 1002. When a user selects a knowledge area displayed in a list of knowledge areas called by selecting the arrow button in the select knowledge area edit control 980, steps 1004 and 1006 display the newly selected knowledge area in the edit control 980 and display the goals corresponding to the selected knowledge area in the goal list box 982. The user clicks on the arrow button in the select scale edit control 984 to display a list of scales (not shown) from which one scale is selected in step 1008 to display the selected scale in the edit control 984 in step 1010. Then the user selects the arrow button in the second select knowledge area edit control 986 to display a list of the knowledge areas (not shown) in the selected scale. In steps 1012 and 104 the user selects one of the listed knowledge areas and this selected knowledge area is displayed in the edit control 986. The user clicks on the arrow button in the edit control 988 to display a list of goals (not shown) in the selected knowledge area of edit control 986. One of the listed goals is clicked by the user to result in steps 1016 and 1018 displaying the selected goal in the edit control 988. Step 1020 senses the user clicking on the add goal button 990 to add the goal in the edit control 988 to the goals in the list box 982 in step 1022. Step 1024 computes the order, discrimination factor (a) and difficulty factor (b) for the new goal and step 124 saves the new goal data as well as clearing the select a goal edit control 988. When the cancel button 992 is selected, the program returns to the edit goals procedure 472.

Figure 39:
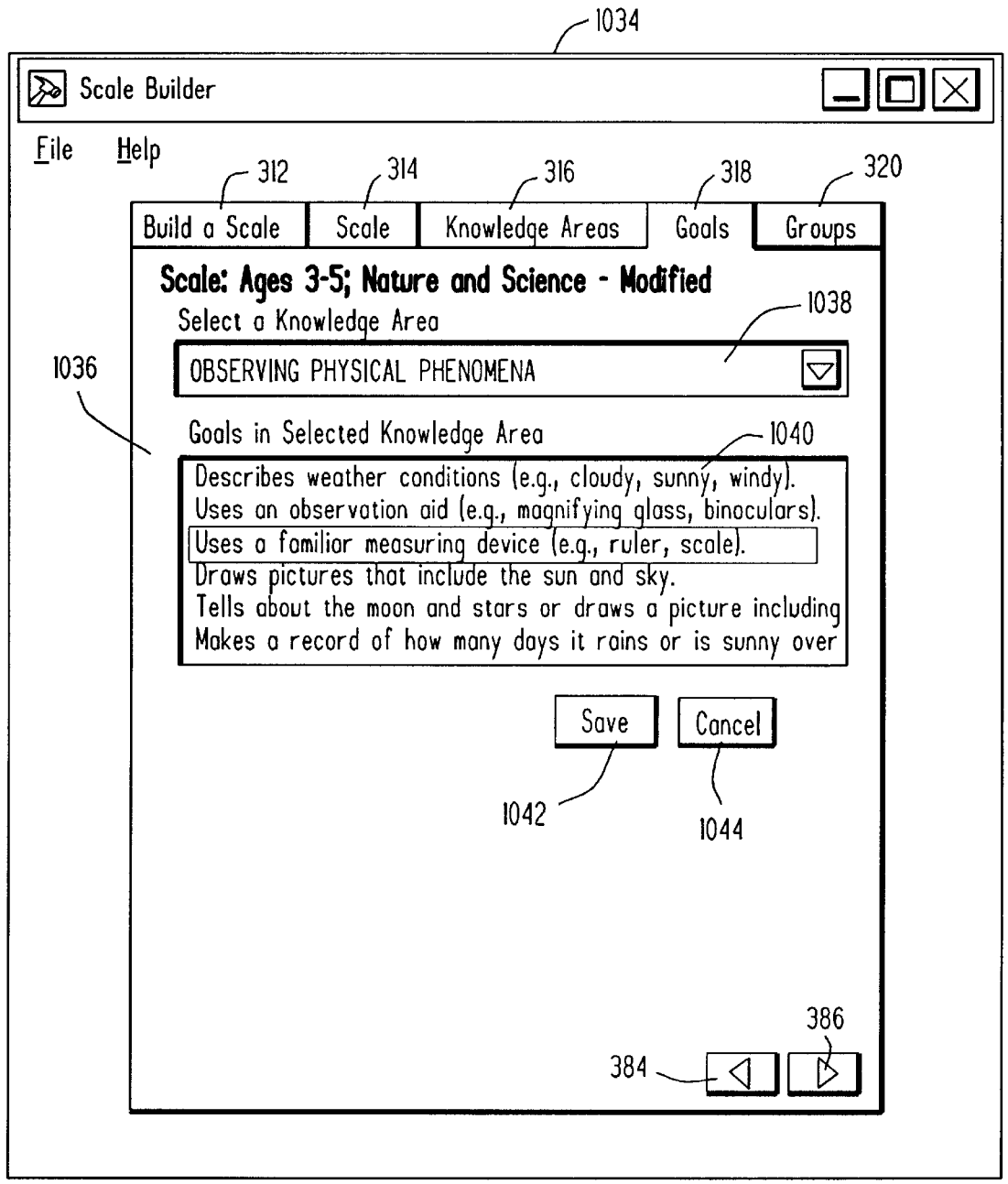
FIG. 39 is an illustration of an edit goal order window displayed on a computer monitor during the procedure of FIG. 38.

When the edit goal order procedure 888 is called from the edit goal procedure, step 1032 displays an edit goal window 1034, FIG. 39, on the monitor. This window 1034 includes, under the goal tab 318, an edit goal folder 1036, a select knowledge area edit control 1038, a goal list box 1040, a save button and a cancel button 1044. In step 1046 user input is enabled. Clicking on the scale tab 314 is sensed in step 1048 to advance to step 1050 where the program returns to the edit scale procedure 346 of FIG. 11. When the back arrow 384 is selected, steps 1052 and 1054 return the program to the edit goal procedure 472 of FIG. 30. The user can select a knowledge area by clicking on the down button in the edit control 1038 to display a list of knowledge areas in the currently selected scale and then clicking on the desired knowledge area in which to reorder the goals. Step 1056 senses the selection of the new knowledge area and step 1058 displays the selected goal in the edit control 1038 along with displaying in the list box 1040 the goals in the selected knowledge area. While the cursor is pointing at a selected goal name in the goal box 1040, the depression, holding down and movement of a left mouse button is detected in step 1060. The cursor is changed to a pointing hand in step 1062. The selected goal name is highlighted and moved to a new location in the list by the user. Release of the mouse button in the new position is detected in step 1064. Step 1066 determines if the new location for the highlighted goal name is a valid position, and if true, the highlighted goal is moved in step 1068 to the new location in the list with the position of any intervening goals being shifted toward the old position of the selected goal. For example, the highlighted goal "Uses a familiar measuring device (e.g., ruler, scale)" in list box 972 of FIG. 37 is moved up to the position of "Draws pictures that include the sun and sky" as shown in the list box 1040 of FIG. 39. The intervening goals "Draws pictures . . . " and "Tells about the moon . . ." are moved down one position in the list. If the user clicks on the save button 1042, step 1070 branches to step 1072 where the new list order is saved. In step 1074, the program computes and saves new difficulty factors for the moved goals based on the new locations in accordance with the formula used in step 966 of FIG. 34. The program then returns to, the edit goals procedure 472 of FIG. 30. The user can select the cancel button 1044 which step 1076 returns to the edit goals procedure without saving any unsaved goal order change.

Figure 40:
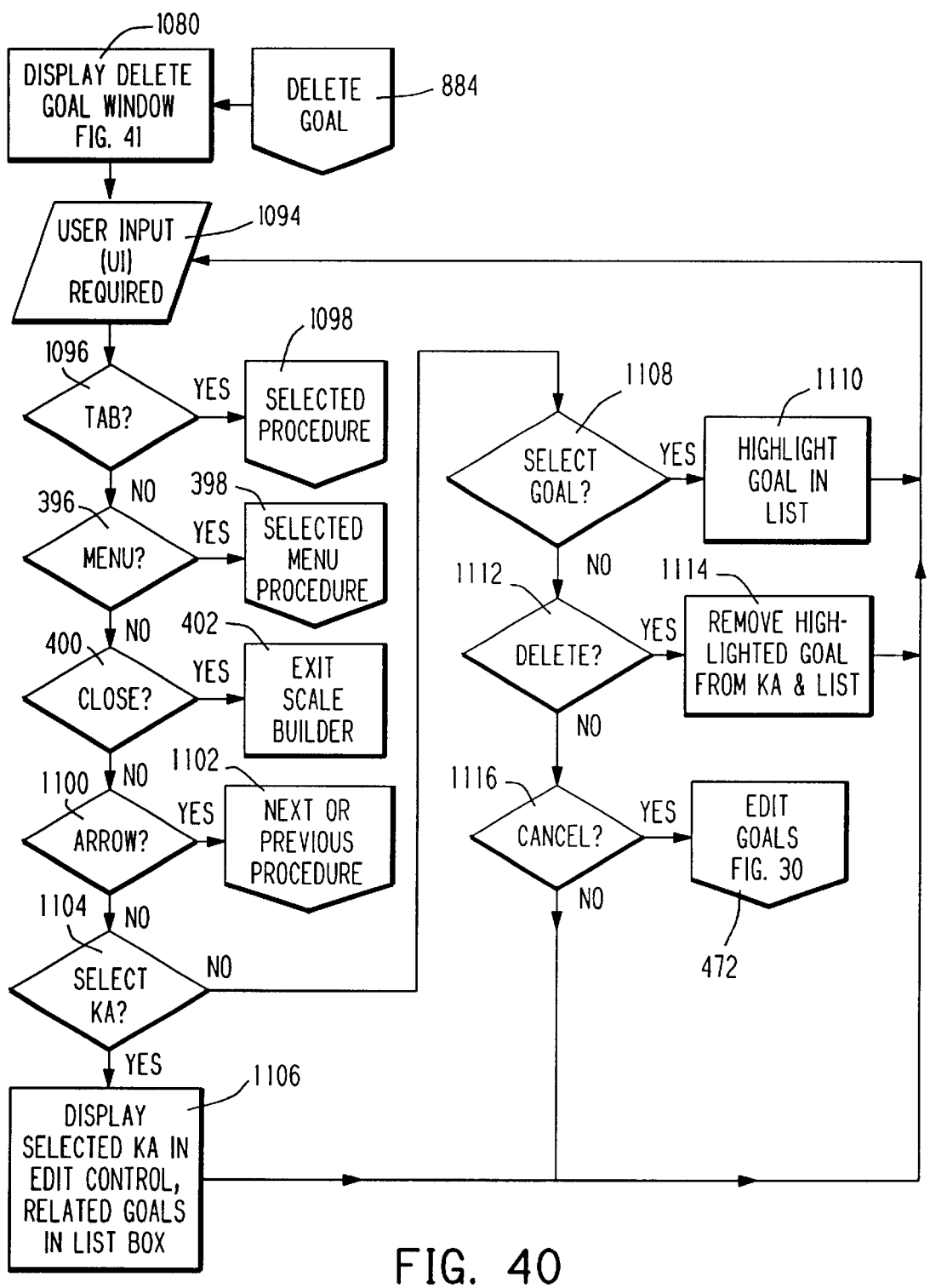
FIG. 40 is a program flow diagram of a delete goal procedure called from the edit goals procedure of FIG. 30.
Figure 41:
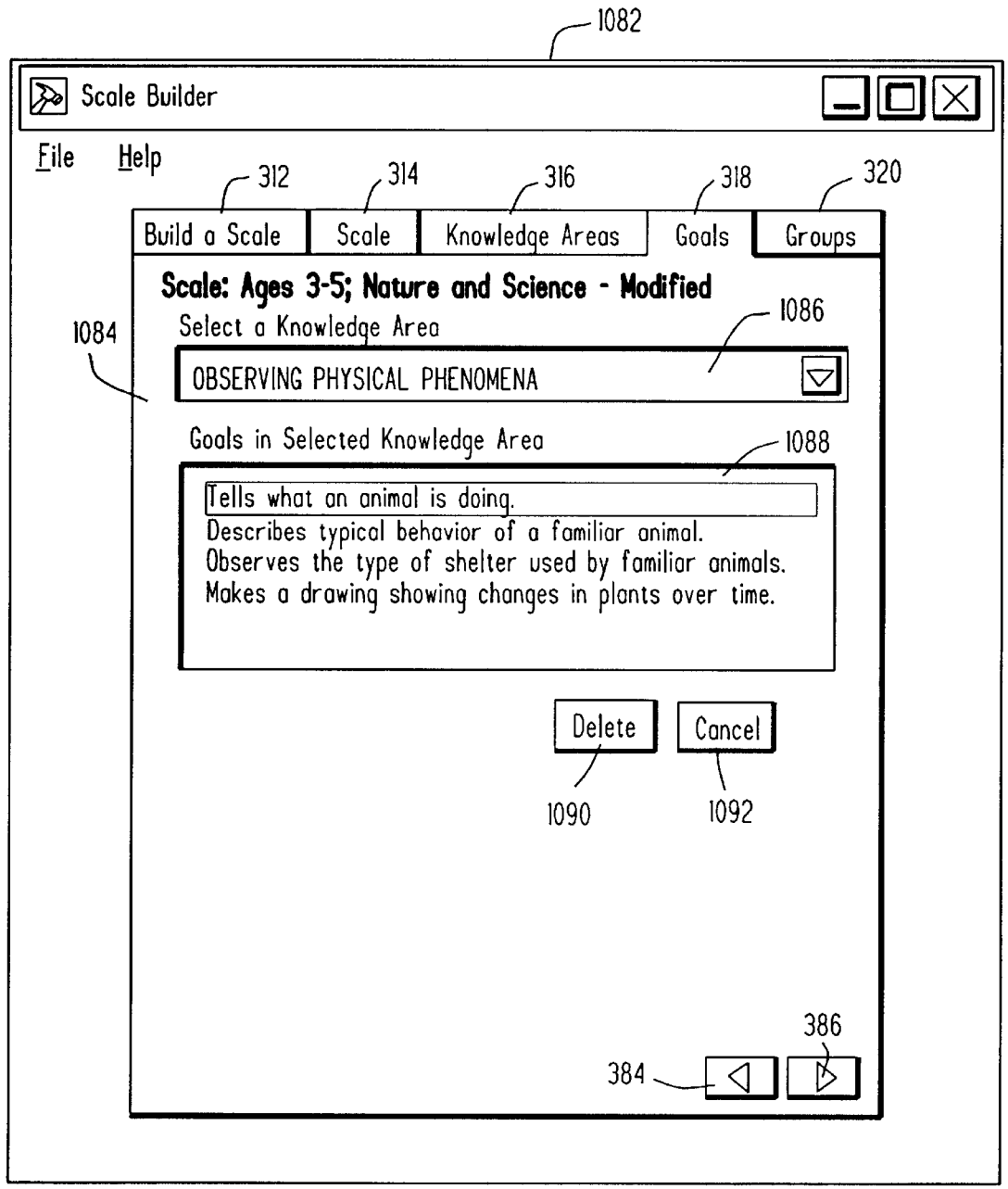
FIG. 41 is an illustration of a delete goal window displayed on a computer monitor during the procedure of FIG. 40.

In the delete goal procedure 884 of FIG. 40, step 1080 displays a delete goal window 1082, FIG. 41, on the computer monitor. Under the goals tag 318, the window 1082 includes a delete goal folder 1084 containing a knowledge area edit control 1086, a goals list box 1088, a delete button 1090 and a cancel button 1092. User input is enabled in step 1094. Selection of the scale tab 314 is detected in step 1096 to branch to step 1098 where the program returns to the scale edit procedure 346 of FIG. 11. Detection of selection of the back arrow button 384 in step 1100 results in the program returning to the goals edit procedure 472 of FIG. 30. The user selects a knowledge area by clicking on the arrow button in the edit control box 1086 to display a list of knowledge areas (not shown) in which one knowledge area can be selected. Step 1104 detects the selection of the knowledge area to proceed to step 1106 where the selected knowledge area is displayed in the edit control 1086 and the list of goals assigned to the selected knowledge area is displayed in the list box 1088. Selection by the user of one of the goals is detected in step 1108 resulting in step 1110 highlighting the selected goal. When a goal is highlighted, clicking on the delete button 1090 is detected in step 1112 to branch to step 1114 where the highlighted goal is removed from the goal list box 1088. Clicking on the cancel button 1092 returns the program to the edit goals procedure 472 without deleting any highlighted goals from the goal list box.

Figure 42:
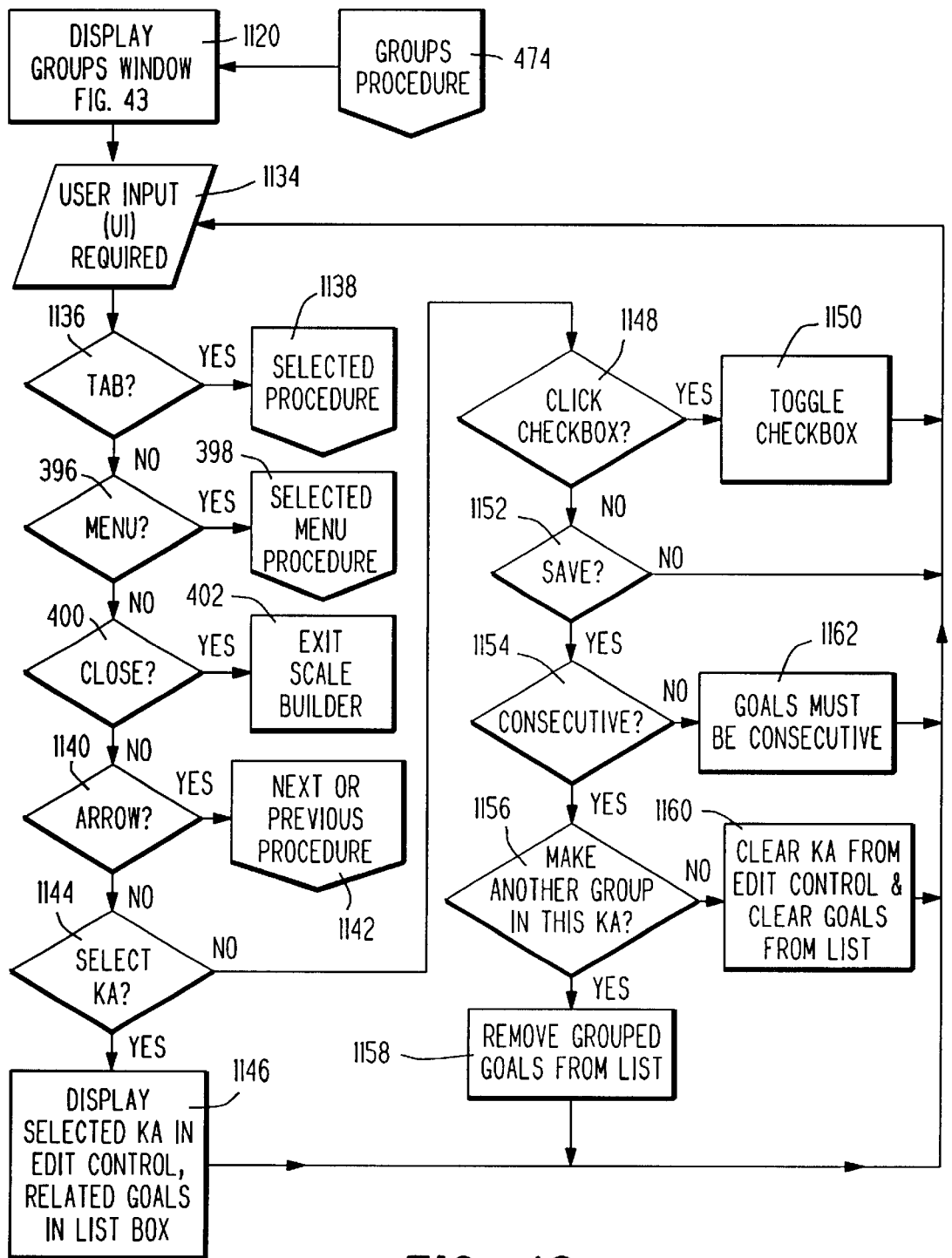
FIG. 42 is a program flow diagram of an edit groups procedure called from the edit scale procedure of FIG. 11.
Figure 43:
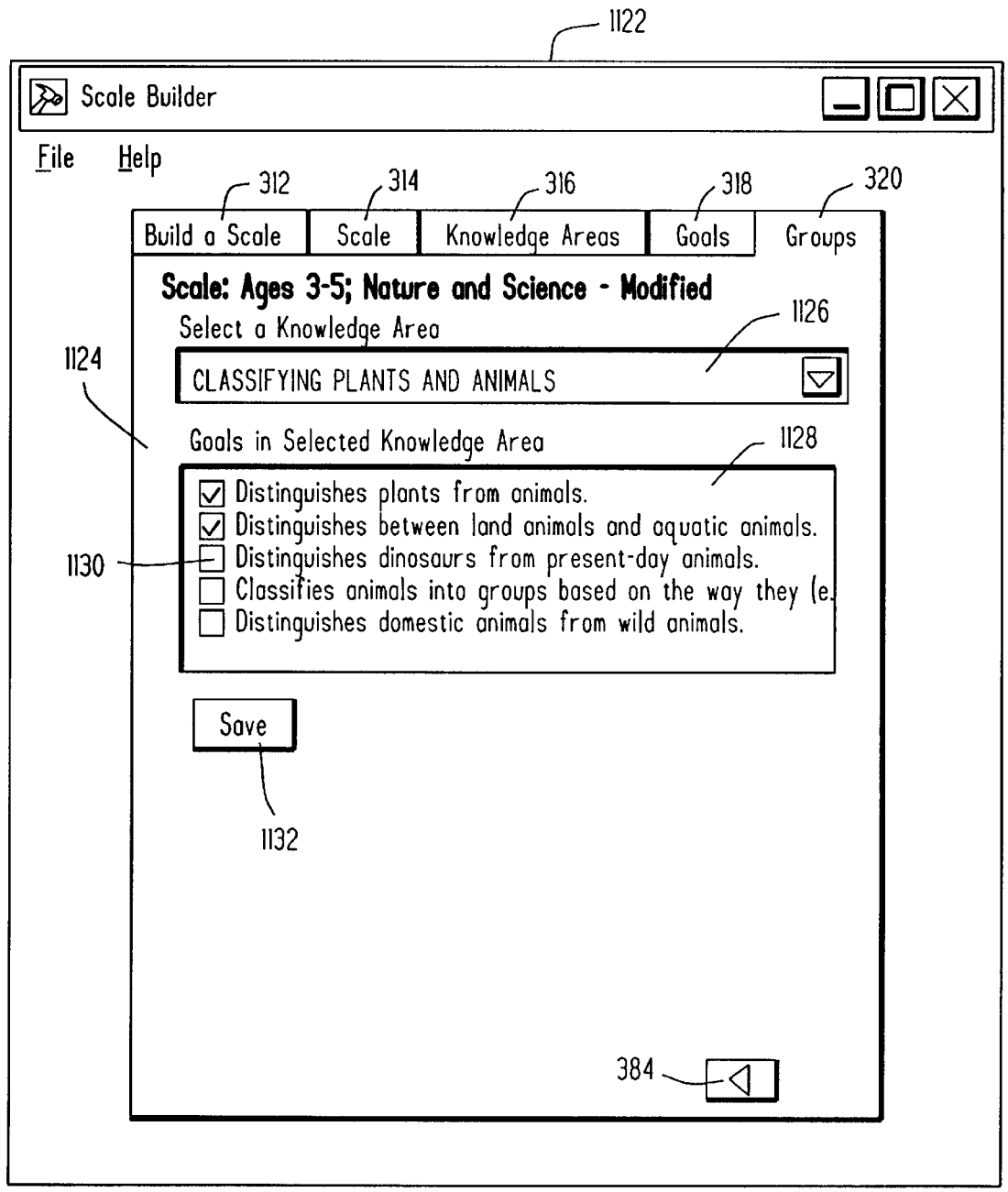
FIG. 43 is an illustration of an edit groups window displayed during the procedure of FIG. 42.

The groups procedure 474 of FIG. 42 is called from the edit scale procedure of FIG. 11 when the user wishes to group goals together for being considered as a single goal, i.e., the grouped goals are generally achieved by a common activity. In step 1120 a groups window 1122, FIG. 43, is displayed on the computer monitor. The window 1122, under the groups tab 320, includes a goals folder 1124 containing a select knowledge area edit control 1126, a goals list box 1128 each with a checkbox 1130 and a save button 1132. In step 1134 user input is enabled. Step 1138 senses clicking on the scale tab 314 to branch to step 1138 where the program returns to edit scale procedure 346 of FIG. 11. Similarly clicking on the back arrow button 384 returns the program to the edit scale procedure. The user can select or change a selection of a knowledge area by clicking on the arrow button in edit control 1126 to display a list of knowledge areas in which one knowledge area can be selected. Step 1144 senses the selection of the knowledge area to proceed to step 1146 where the selected knowledge area is displayed in the edit control 1126 and the goals assigned to the selected knowledge area are displayed in the goal list box 1128. Step 1148 detects clicking on a checkbox 1130 in the list box 1128 to toggle the checked status in step 1150, i.e., unchecked changed to checked and checked changed to unchecked. If the save button 1132 is clicked, step 1152 advances to step 1154 where it is determined if the currently clicked goal is consecutive with other checked goals. If true, step 1156 asks the user if he or she wishes to make another group in the currently selected knowledge area. If YES step 1158 removes the grouped goals from the displayed list. If the response to step 1156 is NO step 1160 clears the knowledge edit control 1126 and the goals list box 1128. If the checked goals are found not to be consecutive in step 1154, step 1162 displays a message that the goals must be consecutive.

Figure 44:
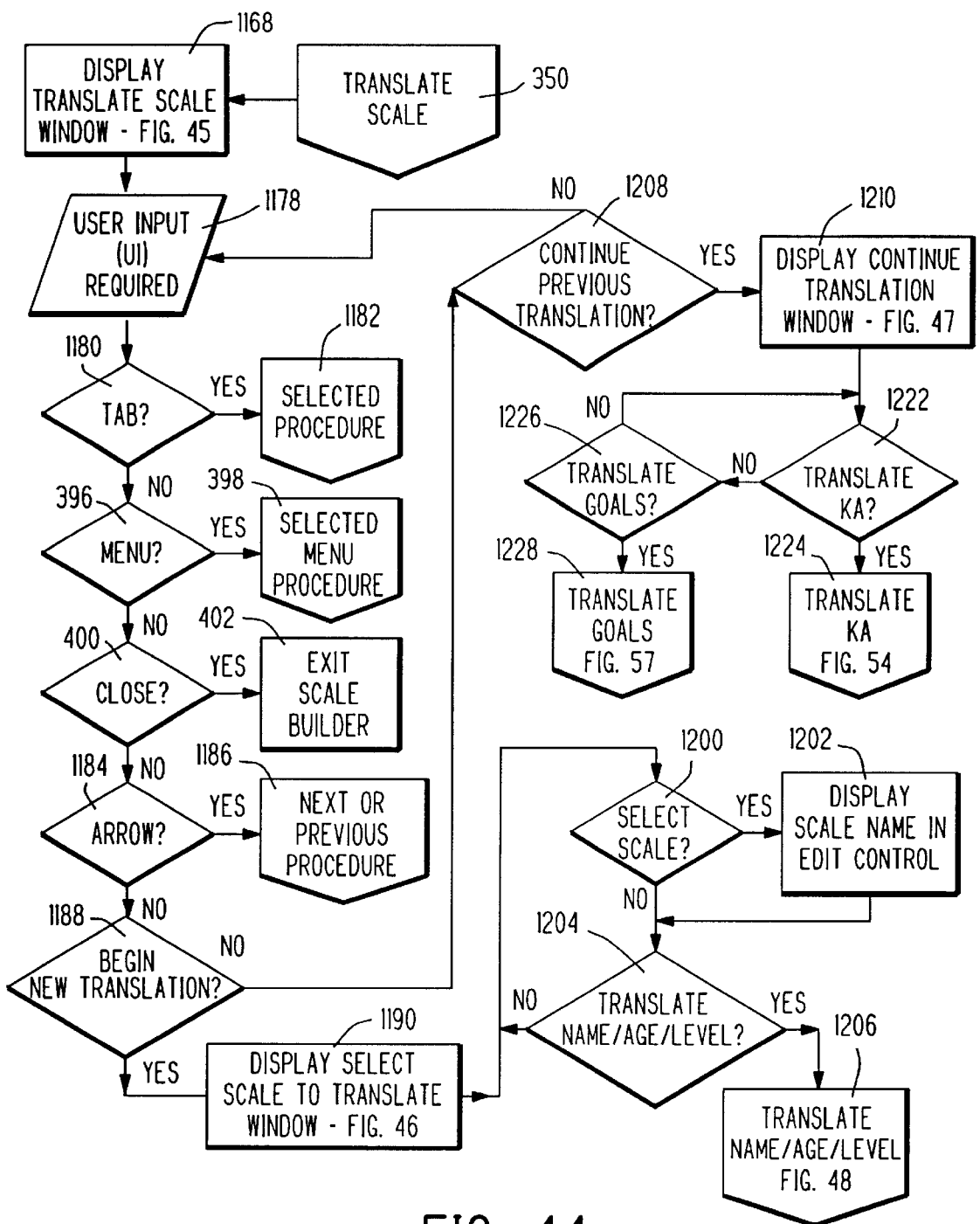
FIG. 44 is a program flow diagram of a translate MAPS scale procedure called from the main procedure of FIG. 7.
Figure 45:
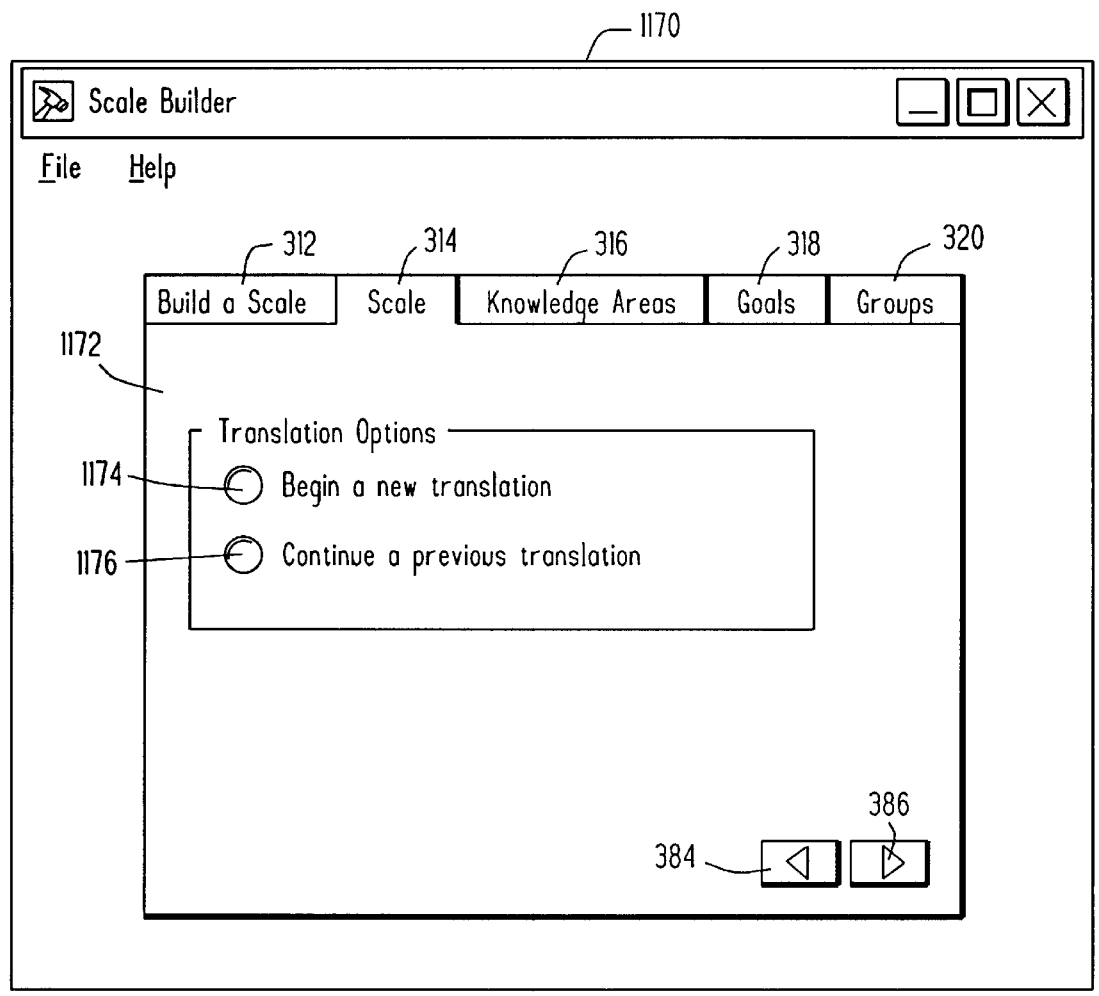
FIG. 45 is an illustration of a translate scale window displayed on a computer monitor during the procedure of FIG. 44.
Figure 46:
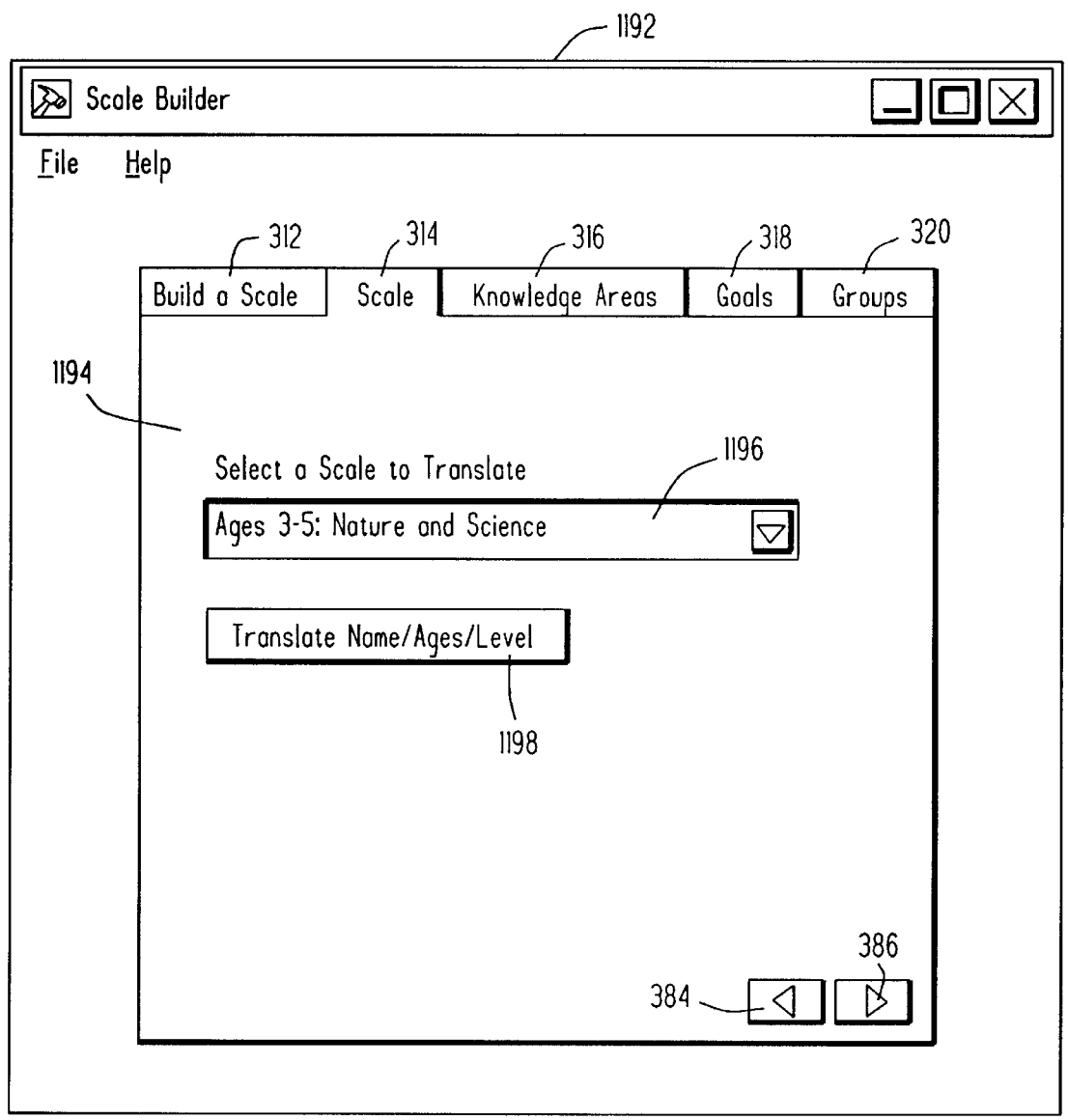
FIG. 46 is an illustration of a select scale to translate window displayed on a computer monitor during the procedure of FIG. 44.
Figure 47:
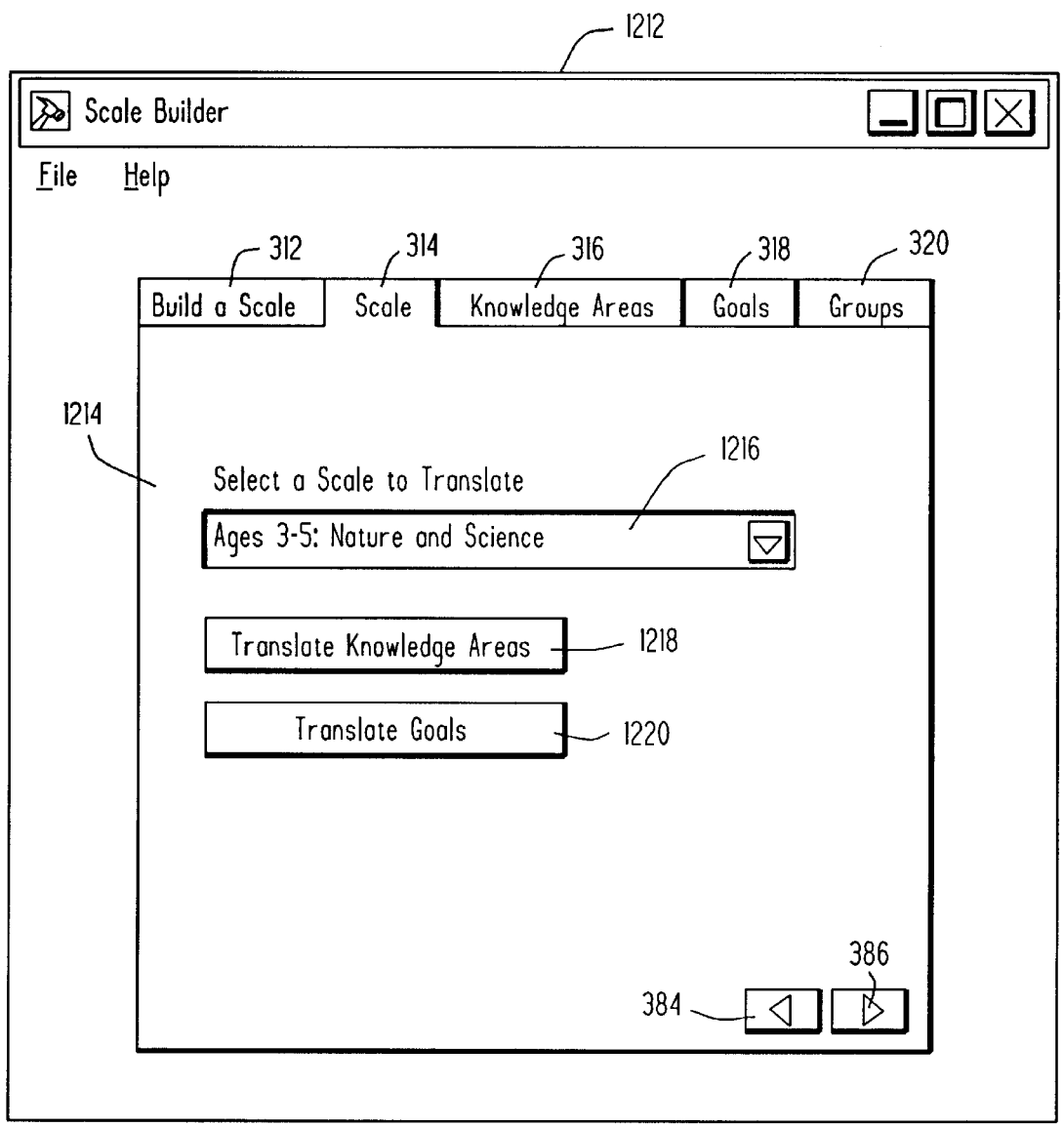
FIG. 47 is an illustration of a continue translation window displayed on a computer monitor during the procedure of FIG. 44.

When the translate MAPS scale procedure 350 of FIG. 44 is called from the scale build procedure, step 1168 displays a translate scale window 1170, FIG. 45, on the computer monitor. Under the scale tab 314, the window 1170 includes a translate scale folder 1172 containing a begin translation button 1174 and a continue a previous translation button 1176. User input is enabled in step 1178. If the user selects the build a scale tab 312 or the back arrow button 384, steps 1180 and 1182 or steps 1184 and 1186 return to the build a scale procedure 395 on FIG. 7. When the begin a new translation button 1174 is clicked, step 1188 branches to step 1190 where select scale to translate window 1192 of FIG. 46 is displayed on the monitor. The window 1192 includes a scale selection folder 1194 having a scale select edit control 1196 under the scale tab 314. The folder 1194 also includes a translate name/ages/level button 1198. In steps 1200 and 1202 the user selects a scale to translate by clicking on the arrow button in the edit control 1196 to display a list of scales from which one scale can be selected and displayed in the edit control. Step 1204 senses selection of the translate names/ages/level button 1198 to call a translate name/ages/level procedure 1206 in FIG. 48. When the user selects the continue a previous translation button 1176, step proceeds to step 1210 where a continue translation window 1212 of FIG. 47 is displayed on the monitor. The window 1212, under the scale tab 314, includes a continue translation folder 1214 containing a select scale edit control 1216, a translate knowledge areas button 1218 and a translate goals button 1220. The scale being translated is displayed in the edit control 1216 but could be used to change the scale. When the translate knowledge areas button 1218 is selected, step 1222 calls the translate knowledge area procedure 1224 of FIG. 54, and when the translate goals button 1220 is selected, step 1226 calls the translate goals procedure of FIG. 57.

Figure 48:
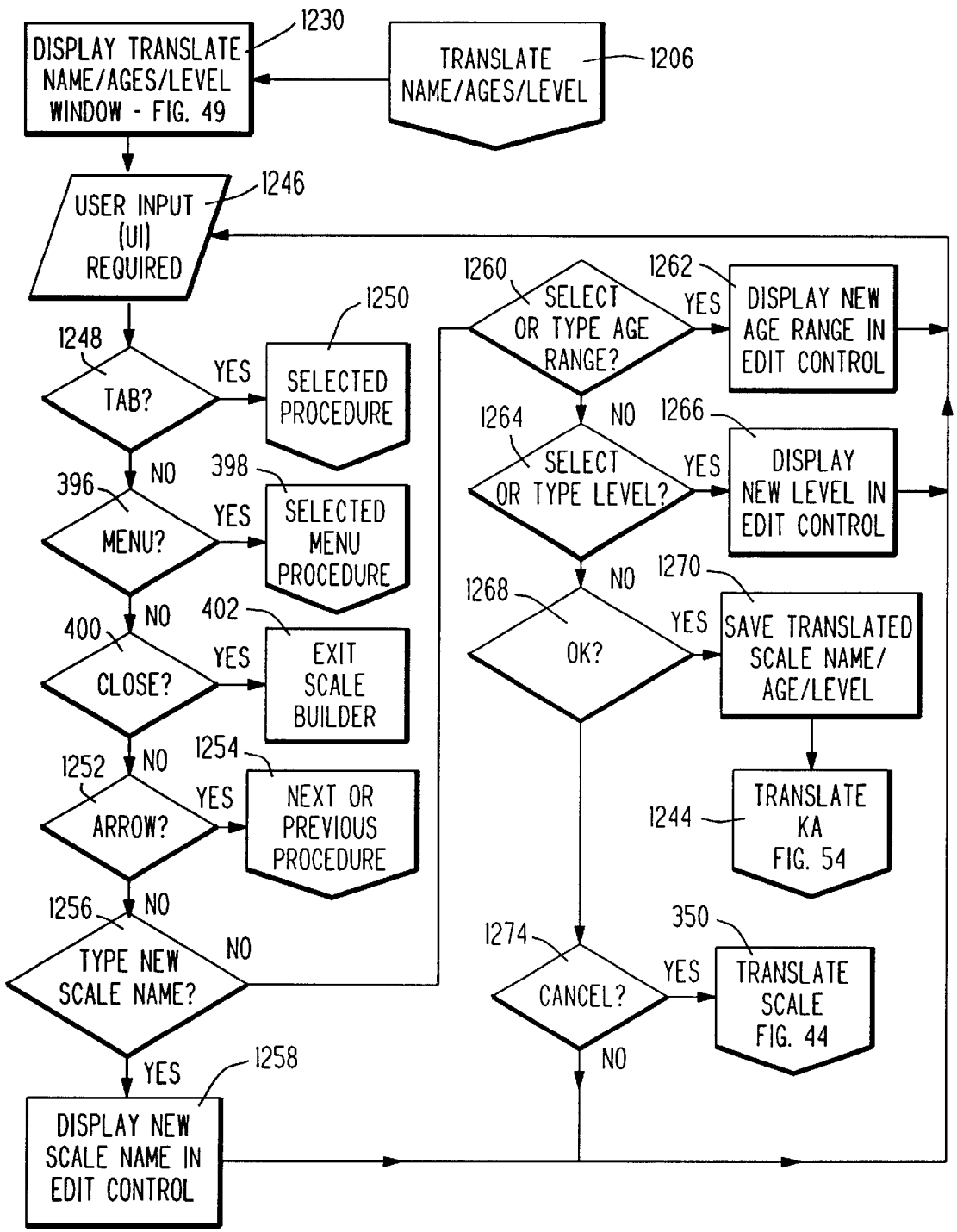
FIG. 48 is a program flow diagram of a translate scale name/ages/level procedure called from the translate MAPS procedure of FIG. 44.
Figure 49:
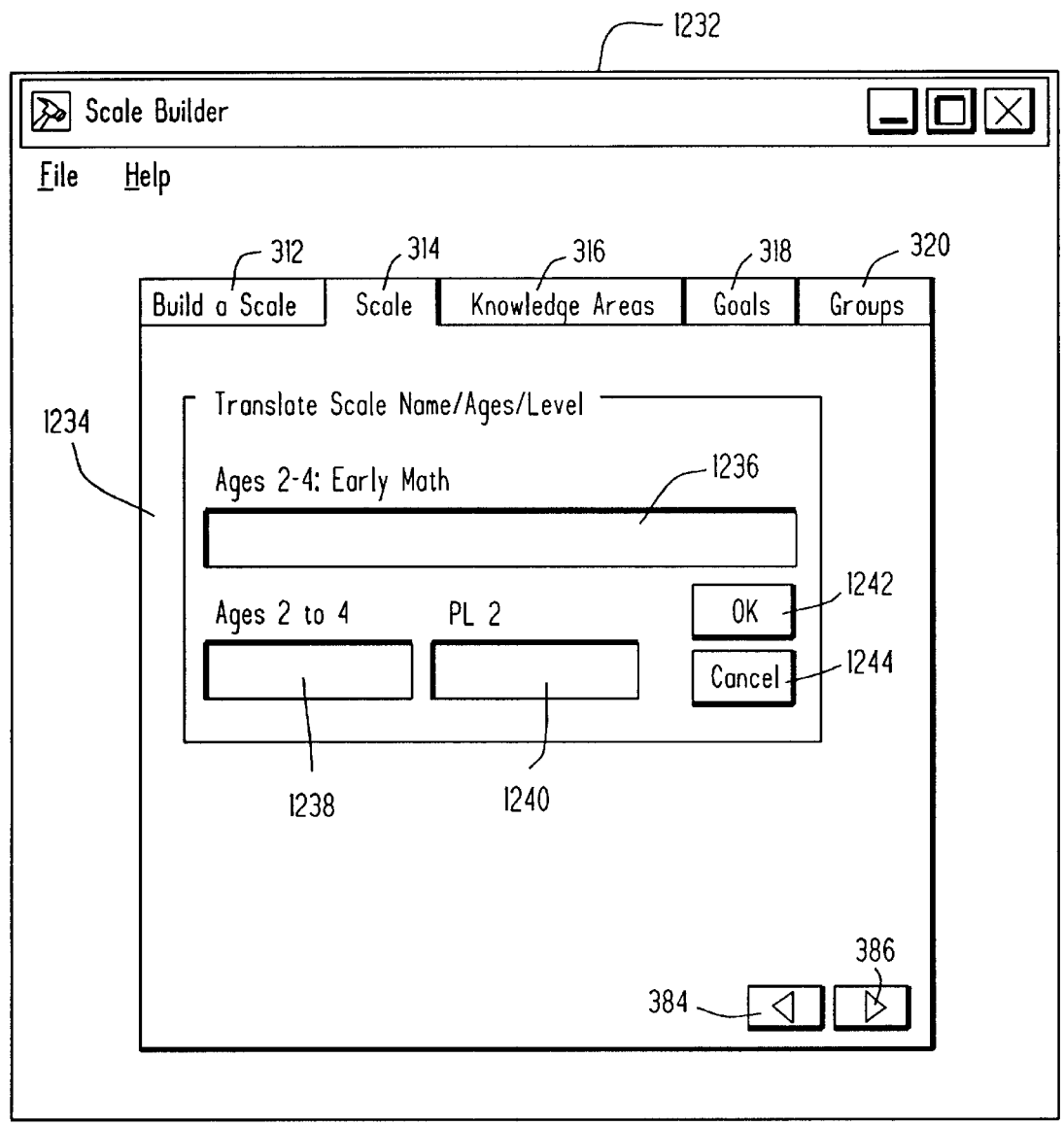
FIG. 49 is an illustration of a translate scale name/ages/level window displayed on a computer monitor during the procedure of FIG. 48.

Selecting the translate name/ages/level procedure of FIG. 48 displays in step 1230 a translate name/ages/level window 1232 of FIG. 49 which includes a translate name/age/level folder 1234 containing a translated scale name edit control 1236, a translated age range edit control 1238, a translated level edit control 1240, an OH button 1242 and a cancel button 1244. The English texts of the scale name, age range and level are displayed directly over the respective translated scale name edit control 1236, translated age range level control 1238 and translated level edit control. Step 1246 enables user input. Clicking on the build a scale tab 312 returns the program to the build a scale procedure 395 of FIG. 7. Clicking on the back arrow button 384 returns the program to the translate scale procedure 350 of FIG. 44. Step 1256 senses the typing of characters in the scale name translation edit control 1236 to display the new characters in the edit control in step 1258. Step 1260 senses the typing of characters in the age level translation edit control 1238 to display the new characters in the edit control in step 1262. Step 1264 senses the typing of characters in the translation level edit control 1240 to display the new characters in the edit control in step 1266. When the OK button 1242 is selected, step 1268 branches to step 1270 where the translated scale name, translated age level and translated level are saved. From step 1270 the program proceeds to the translate knowledge area procedure of FIG. 54. If the cancel button 1244 is clicked, the program returns to the translate scale procedure 350 of FIG. 44.

Figure 51:
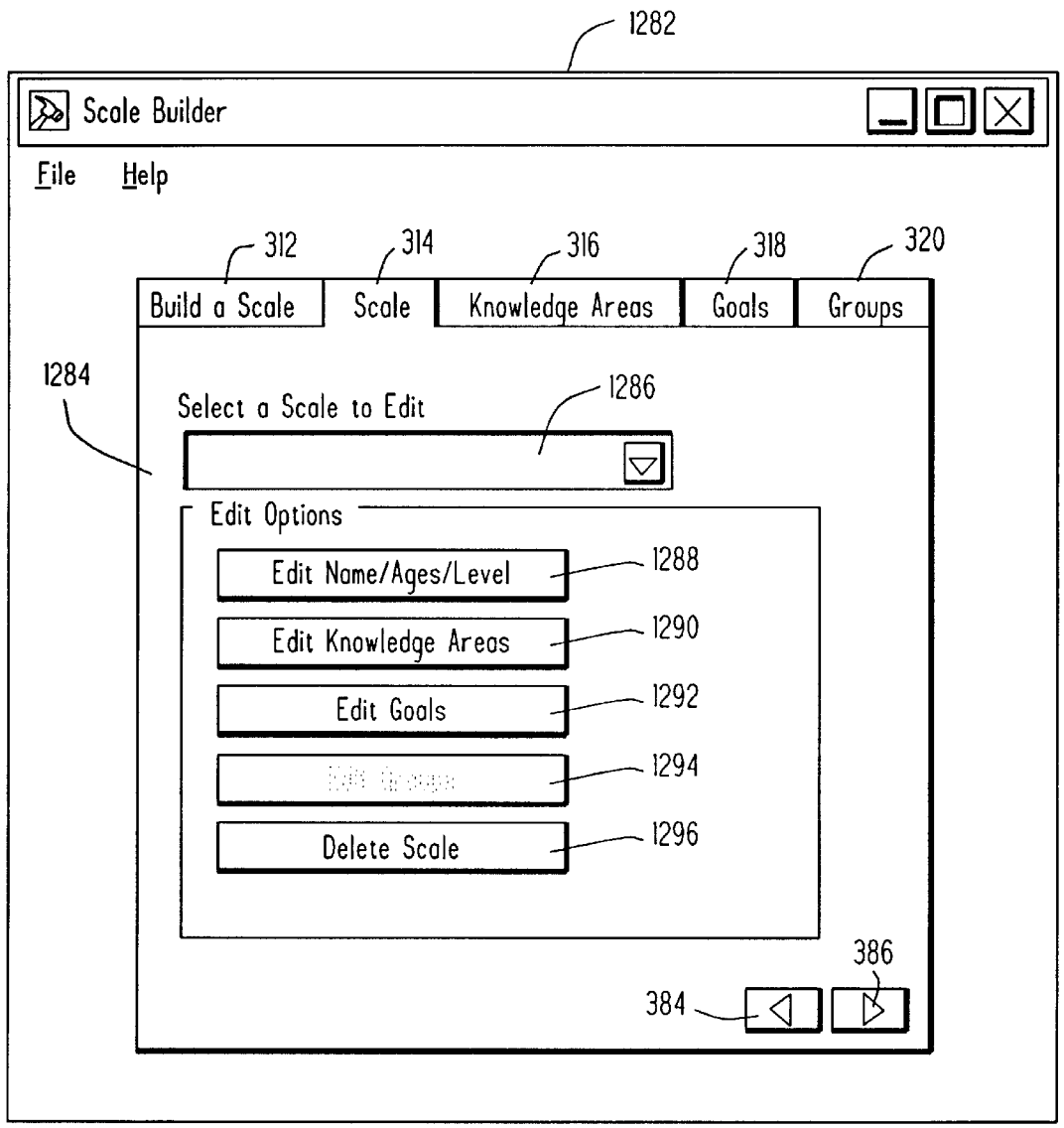
FIG. 51 is an illustration of an edit translated scale window displayed on a computer monitor during the procedure of FIG. 50.

Calling the edit translated scale procedure 352 of FIG. 50 from the build a scale procedure 395 of FIG. 7 results in step 1280 displaying an edit translated scale window 1282 of FIG. 51 on the computer monitor. Under the scale tab 314, the window 1282 includes an edit translated scale folder 1284 containing a select scale edit control 1286, an edit name/ages/level button 1288, an edit knowledge areas button 1290, an edit goals button 1292 and a delete scale button 1296. User input is enabled in step 1298. When the build a scale tab 312 or the back arrow button 384 are selected, the program returns to the build a scale procedure 395 of FIG. 7. In step 1308, the user clicks on the arrow button in the select translated scale to edit control 1286 to display a list of translated scales (not shown) in which the user can select a translated scale to edit. Step 1310 places the selected scale in the edit control 1286. Then selection by the user of one of the edit name/ages/level button 1288, edit knowledge areas button 1290 and edit goals button 1292 calls the respective edit translated name/ages/level procedure 1318 of FIG. 52, edit translated knowldge areas procedure 1244 of FIG. 54 and edit translated goals procedure 1228 of FIG. 57. If the user selects the delete scale button 1296, step 1324 branches to step 1326 to require confirmation of the desire to delete the translated scale shown in the edit control 1286 before proceeding to step 1328 where the selected translated scale is deleted.

Figure 52:
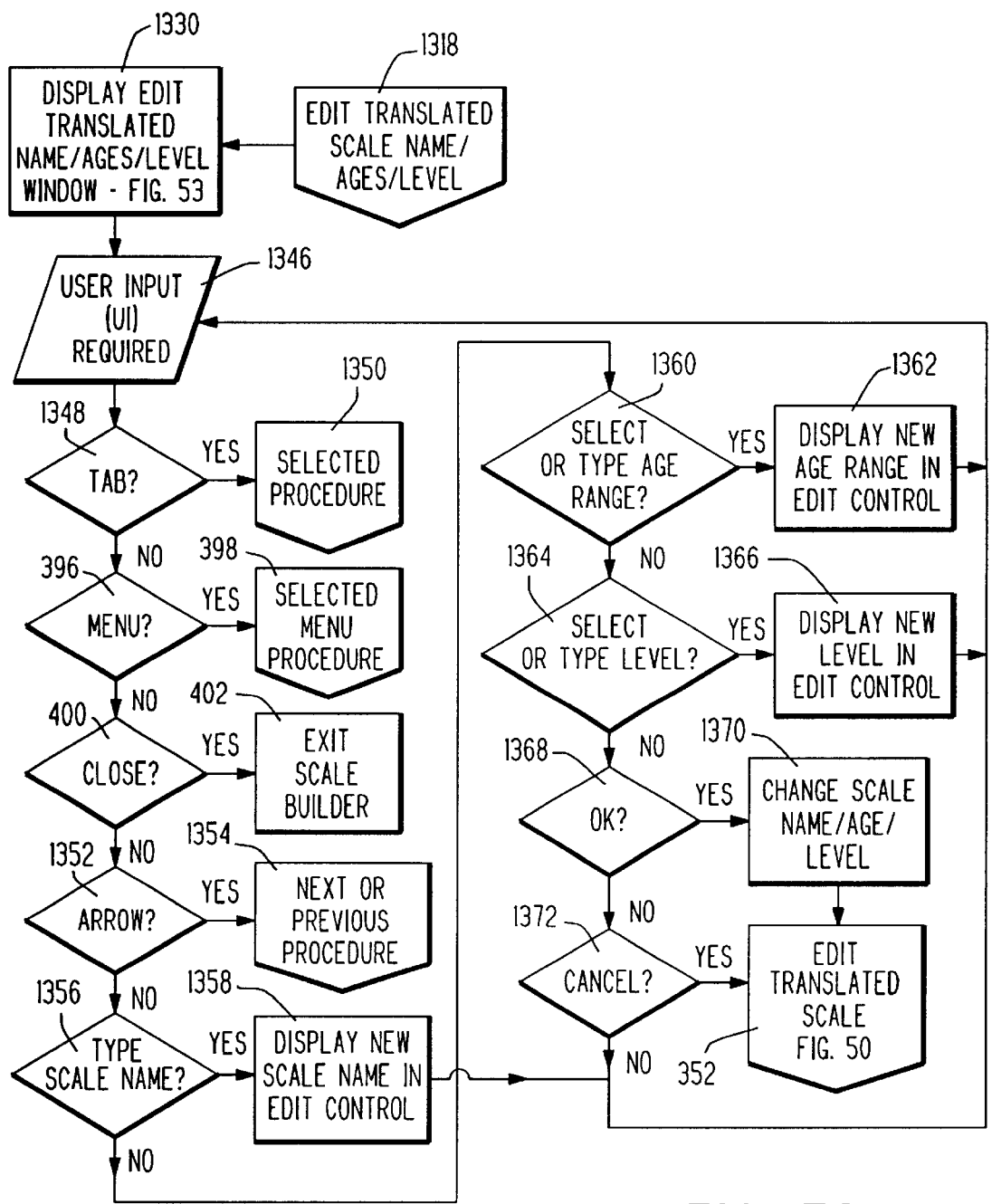
FIG. 52 is a program flow diagram of an edit translated scale name/ages/level procedure called from the edit translated scale window procedure of FIG. 51.
Figure 53:
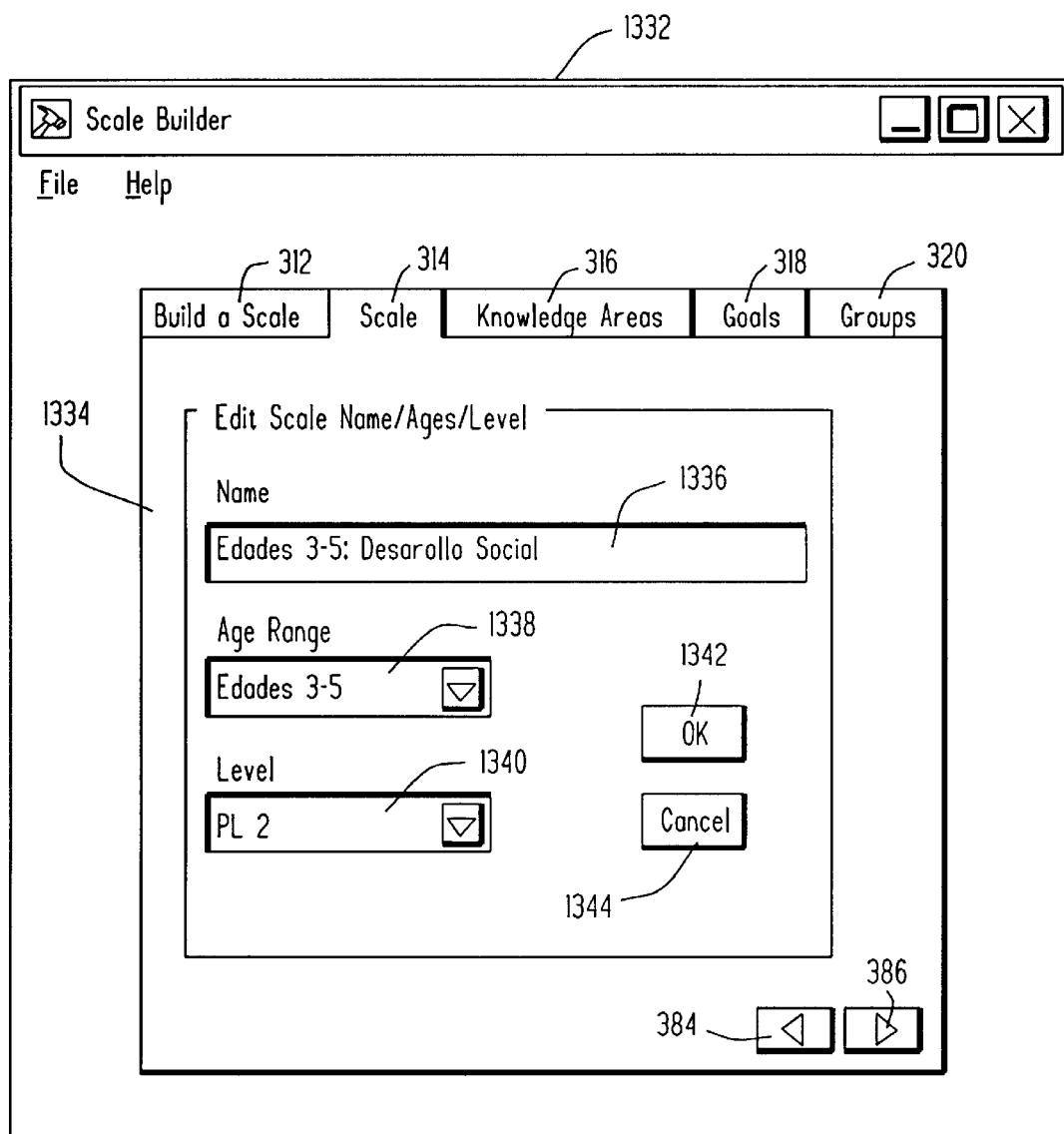
FIG. 53 is an illustration of an edit translated scale name/ages/level window displayed on a computer monitor during the procedure of FIG. 52.

In the edit translated scale name/ages/level procedure of FIG. 52, step 1330 displays an edit translated scale name/ages/level window 1332, FIG. 53, which includes an edit translated scale name/ages/level folder 1334 under the scale tab 314. This folder 1334 contains a translated scale name edit control 1336, a translated age range edit control 1338 and a translated level edit control 1340 in which the translated name, age range and level are initially displayed. The folder also contains an OK button 1342 and a cancel button 1344. In step 1346, user input is enabled. Selection of the build a scale tab is sensed in step 1348 to return the program in step 1350 to the build a scale procedure of FIG. 7. Selection of the back arrow button 384 is sensed in step 1352 to return the program to the edit translated scale procedure 352 of FIG. 50. Step 1356 senses typing characters in the translated scale name edit control 1336 to place the typed characters in the edit control in step 1358. Step 1360 is used to either sense clicking on the arrow button in the translated age range edit control 1338 or typing characters in the edit control 1338 to display a list of age ranges (now shown) from which a new age range can be selected. Step 1362 displays the typed characters or the selected new age range in the edit control 1338. Step 1364 is used to either sense clicking on the arrow button in the translated level edit control 1340 to display a list of levels (not shown) or typing characters in the edit control 1340. Step 1366 displays the typed characters or the selected new level in the edit control 1340. When the OK button 1342 is clicked step 1368, the program branches to step 1370 where the revised translated scale name, age range and level are saved. If the user clicks on the cancel button 1344, program returns to the edit translated scale procedure of FIG. 50.

Figure 54:
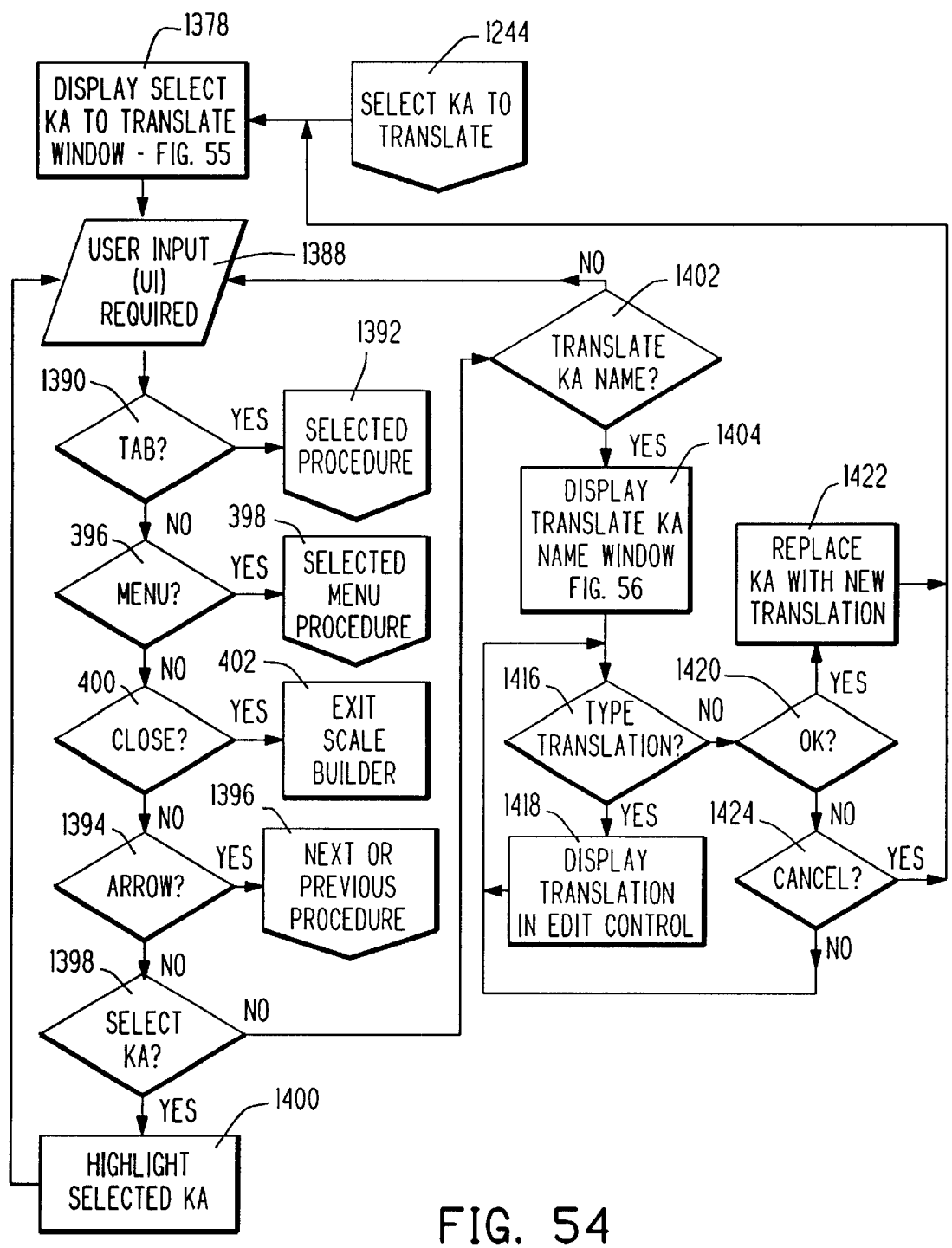
FIG. 54 is a program flow diagram of a select knowledge area to translate procedure called from the translate MAPS procedure of FIG. 44, the translate scale name/ages/level procedure of FIG. 48 and the edit translated scale procedure of FIG. 50.
Figure 55:
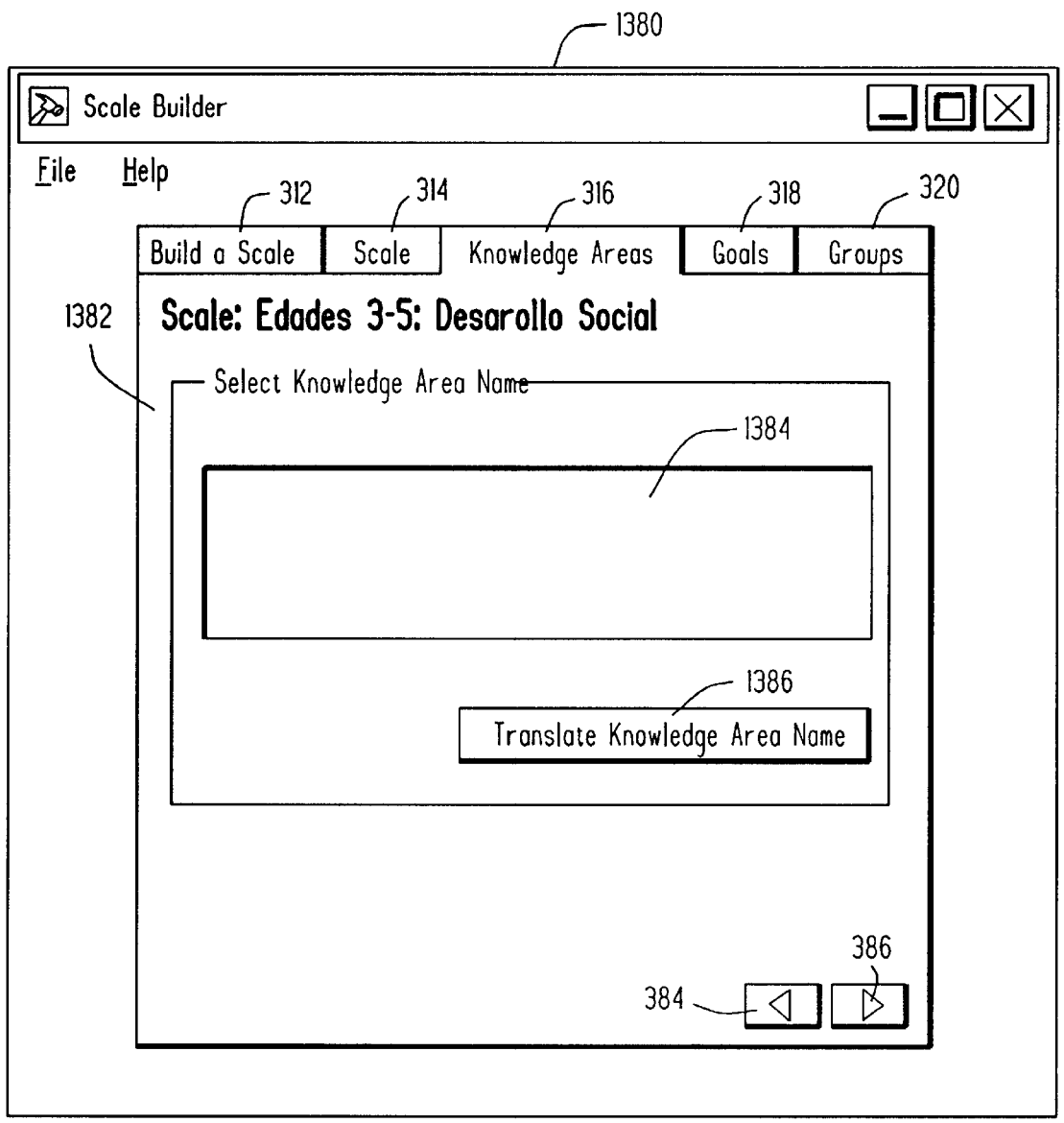
FIG. 55 is an illustration of a select knowledge area to translate window displayed during the procedure of FIG. 54.
Figure 56:
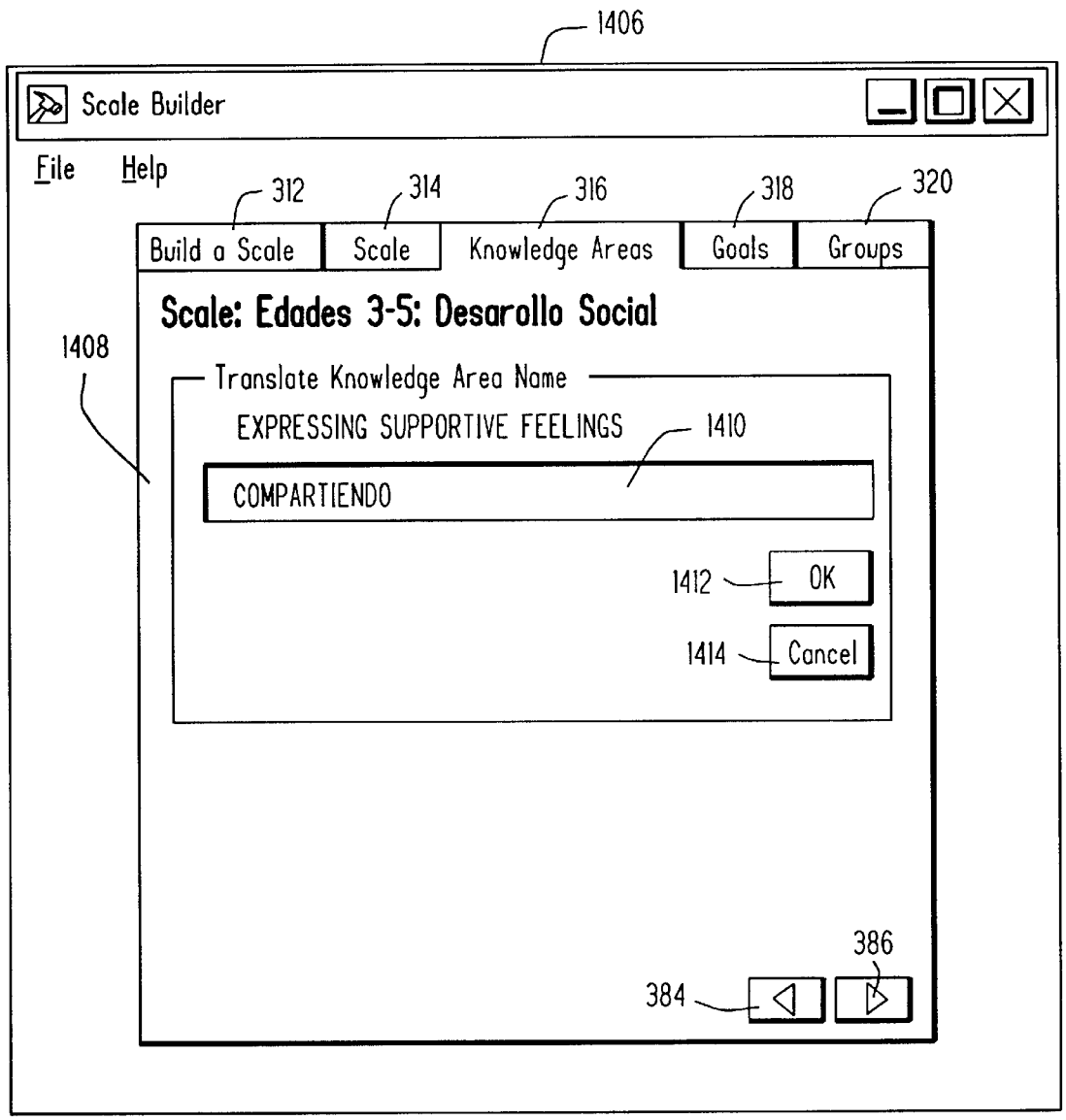
FIG. 56 is an illustration of a translate knowledge area window displayed during the select knowledge area to translate procedure of FIG. 54.

When the select knowledge area to translate procedure of FIG. 54 is called from one of the translate MAPS scale procedure 350 of FIG. 44, the translate scale name/ages/level procedure 1206 of FIG. 48 and the edit translated scale procedure 352 of FIG. 50, step 1378 displays the select knowledge area name window 1380 of FIG. 55. The window 1380 includes, under the knowledge area tab 316, a select knowledge area name folder 1382 containing a knowledge area list box 1384 and a translate knowledge area name button 1386. In step 1388, user input is enabled. Step 1390 senses selection of the build a scale tab 312 to return to the build a scale procedure 395 of FIG. 7. Clicking on the back arrow button 384 is sensed in step 1394 to return the program to the calling program, the translate MAPS scale procedure 350 of FIG. 44, the translate scale name/ages/level procedure 1206 of FIG. 48 and the edit translated scale procedure 352 of FIG. 50, in step 1396. Selecting a knowledge area in the list box 1384 is sensed in step 1398 to proceed to step 1400 where the selected knowledge area is highlighted. When the user clicks on the translate knowledge area name button 1386, steps 1402 and 1404 display a translate knowledge area name window 1406 of FIG. 56. This window 1406 includes an translate knowledge area name folder 1408 under the knowledge area tab 316. A knowledge area name edit control 1410, an OK button 1412 and a cancel button 1414 are contained in the translate knowledge area name folder 1408. Step 1416 detects typing of characters in the edit control 1410 to branch to step 1418 where the typed characters are displayed in the edit control. When the user selects the OK button 1412, step 1420 proceeds to step 1422 where the translated knowledge area name in the edit control 1410 is saved or replaces a previously saved translated name. If the cancel button 1414 is clicked the program at step 1424 returns to the display select knowledge area to translate window step 1378.

Figure 57:
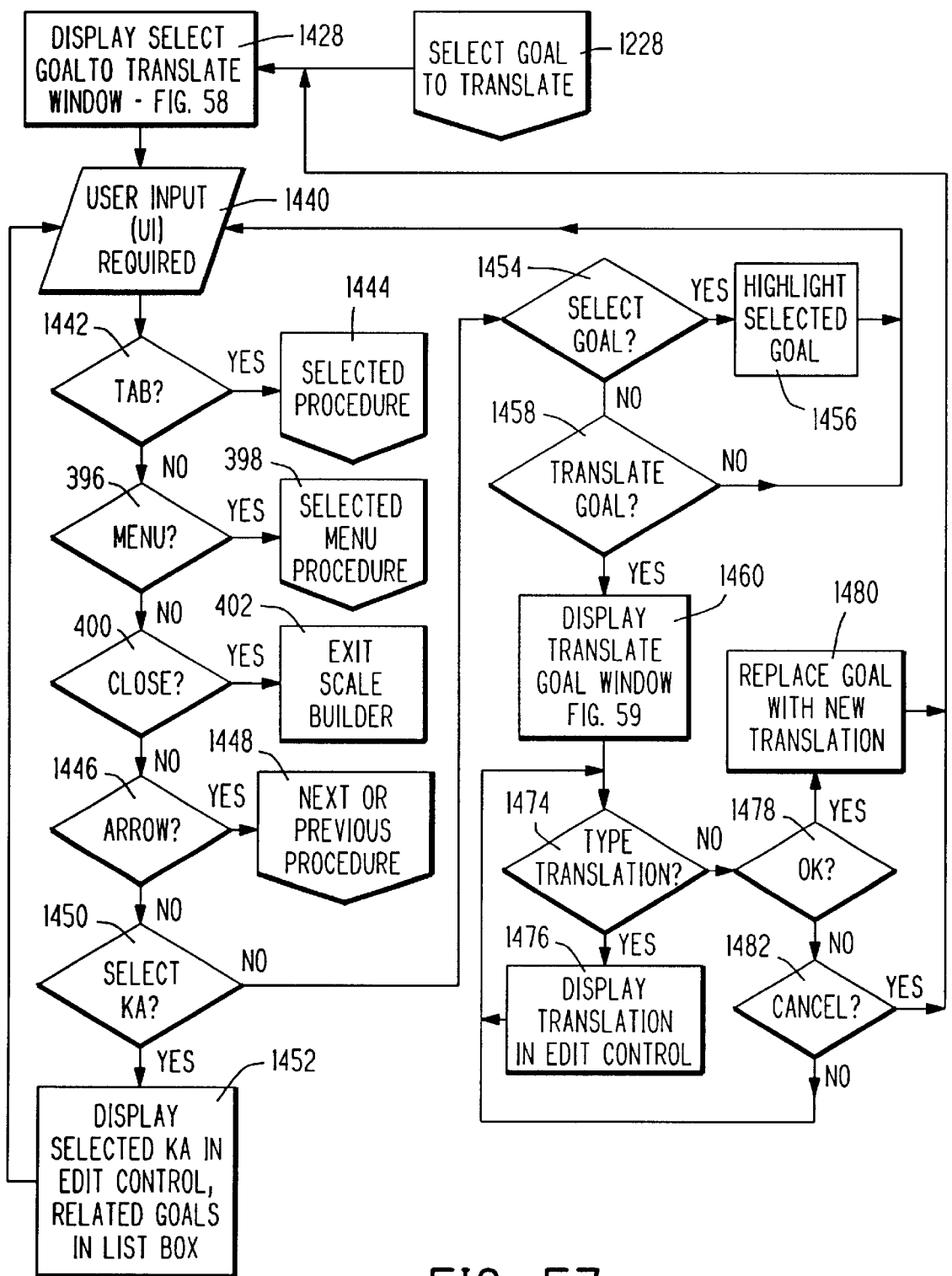
FIG. 57 is a program flow diagram of a select goal to translate procedure called from the translate MAPS procedure of FIG. 44 and the edit translated scale procedure of FIG. 50.
Figure 58:
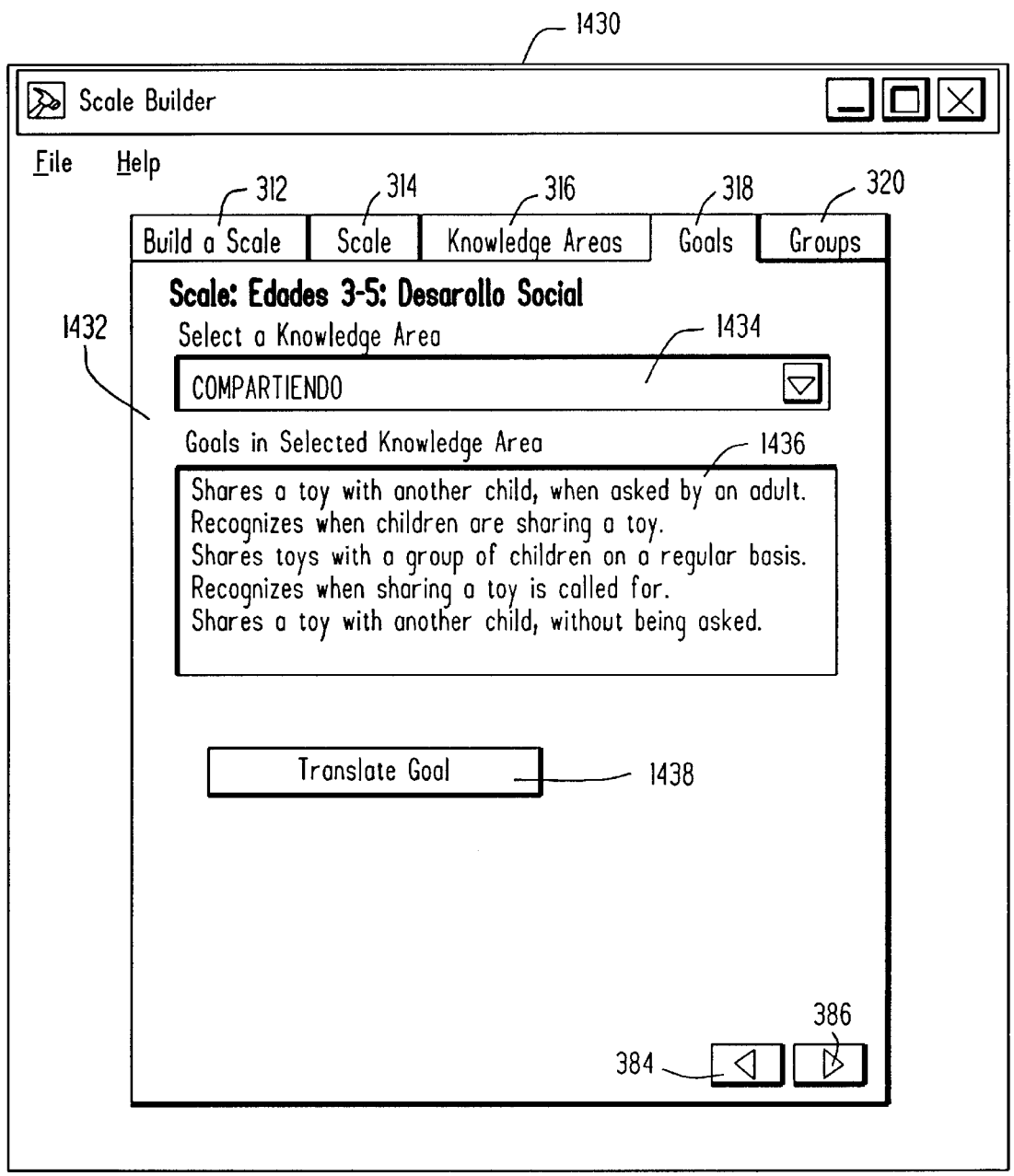
FIG. 58 is an illustration of a select goal to translate window displayed on a computer monitor during the select goal to translate procedure of FIG. 57.
Figure 59:
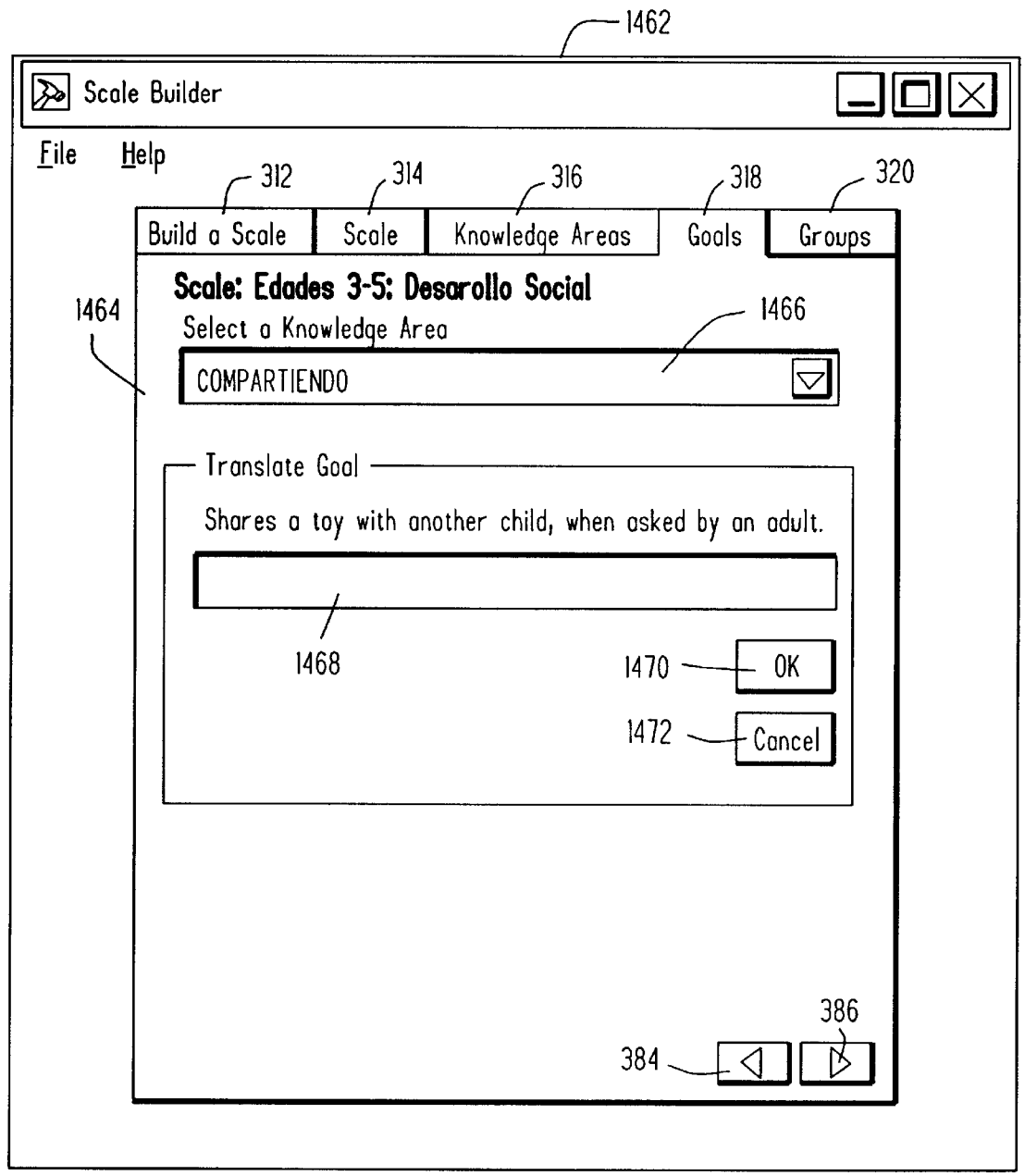
FIG. 59 is an illustration of a translate goal window displayed on a computer monitor during the select goal to translate procedure of FIG. 57.

When the select goal to translate procedure 1228 of FIG. 57 is called from either the translate MAPS scale procedure 350 of FIG. 44 or the edit translated scale procedure 352 of FIG. 50, step 1428 displays a select goal to translate window 1430, FIG. 58, on the computer monitor. Under the goals tab 318, the window 1430 includes a select goal to translate folder 1432 containing select knowledge area edit control 1434, a goals list box 1436 and a translate goal button 1438. Step 1440 enables user input. Selection of the scale tab 314 is sensed in step 1442 to advance to step 1444 where the program returns to the calling procedure, translate MAPS scale procedure 350 of FIG. 44 or edit translated scale procedure 352 of FIG. 50, in step 1444. Similarly the back arrow button 384 returns the program to the calling procedure via steps 1446 and 1448. Step 1454 determines if a KA has been selected and if true branches to step 1452 where the selected knowledge area is displayed the edit control 1434 and the goals assigned to the selected knowledge are displayed int the knowledge area list box 1436. Selection of a knowledge area in the list box 1436 is sensed in step 1454 to proceed to step 1456 where the selected goal is highlighted. When the user clicks on the translate goal button 1438, step 1458 proceeds to step 1460 where a translate goal window 1462, FIG. 59, is displayed. The window 1462 includes a translate goal folder 1464 under the goals tab 318. This folder 1464 contains a select knowledge area edit control 1466, a translate goal edit control 1468, an OK button 1470 and a cancel button 1472. Step 1474 senses the typing of characters in the edit control 1468 and step 1476 displays the typed characters in the edit control. When the OK button 1470 is clicked, steps 1478 and 1480 save the translated goal or replace a previous translation. Clicking on the cancel button 1482 causes step 1482 to return to the display the select goal to translate step 1478.

In the file menu procedure 358 of FIG. 60, step 1486 displays the file menu 1488 of FIG. 61 containing the options "Set Passwords", "Set Password Protection" and "Exit". User input is enabled in step 1490. When the user clicks on the menu option "Set Passwords", step 1492 calls the set passwords procedure 1494 of FIG. 62, and when the user clicks on the menu option "Set Password Protection", step 1496 calls the set password protection procedure 1498 of FIG. 64. Step 1500 senses selection of the file menu option "Exit" to proceed to step 1502 where the program terminates or exits the scale builder. If the user clicks the mouse button with the cursor pointed at some place other than one of the menu options, step 1504 senses this click and proceeds to step 1506 where the file menu 1488 is closed and the program returns to the build a scale procedure 395 of FIG. 7.

Figure 62:
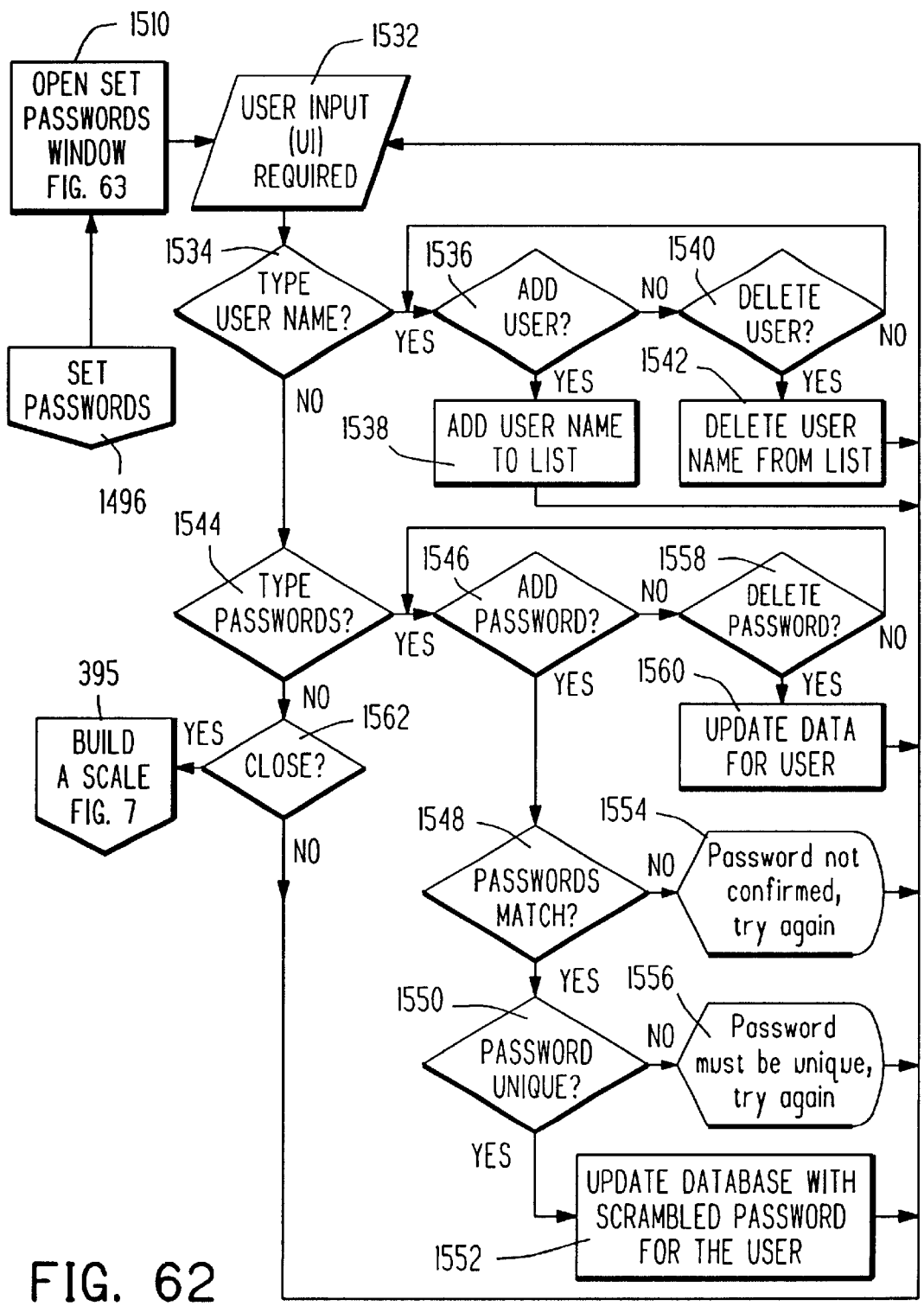
FIG. 62 is a program flow diagram of a set passwords procedure called from the file menu procedure of FIG. 60.
Figure 63:
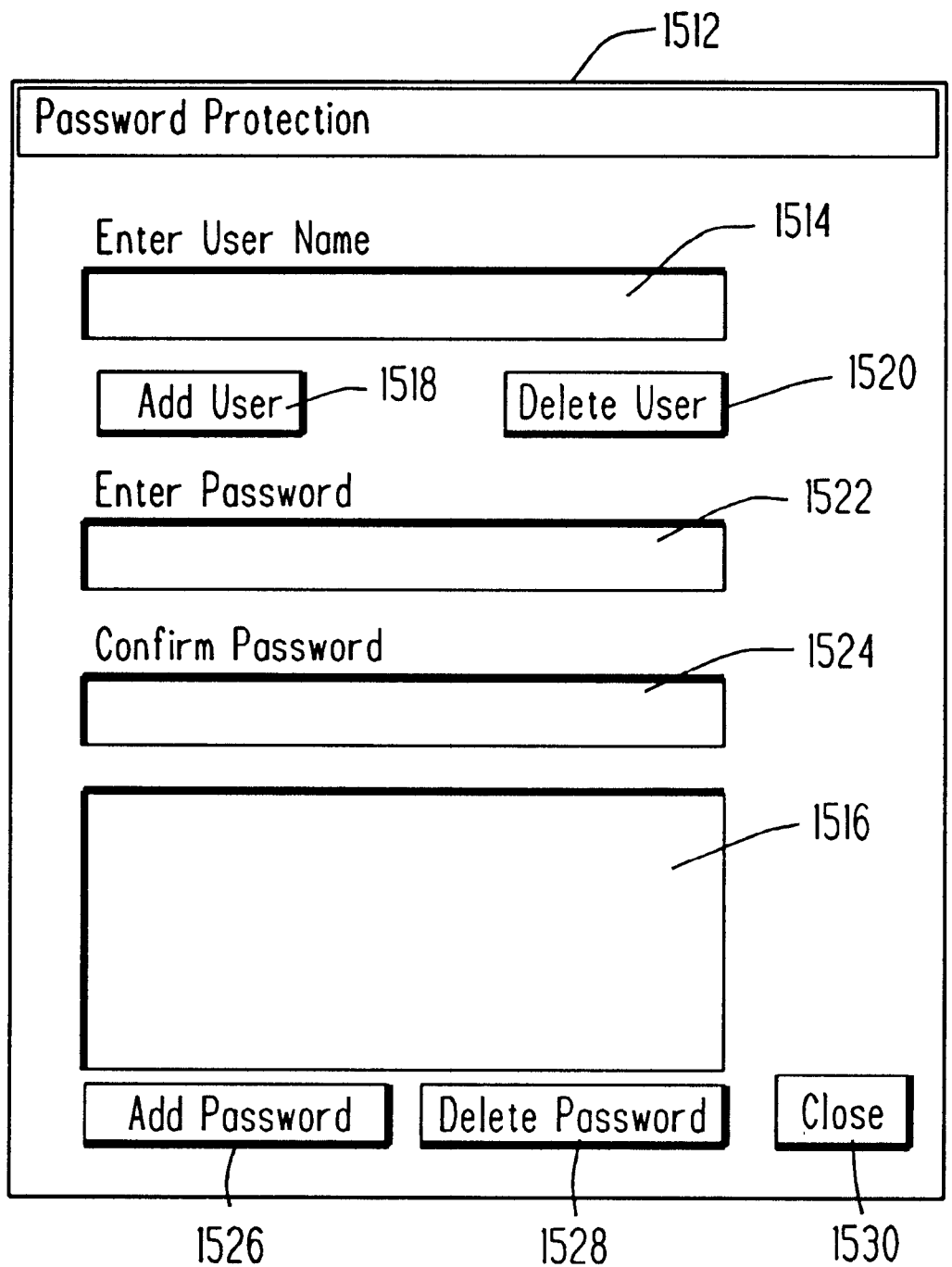
FIG. 63 is an illustration of a set passwords window displayed during the procedure of FIG. 62.

When the user selects the "set passwords" option from the file menu, step 1510 of FIG. 62 opens a set passwords window 1512 shown in FIG. 63. The window 1512 includes an enter user name edit control 1514, a user name list box 1516, an add user button 1518, a delete user button 1520, an enter password edit control 1522, a confirm password control 1524, an add password button 1526, a delete password button 1528 and a close button 1530. User input is enabled in step 1532. When the user enters a name in the edit control 1514, step 1534 branches to step 1536 where it is determined if the add user button is selected. If so step 1538 adds the user name from the edit control 1514 to the user list box 1516. If the delete user button is selected, step 1540 proceeds to step 1542 where the user name is deleted from the user list box 15 16. When a user types a password in the edit controls 1522 and 1524 and selects the add password button 1526, step 1546 branches to step 1548 where it is determined if the passwords match. If so, step 1550 next determines if the password is unique, and if true, the database is updated in step 1552 with the password being encrypted. If the passwords do not match, step 1554 displays the message that the password is not confirmed. If the password is not unique, step 1556 displays the message that the password must be unique. When the user selects the delete password button 1528, step 1558 proceeds to step 1560 which updates the data for the user deleting the password.

Figure 64:
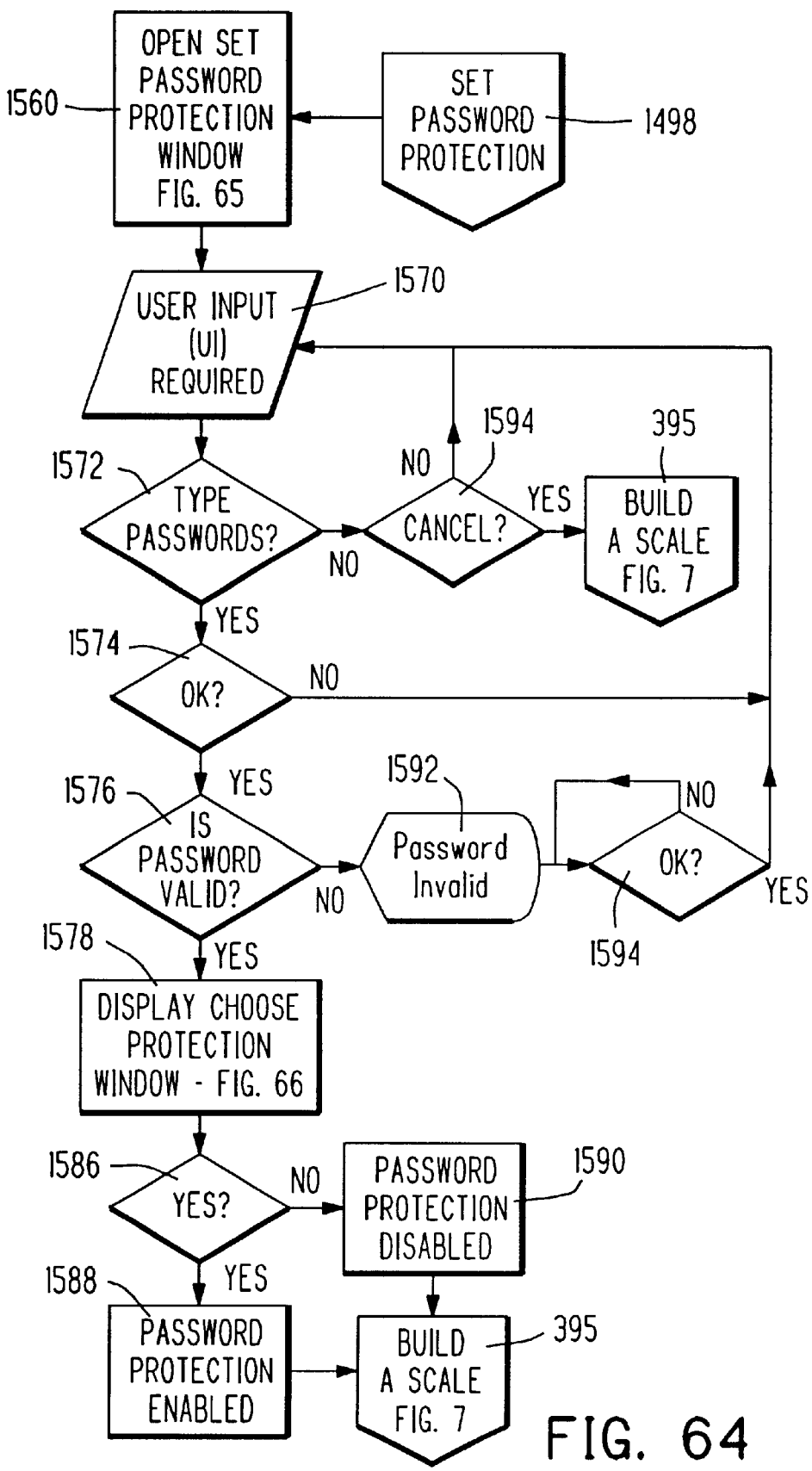
FIG. 64 is a program flow diagram of a set passwords protection procedure called from the file menu procedure of FIG. 60.
Figure 65:
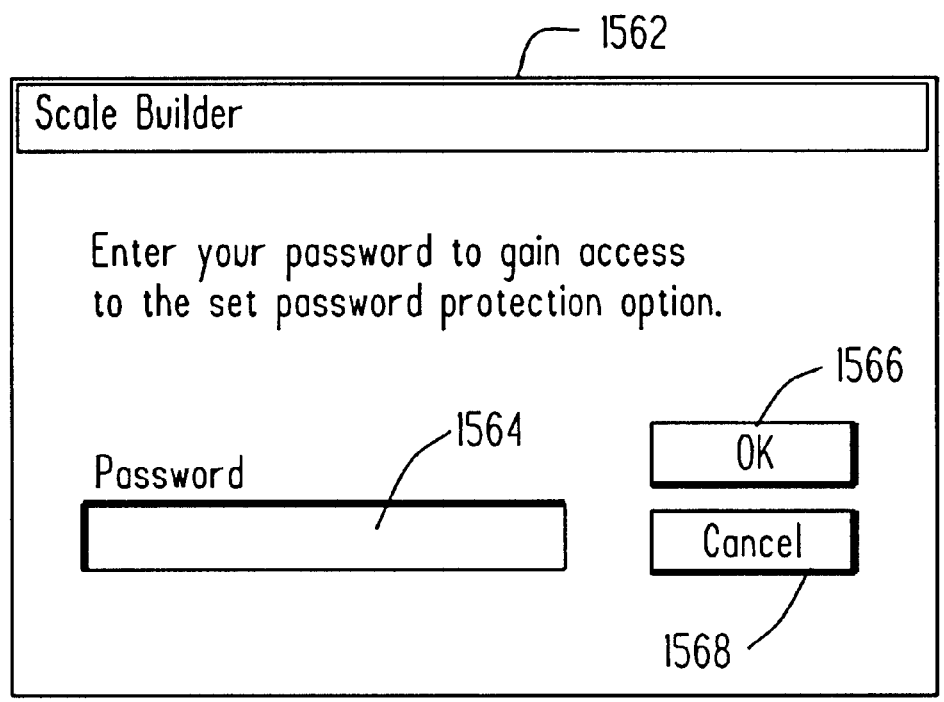
FIG. 65 is an illustration of a set password protection window displayed during the procedure of FIG. 64.
Figure 66:
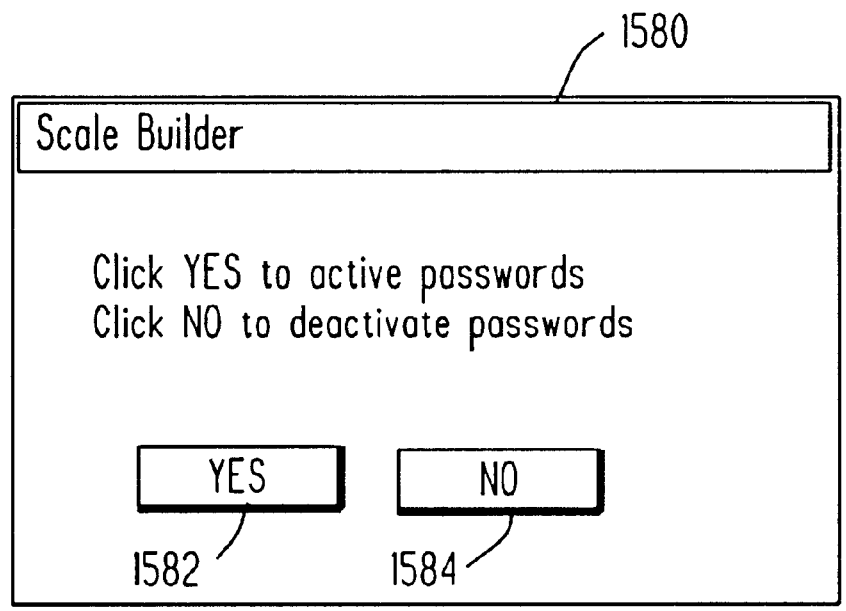
FIG. 66 is an illustration of a choose protection window displayed during the procedure of FIG. 64.

Calling the set password protection procedure 1498 of FIG. 64 initially in step 1560 displays a password entry window 1562 of FIG. 65. The window 1562 includes a password edit control 1564, an OK button 1566 and a cancel button 1568. Step 1570 enables user input. Step 1572 responds to the typing) of passwords in the edit control 1564 to proceed to step 1574 to determine if the OK button is selected. If true, the program in step 1576 determines if the password is valid and if true proceeds to step 157,8 where a choose password protection window 1589 of FIG. 66 is displayed. This window 1580 includes a YES button 1582 and a NO button 1584. Step 1586 waits until a click and determines if the click was on the yes button 1582. If true, step 1588 enables password protection, and if false, step 1590 disables password protection. From either step 1588 or step 1590, the program returns to the build a scale procedure 395. In the event that the password is found invalid in step 1576, step 1592 displays the message that the password is invalid along with an OK button (not show) and step 1594 requires the user to click on ok prior to erasing the message and returning to step 1572. When the cancel button 1568 is selected, step 1594 returns to the build a scale procedure 395.

Figure 67:
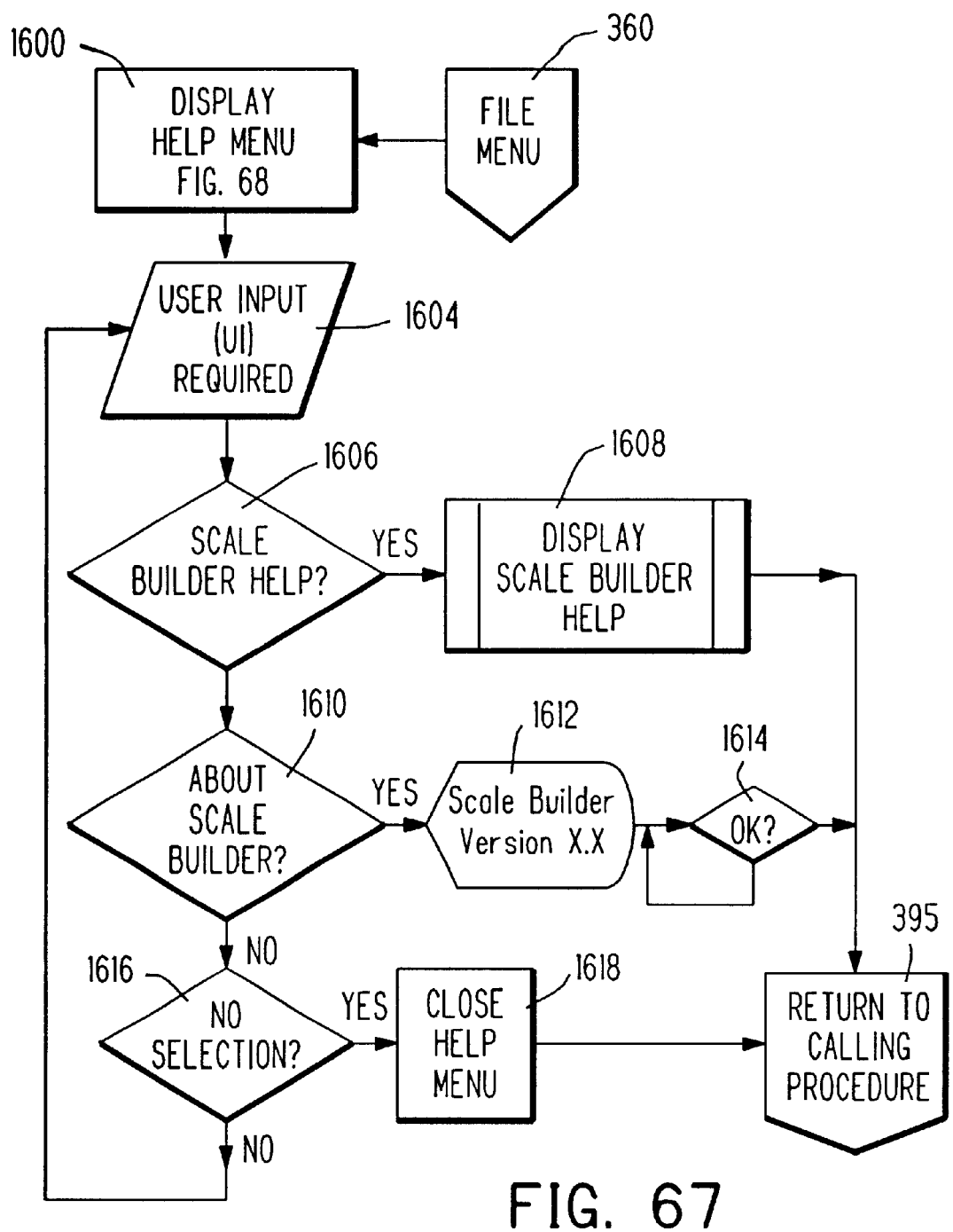
FIG. 67 is a program flow diagram of a help menu procedure called by selecting the menu item "Help" from various procedures in the program.

In the help menu procedure 360 of FIG. 67, step 1600 displays the help menu 1602 which contains the options "Scale Builder Help" and "About Scale Builder". User input is enabled in step 1604. When the user selects the menu item "scale builder help", step 1606 proceeds to step 1608 where a conventional help program is performed. If the menu item "about scale builder" is selected, step 1610 branches to step 1612 where the message "Scale Builder Version X.X" is displayed along with an OK button. If the user clicks the left mouse button when the cursor is not on a menu selection in the menu 1602, step 1616 proceeds to step 1618 where the menu 1602 is closed. From step 1608, step 1614 and step 1618, the program returns to the previous procedure from which the help menu procedure was called.

The above embodiment discloses particular formulas for automatically computing discrimination and difficulty factors. Such discrimination and difficulty factors for each goal could by assigned by a teacher or administrator based upon the experience and knowledge of the teacher or administrator, or the discrimination and difficulty factors could be computed by many different formulas.

Since many modifications, variations and changes in detail can be made to the above described embodiment, it is intended that the foregoing description and the accompanying drawings be interpreted as only illustrative and not in a limiting sense.

What is claimed is:

1. A computer system for building an educational scale including a plurality of goal lists of educational goals assigned to different areas of knowledge, the system comprising:

means for selecting an area of knowledge;

means presenting options of (a) adding a new goal to the goal list assigned to the selected area of knowledge, (b) adding an existing goal to the goal list of the selected area of knowledge, (c) editing an existing goal in the goal list of the selected knowledge area, (d) deleting a goal for the goal list of the selected knowledge area, and (e) editing the order of the goals in the goal list of the selected knowledge area;

means responsive to selection of one of the options (a), (b), (c), (d) or (e) for adding, editing, deleting and/or reordering one or more goals in the goal list assigned to the selected area of knowledge; and means for saving the goal list for use in an education management system using the goals to assess student achievement.

2. A computer system for building an educational scale as defined in claim 1 further comprising means for determining a difficulty factor for each goal entered into the goal list wherein the difficulty factor is useful to weight goal achievement in assessing student achievement.

3. A computer system for building an educational scale as defined in claim 2 wherein the difficulty factor is determined based at least partly on the position of the corresponding goal in the goal list.

4. A computer system for building an educational scale as defined in claim 1 including means for translating a scale from a first language into a second language to form a translated scale.

5. A method of building an educational scale including a plurality of goal lists of educational goals assigned to different areas of knowledge in a computerized educational management system, the method comprising:

selecting an area of knowledge, presenting options of (a) adding a new goal to the goal list assigned to the selected area of knowledge, (b) adding an existing goal to the goal list of the selected area of knowledge, (c) editing an existing goal in the goal list of the selected knowledge area, (d) deleting a goal for the goal list of the selected knowledge area, and (e) editing the order of the goals in the goal list of the selected knowledge area;

adding, editing, deleting and/or reordering in response to the selection of option (a), (b), (c), (d) and/or (e) one or more coals in the goal list assigned to the selected area of knowledge, and saving the goal list for use in an education management system using the goals to assess student achievement.

6. A method of building an educational scale as defined in claim 5 further comprising determining a difficulty factor for each goal entered into the goal list wherein the difficulty factor is useful to weight goal achievement in assessing student achievement.

7. A method of building an educational scale as defined in claim 6 wherein the difficulty factor is determined based at least partly on the position of the corresponding goal in the goal list.

8. A method of building an educational scale as defined in claim 5 including translating a scale from a first language into a second language to form a translated scale. displaying an item list defining possible data in the computerized management system.

9. A computer system for building an educational scale including a plurality of educational goals assigned to different areas of knowledge, the system comprising:

means for selecting an area of knowledge, means for entering one or more goals in a list related to the selected area of knowledge, and means for saving the goal list for use in an education management system using the goals to assess student achievement;

means for determining a difficulty factor for each goal entered into the goal list wherein the difficulty factor is useful to weight goal achievement in assessing student achievement;

said difficulty factor being determined based at least partly on the position of the corresponding goal in the goal list wherein the difficulty factor B is computed according to the equation:

$$B=(C/2.5)-1$$

wherein C is the position of the goal within the goal list.

10. A method of building an educational scale including a plurality of educational goals assigned to different areas of knowledge in a computerized educational management system, the method comprising:

selecting an area of knowledge, entering one or more goals in a list related to the selected area of knowledge, and saving the goal list for use in an education management system using the goals to assess student achievement;

determining a difficulty factor for each goal entered into the goal list wherein the difficulty factor is useful to weight goal achievement in assessing student achievement; wherein the difficulty factor is determined based at least partly on the position of the corresponding goal in the goal list and wherein the difficulty factor B is computed according to the equation:

$$B=(C/2.5)-1$$

wherein C is the position of the goal within the goal list.

11. A computer system for building an educational scale including a plurality of educational goals assigned to different areas of knowledge, the system comprising:

means for selecting an area of knowledge, means for entering a plurality of goals in a list related to the selected area of knowledge, means for designating two or more goals in the list as a group to be considered as a single goal achieved by a common activity, and means for saving the goal list for use in an education management system using the goals to assess student achievement.

12. A computer system for building an educational scale as defined in claim 11 further comprising means for preventing the designation of any non-adjacent goal in a group wherein the non-adjacent goal is not adjacent in the list of goals to another goal designated as a member of the group.

13. A method of building an educational scale including a plurality of educational goals assigned to different areas of knowledge in a computerized educational management system, the method comprising:

selecting an area of knowledge, entering one or more goals in a list related to the selected area of knowledge, designating two or more goals as a group to be considered as a single goal achieved by a common activity, and saving the goal list for use in an education management system using the goals to assess student achievement.

14. A method of building an educational scale as defined in claim 13 further comprising preventing the designation of any non-adjacent goal in a group wherein the non-adjacent goal is not adjacent in the list of goals to another goal designated as a member of the group.

* * * * *